United States Patent
Wang et al.

(10) Patent No.: US 12,238,801 B2
(45) Date of Patent: Feb. 25, 2025

(54) COMMUNICATION METHOD AND APPARATUS

(71) Applicant: Huawei Technologies Co., Ltd., Shenzhen (CN)

(72) Inventors: Rui Wang, Shanghai (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/670,135

(22) Filed: Feb. 11, 2022

(65) Prior Publication Data

US 2022/0167449 A1 May 26, 2022

Related U.S. Application Data

(63) Continuation of application No. PCT/CN2019/100885, filed on Aug. 15, 2019.

(51) Int. Cl.
*H04W 76/16* (2018.01)
*H04L 5/00* (2006.01)
*H04W 92/20* (2009.01)

(52) U.S. Cl.
CPC .......... *H04W 76/16* (2018.02); *H04L 5/0053* (2013.01); *H04W 92/20* (2013.01)

(58) Field of Classification Search
CPC ..... H04W 76/16; H04W 92/20; H04W 76/15; H04W 76/27; H04W 88/10; H04L 5/0053; H04L 5/001; H04L 5/0098
See application file for complete search history.

(56) References Cited

U.S. PATENT DOCUMENTS

| 9,820,332 B2 | 11/2017 | Lee et al. |
| 2016/0044744 A1* | 2/2016 | Lee ........................ H04W 76/38 370/329 |

(Continued)

FOREIGN PATENT DOCUMENTS

| CN | 105451364 A | 3/2016 |
| CN | 106538034 A | 3/2017 |
| EP | 2741549 A1 | 6/2014 |

OTHER PUBLICATIONS

"3rd Generation Partnership Project; Technical Specification Group Services and System Aspects; 3G security; Network Domain Security (NDS); IP network layer security (Release 16)", 3GPP TS 33.210 V16.2.0, (Jun. 2019), 28 pages.

(Continued)

*Primary Examiner* — Hardikkumar D Patel
(74) *Attorney, Agent, or Firm* — Slater Matsil, LLP

(57) ABSTRACT

Embodiments of this application disclose a communication method and apparatus, and relate to the field of communication technologies. A first access network node determines to deactivate a secondary cell group SCG or activate the SCG; and the first access network node sends first indication information to a second base station, where the first indication information indicates the second base station to send an SCG deactivation command or an SCG activation command to a terminal, where the first access network node belongs to a first base station, the first base station is a master node or a secondary node of the terminal during dual connectivity communication, and the SCG is one or more cells managed by the secondary node.

20 Claims, 25 Drawing Sheets

(56) References Cited

U.S. PATENT DOCUMENTS

2017/0013668 A1* 1/2017 Chang .............. H04W 76/19
2017/0223763 A1 8/2017 Rahman et al.

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0 Technical Specification, (Jun. 2019), 657 pages.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 V15.6.0 Technical Specification, (Jul. 2019), 319 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.6.0 Technical Specification, (Jun. 2019), 69 pages.

"3rd Generation Partnership Project; Technical Specification Group Radio Access Network; NR; Medium Access Control (MAC) protocol specification (Release 15)", 3GPP TS 38.321 V15.6.0 Technical Specification, (Jun. 2019), 78 pages.

"3rd Generation Partnership Project; Technical Specification Group Radio Access Network; NR; Radio Resource Control (RRC) protocol specification (Release 15)", 3GPP TS 38.331 V15.6.0 Technical Specification, (Jun. 2019), 519 pages.

"3rd Generation Partnership Project; Technical Specification Group Radio Access Network; NG-RAN; Architecture description (Release 15)", 3GPP TS 38.401 V15.6.0 Technical Specification, (Jul. 2019), 46 pages.

"3rd Generation Partnership Project; Technical Specification Group Radio Access Network; NG-RAN; Xn application protocol (XnAP) (Release 15)", 3GPP TS 38.423 V15.4.0 Technical Specification (Jul. 2019), 309 pages.

"3rd Generation Partnership Project; Technical Specification Group Radio Access Network; Ng-Ran; F1 application protocol (F1AP) (Release 15)", 3GPP TS 38.473 V15.6.0 Technical Specification (Jul. 2019), 205 pages.

Anonymous: "3rd Generation Partnership Project; Technical Specification Group Radio Access Network; Evolved Universal Terrestrial Radio Access (E-UTRA); Medium Access Control (MAC) protocol specification (Release 15)", 3GPP Standard; Technical Specification; 3GPP TS 36.321, V15.6.0, Jun. 27, 2019 (Jun. 27, 2019), pp. 1-133, XP051754436.

3GPP TSG RAN WG2 Meeting #85, R2-140217, "Discussions on Activation/Deactivation for Dual Connectivity", ITL Inc., Prague, Czech, Feb. 10-14, 2014, total 4 pages.

* cited by examiner

COMMUNICATION METHOD AND APPARATUS

CROSS-REFERENCE TO RELATED APPLICATIONS

This application is a continuation of International Patent Application No. PCT/CN2019/100885, filed on Aug. 15, 2019. The aforementioned application is hereby incorporated by reference in its entirety.

TECHNICAL FIELD

Embodiments of this application relate to the field of communication technologies, and in particular, to a communication method and apparatus.

BACKGROUND

When a terminal device works in a dual connectivity (DC) mode, the terminal may simultaneously transmit data on two air interface links: a master cell group (MCG) and a secondary cell group (SCG). Consequently, power consumption is relatively high. When a data rate of the terminal fluctuates frequently, for example, the terminal is usually in a low data rate state, if the terminal always works in the DC mode, power consumption on the SCG link is a waste.

In a communication method in a conventional technology, a network side configures the terminal to perform a DC operation when the terminal is in a high data rate state, that is, perform secondary node (SN) addition. When the terminal enters the low data rate state, the network side configures the terminal to release the DC operation, that is, perform SN release, to save power of the network device and the terminal device. However, in various embodiments, when SN release is performed, the terminal needs to completely release SCG configuration; when SN addition is performed, a set of complete SCG configuration needs to be re-added. However, in most cases, configuration given by the SN to the terminal does not need to be updated, and the terminal may continue to use the original configuration. Consequently, frequent SN addition and release increase overheads of air interface signaling, and cause a large delay.

SUMMARY

Embodiments of this application provide a communication method and apparatus, to reduce power consumption of a network device and a terminal while reducing overheads of air interface signaling and a delay.

According to a first aspect of the embodiments of this application, a communication method is provided, where the method includes a first access network node determines to deactivate an SCG or activate the SCG; and the first access network node sends first indication information to a second access network node, where the first indication information is used to indicate the second access network node to send an SCG deactivation command or an SCG activation command to a terminal, where the first access network node and the second access network node belong to a first base station, the first base station is a master node (MN) or an SN of the terminal during DC communication, and the SCG includes one or more cells managed by the SN. In various embodiments, a deactivation operation is performed on the SCG, so that SCG related configuration can be retained, and SCG link communication can be quickly recovered through an activation operation. Therefore, compared with a conventional technology, in various embodiments, there is no need to perform SN addition or release, so as to reduce overheads of air interface signaling and a delay while reducing power consumption of a network side and the terminal, thereby improving communication efficiency. In addition, the first access network node and the second access network node may be respectively a centralized unit (CU) and a distributed unit (DU) of the MN or the SN. In other words, in this application, the MN or the SN performs signaling interaction in a centralized unit-distributed unit (CU-DU) architecture, to implement the SCG deactivation and activation operations, and embodiments can adapt to different network deployments, so that the SCG deactivation and activation operations are performed more flexibly.

With reference to the first aspect, in a possible implementation, the method further includes: The first access network node sends second indication information to a second base station, where the second indication information is used to indicate the second base station to deactivate the SCG or activate the SCG. The first base station is an MN, and the second base station is an SN. In various embodiments, when determining to deactivate the SCG or activate the SCG, the MN notifies the SN, and indicates the SN to deactivate the SCG or activate the SCG, so that the SN can retain the SCG related configuration, and the SCG link communication can be quickly recovered through the activation operation. Therefore, compared with a conventional technology, in various embodiments, there is no need to perform SN addition or release, so as to reduce the overheads of air interface signaling and the delay while reducing the power consumption of the network side and the terminal, thereby improving the communication efficiency.

With reference to any one of the first aspect or the possible implementations of the first aspect, in another possible implementation, the method further includes the first access network node sends a first notification message to the second base station, where the first notification message is used to notify the second base station that the first base station deactivates the SCG or activates the SCG, where the first base station is an SN, and the second base station is an MN. In various embodiments, when determining to deactivate the SCG or activate the SCG, the SN notifies the MN, so that the MN can suspend/recover a data transmission tunnel on an X2/Xn interface corresponding to a bearer established at the SN. In this embodiment, the SCG related configuration can be retained, and the SCG link communication can be quickly recovered through the activation operation.

With reference to any one of the first aspect or the possible implementations of the first aspect, in another possible implementation, the first access network node includes a first apparatus and a second apparatus, the first apparatus is configured to perform a control plane (CP) function of the first access network node, and the second apparatus is configured to perform a user plane (UP) function of the first access network node. The functions of the first access network node may be implemented by the first apparatus and the second apparatus. The first apparatus may be a central unit-control plane (CU-CP), and the second apparatus may be a central unit-user plane (CU-UP). In other words, in this embodiment, signaling interaction can be performed in an architecture in which the CU of the MN or the SN includes a CP and a UP, to implement the SCG deactivation and activation operations.

With reference to any one of the first aspect or the possible implementations of the first aspect, in another possible implementation, that a first access network node determines to deactivate an SCG or activate the SCG includes the first apparatus determines to deactivate the SCG or activate the SCG. That the first access network node sends first indication information to a second access network node includes the first apparatus sends the first indication information to the second access network node. Based on this embodiment, the first apparatus and the second apparatus may be respectively a CU-CP and a CU-UP of the MN or the SN. In other words, in this application, signaling interaction is performed in the architecture in which the CU of the MN or the SN includes the CP and the UP, to implement the SCG deactivation and activation operations, and this embodiment can adapt to different network deployments, so that the SCG deactivation and activation operations are performed more flexibly.

With reference to any one of the first aspect or the possible implementations of the first aspect, in another possible implementation, the method further includes the first apparatus sends third indication information to the second apparatus, where the third indication information is used to indicate the second apparatus to deactivate the SCG or activate the SCG. Based on this embodiment, the first apparatus may further send indication information to the second apparatus, to indicate the second apparatus to deactivate the SCG or activate the SCG.

With reference to any one of the first aspect or the possible implementations of the first aspect, in another possible implementation, that a first access network node determines to deactivate an SCG or activate the SCG includes: The second apparatus determines to deactivate the SCG or activate the SCG. That the first access network node sends first indication information to a second access network node includes: The second apparatus sends a notification message to the first apparatus, to instruct the first apparatus to send the first indication information to the second access network node. Based on this embodiment, the first apparatus and the second apparatus may be respectively a CU-CP and a CU-UP of the MN or the SN. In other words, in this application, signaling interaction is performed in the architecture in which the CU of the MN or the SN includes the CP and the UP, to implement the SCG deactivation and activation operations, and this embodiment can adapt to different network deployments, so that the SCG deactivation and activation operations are performed more flexibly.

With reference to any one of the first aspect or the possible implementations of the first aspect, in another possible implementation, that a first access network node determines to deactivate an SCG or activate the SCG includes: The first access network node determines, based on any one or more of assistance information sent by the second base station, assistance information sent by the terminal, or a transmission situation of data carried by the first base station, to deactivate the SCG or activate the SCG, where when the first base station is an MN, the second base station is an SN; or when the first base station is an SN, the second base station is an MN. Based on this embodiment, the first access network node can determine, based on at least one of the assistance information sent by the second base station, the assistance information sent by the terminal, or the transmission situation of the data carried by the first base station, to deactivate the SCG or activate the SCG.

According to a second aspect of the embodiments of this application, a communication method is provided, where the method includes: A second access network node receives first indication information sent by a first access network node, where the first indication information is used to indicate the second access network node to send an SCG deactivation command or an SCG activation command to a terminal, where the first access network node and the second access network node belong to a first base station, the first base station is an MN or an SN of the terminal during DC communication, and the SCG includes one or more cells managed by the SN; and the second access network node sends the SCG deactivation command or the SCG activation command to the terminal. Based on this embodiment, a deactivation operation is performed on the SCG, so that SCG related configuration can be retained, and SCG link communication can be quickly recovered through an activation operation. Therefore, compared with a conventional technology, with embodiments of this application, there is no need to perform SN addition or release, so as to reduce overheads of air interface signaling and a delay while reducing power consumption of a network side and the terminal, thereby improving communication efficiency. In addition, the first access network node and the second access network node may be respectively a CU and a DU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the second aspect, in a possible implementation, the first access network node includes a first apparatus and a second apparatus, the first apparatus is configured to perform a CP function of the first access network node, and the second apparatus is configured to perform a UP function of the first access network node. That a second access network node receives first indication information sent by a first access network node includes: The second access network node receives the first indication information sent by the first apparatus. Based on this embodiment, the first apparatus and the second apparatus may be respectively a CU-CP and a CU-UP of the MN or the SN. In other words, in this application, signaling interaction is performed in an architecture in which the CU of the MN or the SN includes a CP and a UP, to implement the SCG deactivation and activation operations, and this embodiment can adapt to different network deployments, so that the SCG deactivation and activation operations are performed more flexibly.

According to a third aspect of the embodiments of this application, a communication method is provided, where the method includes a first access network node determines to deactivate an SCG or activate the SCG; and the first access network node sends first indication information to a second base station, where the first indication information is used to indicate the second base station to send an SCG deactivation command or an SCG activation command to a terminal, where the first access network node belongs to a first base station, the first base station is an MN or an SN of the terminal during DC communication, and when the first base station is an MN, the second base station is an SN; or when the first base station is an SN, the second base station is an MN; and the SCG includes one or more cells managed by the SN. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a CU and a DU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the third aspect, in a possible implementation, the method further includes: The first access network node sends second indication information to a second access network node, where the second indication information is used to indicate the second access network node to deactivate the SCG or activate the SCG, and the second access network node belongs to the first base station. Based on this embodiment, after determining to deactivate the SCG or activate the SCG, the first access network node notifies the second access network node, so that the second access network node deactivates the SCG or activates the SCG.

With reference to any one of the third aspect or the possible implementations of the third aspect, in another possible implementation, the first access network node includes a first apparatus and a second apparatus, the first apparatus is configured to perform a CP function of the first access network node, and the second apparatus is configured to perform a UP function of the first access network node. Based on this embodiment, the functions of the first access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the third aspect or the possible implementations of the third aspect, in another possible implementation, that a first access network node determines to deactivate an SCG or activate the SCG includes the first apparatus determines to deactivate the SCG or activate the SCG. That the first access network node sends first indication information to a second base station includes: The first apparatus sends the first indication information to the second base station. Based on this embodiment, the first apparatus and the second apparatus may be respectively a CU-CP and a CU-UP of the MN or the SN. In other words, in this application, signaling interaction is performed in the architecture in which the CU of the MN or the SN includes the CP and the UP, to implement the SCG deactivation and activation operations, and this embodiment can adapt to different network deployments, so that the SCG deactivation and activation operations are performed more flexibly.

With reference to any one of the third aspect or the possible implementations of the third aspect, in another possible implementation, the method further includes the first apparatus to send third indication information to the second apparatus, where the third indication information is used to indicate the second apparatus to deactivate the SCG or activate the SCG. Based on this embodiment, the first apparatus may further send indication information to the second apparatus, to indicate the second apparatus to deactivate the SCG or activate the SCG.

With reference to any one of the third aspect or the possible implementations of the third aspect, in another possible implementation, that a first access network node determines to deactivate an SCG or activate the SCG includes the second apparatus determines to deactivate the SCG or activate the SCG. That the first access network node sends first indication information to a second base station includes: The second apparatus sends a notification message to the first apparatus, to instruct the first apparatus to send the first indication information to the second base station. Based on this embodiment, the first apparatus and the second apparatus may be respectively a CU-CP and a CU-UP of the MN or the SN. In other words, in this application, signaling interaction is performed in the architecture in which the CU of the MN or the SN includes the CP and the UP, to implement the SCG deactivation and activation operations, and this embodiment can adapt to different network deployments, so that the SCG deactivation and activation operations are performed more flexibly.

With reference to any one of the third aspect or the possible implementations of the third aspect, in another possible implementation, that a first access network node determines to deactivate an SCG or activate the SCG includes the first access network node determines, based on any one or more of assistance information sent by the second base station, assistance information sent by the terminal, or a transmission situation of data carried by the first base station, to deactivate the SCG or activate the SCG. Based on this embodiment, the first access network node can determine, based on at least one of the assistance information sent by the second base station, the assistance information sent by the terminal, or the transmission situation of the data carried by the first base station, to deactivate the SCG or activate the SCG.

According to a fourth aspect of the embodiments of this application, a communication method is provided, where the method includes a second base station receives first indication information sent by a first access network node, where the first indication information is used to indicate the second base station to send an SCG deactivation command or an SCG activation command to a terminal, where the first access network node belongs to a first base station, the second base station is an MN or an SN of the terminal during DC communication, and when the second base station is an MN, the first base station is an SN; or when the second base station is an SN, the first base station is an MN; and the SCG includes one or more cells managed by the SN; and the second base station sends the SCG deactivation command or the SCG activation command to the terminal. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a CU and a DU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the fourth aspect, in a possible implementation, the first access network node includes a first apparatus and a second apparatus, the first apparatus is configured to perform a CP function of the first access network node, and the second apparatus is configured to perform a UP function of the first access network node. That a second base station receives first indication information sent by a first access network node includes: The second base station receives the first indication information sent by the first apparatus. Based on this embodiment, the functions of the first access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the fourth aspect or the possible implementations of the fourth aspect, in another possible implementation, the second base station includes an access network node configured to perform a function of a higher layer protocol stack and an access network node configured to perform a function of a lower layer protocol stack. Based on this embodiment, the access network node configured to perform the function of the higher layer protocol stack may be a CU, and the access network node configured to perform the function of the lower layer protocol stack may be a DU, that is, the second base station may alternatively be in the CU-DU architecture.

With reference to any one of the possible implementations of the first aspect, the second aspect, the third aspect, and the fourth aspect, in another possible implementation, the first access network node is configured to perform functions of a radio resource control (RRC) protocol stack, a service data adaptation protocol (SDAP) protocol stack, and a packet data convergence protocol (PDCP) layer, and the second access network node is configured to perform functions of a radio link control (RLC) protocol stack, a media access control (MAC) protocol stack, and a physical layer (PHY) protocol stack. Based on this embodiment, according to protocol layers, the RRC protocol stack, the SDAP protocol stack, and the PDCP layer may be divided to the first access network node, and the RLC protocol stack, the MAC protocol stack, and the PHY may be divided to the second access network node. The first access network node may be a CU, and the second access network node may be a DU. A specific CU-DU division manner is not limited in the embodiments of this application, and is merely an example for description herein.

According to a fifth aspect of the embodiments of this application, a communication method is provided, where the method includes a first access network node determines to deactivate an SCG or activate the SCG; and the first access network node sends an SCG deactivation command or an SCG activation command to a terminal, where the first access network node belongs to a first base station, the first base station is an MN or an SN of the terminal during DC communication, and the SCG includes one or more cells managed by the SN. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a DU and a CU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the fifth aspect, in a possible implementation, the method further includes the first access network node to send second indication information to a second access network node, where the second indication information is used to indicate the second access network node to deactivate the SCG or activate the SCG, and the second access network node belongs to the first base station. Based on this embodiment, when determining to deactivate the SCG or activate the SCG, the DU notifies the CU, and indicates the CU to deactivate the SCG or activate the SCG, so that the SN can retain the SCG related configuration, and the SCG link communication can be quickly recovered through the activation operation.

With reference to any one of the fifth aspect or the possible implementations of the fifth aspect, in another possible implementation, the second access network node includes a first apparatus and a second apparatus, the first apparatus is configured to perform a CP function of the first access network node, and the second apparatus is configured to perform a UP function of the first access network node. That the first access network node sends second indication information to a second access network node includes: The first access network node sends the second indication information to the first apparatus. Based on this embodiment, the functions of the second access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the fifth aspect or the possible implementations of the fifth aspect, in another possible implementation, that a first access network node determines to deactivate an SCG or activate the SCG includes that the first access network node determines, based on any one or more of assistance information sent by a second base station, assistance information sent by the terminal, or a transmission situation of data carried by the first base station, to deactivate the SCG or activate the SCG, where when the first base station is an MN, the second base station is an SN; or when the first base station is an SN, the second base station is an MN. Based on this embodiment, the first access network node can determine, based on at least one of the assistance information sent by the second base station, the assistance information sent by the terminal, or the transmission situation of the data carried by the first base station, to deactivate the SCG or activate the SCG.

According to a sixth aspect of the embodiments of this application, a communication method is provided, where the method includes a second access network node that receives first indication information sent by a first access network node, where the first indication information is used to indicate the second access network node to deactivate an SCG or activate the SCG, where the second access network node belongs to a first base station, the first base station is an MN or an SN of the terminal during DC communication, and the SCG includes one or more cells managed by the SN; and the second access network node deactivates the SCG or activates the SCG based on the first indication information. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a DU and a CU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the sixth aspect, in a possible implementation, the method further includes the second access network node to send a first notification message to a second base station, where the first notification message is used to notify the second base station that the first base station deactivates the SCG or activates the SCG, where the first base station is an SN, and the second base station is an MN. Based on this embodiment, when determining to deactivate the SCG or activate the SCG, the SN notifies the MN, so that the MN can suspend/recover a data transmission tunnel on an X2/Xn interface corresponding to a bearer established at the SN. In this embodiment, the SCG related configuration can be retained, and the SCG link communication can be quickly recovered through the activation operation.

With reference to any one of the sixth aspect or the possible implementations of the sixth aspect, in another possible implementation, the method further includes the second access network node to send second indication information to a second base station, where the second indication information is used to indicate the second base station to deactivate the SCG or activate the SCG, where the first base station is an MN, and the second base station is an SN. Based on this embodiment, when determining to deactivate the SCG or activate the SCG, the MN notifies the SN, and indicates the SN to deactivate the SCG or activate the SCG, so that the SN can retain the SCG related configuration, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving communication efficiency.

With reference to any one of the sixth aspect or the possible implementations of the sixth aspect, in another possible implementation, the second access network node includes a first apparatus and a second apparatus, the first apparatus is configured to perform a CP function of the first access network node, and the second apparatus is configured to perform a UP function of the first access network node. That a second access network node receives first indication information sent by a first access network node includes: The first apparatus receives the first indication information sent by the first access network node. Based on this embodiment, the functions of the second access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the sixth aspect or the possible implementations of the sixth aspect, in another possible implementation, the method further includes that the first apparatus sends third indication information to the second apparatus, where the third indication information is used to indicate the second apparatus to deactivate the SCG or activate the SCG. Based on this embodiment, the first apparatus may further send indication information to the second apparatus, to indicate the second apparatus to deactivate the SCG or activate the SCG.

According to a seventh aspect of the embodiments of this application, a communication method is provided, where the method includes a first access network node determines to deactivate an SCG or activate the SCG; and the first access network node sends a notification message to a second access network node, to instruct the second access network node to send first indication information to a second base station, where the first indication information is used to indicate the second base station to send an SCG deactivation command or an SCG activation command to a terminal, where the first access network node and the second access network node belong to a first base station, the first base station is an MN or an SN of the terminal during DC communication, and when the first base station is an MN, the second base station is an SN; or when the first base station is an SN, the second base station is an MN; and the SCG includes one or more cells managed by the SN. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a DU and a CU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the seventh aspect, in a possible implementation, the second access network node includes a first apparatus and a second apparatus, the first apparatus is configured to perform a CP function of the first access network node, and the second apparatus is configured to perform a UP function of the first access network node. That the first access network node sends a notification message to a second access network node includes: The first access network node sends the notification message to the first apparatus. Based on this embodiment, the functions of the second access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the seventh aspect or the possible implementations of the seventh aspect, in another possible implementation, that a first access network node determines to deactivate an SCG or activate the SCG includes: The first access network node determines, based on any one or more of assistance information sent by the second base station, assistance information sent by the terminal, or a transmission situation of data carried by the first base station, to deactivate the SCG or activate the SCG. Based on this embodiment, the first access network node can determine, based on at least one of the assistance information sent by the second base station, the assistance information sent by the terminal, or the transmission situation of the data carried by the first base station, to deactivate the SCG or activate the SCG.

According to an eighth aspect of the embodiments of this application, a communication method is provided, where the method includes: A second access network node receives a notification message sent by a first access network node, where the notification message is used to instruct the second access network node to send first indication information to a second base station, and the first indication information is used to indicate the second base station to send an SCG deactivation command or an SCG activation command to a terminal, where the first access network node and the second access network node belong to a first base station, the first base station is an MN or an SN of the terminal during DC communication, and when the first base station is an MN, the second base station is an SN; or when the first base station is an SN, the second base station is an MN; and the SCG includes one or more cells managed by the SN; and the second access network node sends the first indication information to the second base station. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a DU and a CU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the eighth aspect, in a possible implementation, the second access network node includes a first apparatus and a second apparatus, the first apparatus is configured to perform a CP function of the first access network node, and the second apparatus is configured to perform a UP function of the first access network node. That a second access network node receives a notification message sent by a first access network node includes: The first apparatus receives the notification message sent by the first access network node. That the second access network node sends the first indication information to the second base station includes: The first apparatus sends the first indication information to the second base station. Based on this embodiment, the functions of the second access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the eighth aspect or the possible implementations of the eighth aspect, in another possible implementation, the method further includes: The first apparatus sends second indication information to the second apparatus, where the second indication information is used to indicate the second apparatus to deactivate the SCG or activate the SCG. Based on this embodiment, the CU-CP may send indication information to the CU-UP, to indicate the CU-UP to deactivate the SCG or activate the SCG.

With reference to any one of the possible implementations of the fifth aspect, the sixth aspect, the seventh aspect, and the eighth aspect, in another possible implementation, the first access network node is configured to perform functions of an RLC protocol stack, a MAC protocol stack, and a PHY protocol stack, and the second access network node is configured to perform functions of an RRC protocol stack, an SDAP protocol stack, and a PDCP layer. Based on this embodiment, according to protocol layers, the RLC protocol stack, the MAC protocol stack, and the PHY may be divided to the first access network node, and the RRC protocol stack, the SDAP protocol stack, and the PDCP layer may be divided to the second access network node. The first access network node may be a DU, and the second access network node may be a CU. A specific CU-DU division manner is not limited in the embodiments of this application, and is merely an example for description herein.

According to a ninth aspect of the embodiments of this application, a communication method is provided, where the method includes: A second base station receives first indication information sent by a second access network node, where the first indication information is used to indicate the second base station to send an SCG deactivation command or an SCG activation command to a terminal, where the second access network node belongs to a first base station, the second base station is an MN or an SN of the terminal during DC communication, and when the second base station is an MN, the first base station is an SN; or when the second base station is an SN, the first base station is an MN; and the SCG includes one or more cells managed by the SN; and the second base station sends the SCG deactivation command or the SCG activation command to the terminal. Based on this embodiment, a deactivation operation is performed on the SCG, so that SCG related configuration can be retained, and SCG link communication can be quickly recovered through an activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the second access network node may be respectively a CU of the MN or the SN. In other words, in this application, the MN or the SN performs signaling interaction in a CU-DU architecture, to implement the SCG deactivation and activation operations, and this embodiment can adapt to different network deployments, so that the SCG deactivation and activation operations are performed more flexibly.

With reference to the ninth aspect, in a possible implementation, the second access network node includes a first apparatus and a second apparatus, the first apparatus is configured to perform a CP function of the first access network node, and the second apparatus is configured to perform a UP function of the first access network node. That a second base station receives first indication information sent by a second access network node includes: The second base station receives the first indication information sent by the first apparatus. Based on this embodiment, the functions of the second access network node may be implemented by the first apparatus and the second apparatus. The first apparatus may be a CU-CP, and the second apparatus may be a CU-UP. In other words, in this embodiment, signaling interaction can be performed in an architecture in which the CU of the MN or the SN includes a CP and a UP, to implement the SCG deactivation and activation operations.

With reference to any one of the ninth aspect or the possible implementations of the ninth aspect, in another possible implementation, the second access network node is configured to perform functions of an RRC protocol stack, an SDAP protocol stack, and a PDCP layer. Based on this embodiment, according to protocol layers, the RRC protocol stack, the SDAP protocol stack, and the PDCP layer may be divided to the second access network node, and the second access network node may be a CU. A specific CU-DU division manner is not limited in the embodiments of this application, and is merely an example for description herein.

With reference to any one of the possible implementations of the first aspect, the second aspect, the third aspect, the fourth aspect, the fifth aspect, the sixth aspect, the seventh aspect, the eighth aspect, and the ninth aspect, in another possible implementation, the deactivating the SCG includes at least one of the following operations: stopping data transmission on an SCG radio link control (SCG RLC) bearer; stopping data transmission on a bearer, SN terminated bearer, whose PDCP is terminated at the SN; stopping data transmission on an SCG RLC entity (RLC entity); or stopping data transmission on an SN PDCP entity. Based on this embodiment, the deactivating the SCG may include at least one of stopping the data transmission on the SCG RLC bearer, stopping the data transmission on the SN terminated bearer, stopping the data transmission on the SCG RLC entity, or stopping the data transmission on the SN PDCP entity.

With reference to any one of the possible implementations of the first aspect, the second aspect, the third aspect, the fourth aspect, the fifth aspect, the sixth aspect, the seventh aspect, the eighth aspect, and the ninth aspect, in another possible implementation, the SCG deactivation command or the SCG activation command is carried in media access control control element (CE) (MAC CE), PHY signaling, or RRC signaling. Based on this embodiment, the SCG deactivation command or the SCG activation command may be carried in the MAC CE, the PHY signaling, or the RRC signaling.

According to a tenth aspect of the embodiments of this application, a computer storage medium is provided, where the computer storage medium stores computer program code, and when the computer program code is run on a processor, the processor is enabled to perform the communication method according to any one of the foregoing aspects.

According to an eleventh aspect of the embodiments of this application, a computer program product is provided, where the program product stores computer software instructions executed by the foregoing processor, and the computer software instructions include a program used to perform embodiments in the foregoing aspects.

According to a twelfth aspect of the embodiments of this application, a communication apparatus is provided. The apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support a terminal device or a communication device in implementing the communication method according to any one of the foregoing aspects.

According to a thirteenth aspect of the embodiments of this application, a communication apparatus is provided. The apparatus may exist in a product form of a chip. A structure of the apparatus includes a processor, and may further include a memory. The memory is configured to: be coupled to the processor, and store program instructions and data that are necessary for the apparatus. The processor is configured to execute the program instructions stored in the memory, to support a terminal device or a communication device in performing the method according to any one of the foregoing aspects.

According to a fourteenth aspect of the embodiments of this application, a communication apparatus is provided. The apparatus may exist in a product form of a chip. A structure of the apparatus includes a processor and an interface circuit. The processor is configured to communicate with another apparatus through the interface circuit, to enable the apparatus to perform the communication method according to any one of the foregoing aspects.

According to a fifteenth aspect of the embodiments of this application, a communication system is provided, and includes a first base station and a second base station. The first base station includes a first access network node and a second access network node, the first access network node is configured to perform the communication method according to the first aspect, and the second access network node is configured to perform the communication method according to the second aspect.

According to a sixteenth aspect of the embodiments of this application, a communication system is provided, and includes a first base station and a second base station. The first base station includes a first access network node and a second access network node, the first access network node is configured to perform the communication method according to the third aspect, and the second base station is configured to perform the communication method according to the fourth aspect.

According to a seventeenth aspect of the embodiments of this application, a communication system is provided, and includes a first base station and a second base station. The first base station includes a first access network node and a second access network node, the first access network node is configured to perform the communication method according to the fifth aspect, and the second access network node is configured to perform the communication method according to the sixth aspect.

According to an eighteenth aspect of the embodiments of this application, a communication system is provided, and includes a first base station and a second base station. The first base station includes a first access network node and a second access network node, the first access network node is configured to perform the communication method according to the seventh aspect, the second access network node is configured to perform the communication method according to the eighth aspect, and the second base station is configured to perform the communication method according to the ninth aspect.

DETAILED DESCRIPTION OF ILLUSTRATIVE EMBODIMENTS

Figure 1:
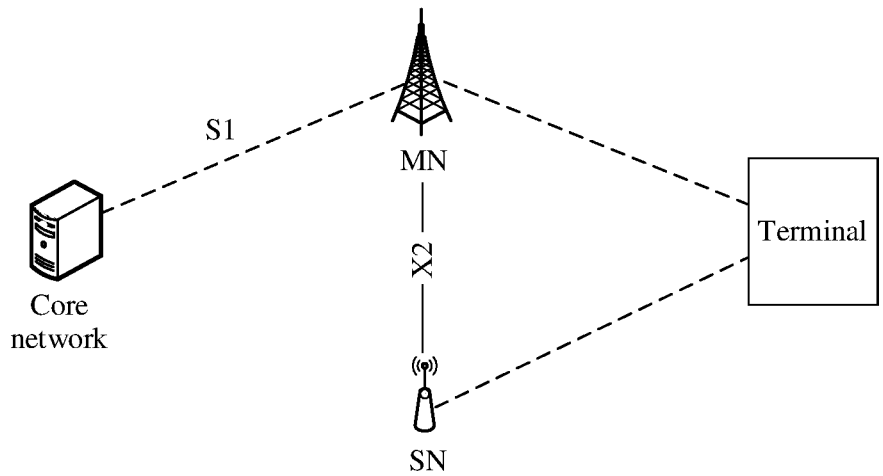
FIG. 1 is a schematic diagram of a structure of a communication system according to an embodiment of this application.

The following describes technical embodiments in embodiments of this application with reference to the accompanying drawings in the embodiments of this application. In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of the items, including any combination of singular items (pieces) or plural items (pieces). For example, at least one item (piece) of a, b, or c may represent a, b, c, a and b, a and c, b and c, or a, b, and c, where a, b, and c each may be singular or plural.

It should be noted that in this application, the term such as "example" or "for example" is used to represent giving an example, an illustration, or descriptions. Any embodiment or design scheme described as an "example" or "for example" in this application should not be explained as being more preferable or having more advantages than another embodiment or design scheme. Exactly, use of the word such as "example" or "for example" is intended to present a related concept in a specific manner.

As defined in the embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

The resource described in the embodiments of this application may also be referred to as a transmission resource, includes one or more of a time domain resource, a frequency domain resource, or a code channel resource, and may be used to carry data or signaling in an uplink communication process or a downlink communication process.

It should be understood that in the embodiments of the present invention, "B corresponding to A" indicates that B is associated with A, and B can be determined based on A. However, it should be further understood that determining B based on A does not mean that B is determined based on only A. B may alternatively be determined based on A and/or other information.

In the embodiments of this application, "a plurality of" means two or more than two.

Descriptions such as "first", "second" in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmission" (transmit/transmission) in the embodiments of this application refers to bidirectional transmission, and includes a sending action and/or a receiving action. Specifically, "transmission" in the embodiments of this application includes data sending, data receiving, or data sending and receiving. That is, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission.

In the embodiments of this application, a "network" and a "system" express a same concept, and a communication system is a communication network.

It may be understood that in the embodiments of this application, the terminal and/or a base station may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

A communication method provided in the embodiments of this application may be applied to a communication system shown in FIG. 1. As shown in FIG. 1, a terminal supports DC, and an MN and an SN jointly provide a data transmission service for the terminal. The MN is connected to a core network (CN) through an S1/NG interface. The MN may have at least a CP connection to the CN, and may further have a UP connection to the CN. The S1 interface includes S1-U/NG-U and S1-C/NG-C. The S1-U/NG-U represents the UP connection, and the S1-C/NG-C represents the CP connection. The SN may have a UP connection to the CN, or may not have the UP connection. When the SN does not have the UP connection to the CN, data of the terminal may be offloaded by the MN to the SN at a PDCP layer. The MN may also be referred to as a master base station or a master access network device, and the SN may also be referred to as a secondary base station or a secondary access network device.

The communication system in this application may be a long term evolution (LTE) wireless communication system, a 5th generation (5G) mobile communication system such as a new radio (NR) system, another next generation (NG) communication system, or the like. This is not limited in the embodiments of this application.

For example, the MN and the SN may each be a base station defined in the LTE 3rd generation partnership project (3GPP). For example, the MN and the SN may each be a base station device in the LTE system, namely, an evolved NodeB (eNB/eNodeB), or may be an access network side device in the NR system, including a gNB, a transmission/reception point (TRP), and the like.

For example, the MN and the SN may each include a CU and a DU. Protocol layers of the base station may be separated by using a CU-DU structure, and functions of some protocol layers are controlled by the CU in a centralized manner. Functions of some or all of the remaining protocol layers are distributed in the DU, and the CU controls the DU in the centralized manner. In this way, costs can be reduced and a network is easy to be extended. For example, the MN and the SN may each include one or more CUs and one or more DUs.

For example, the CU may be configured to perform a function of a higher layer protocol stack, and the DU is configured to perform a function of a lower layer protocol stack. The higher layer protocol stack may be a protocol stack above an RLC layer, and the lower layer protocol stack is a protocol stack below the RLC layer; the higher layer protocol stack may include a RRC protocol stack, an SDAP protocol stack, and a PDCP layer, and the lower layer protocol stack includes an RLC layer, a MAC layer, and a PHY; or the higher layer protocol stack may include an RRC protocol stack and an SDAP protocol stack, and the lower layer protocol stack includes a PDCP layer, an RLC layer, a MAC layer, and a PHY. Specific protocol stacks included in the higher layer protocol stack and the lower layer protocol stack are not limited in the embodiments of this application, and are merely described as examples herein.

Figure 2:
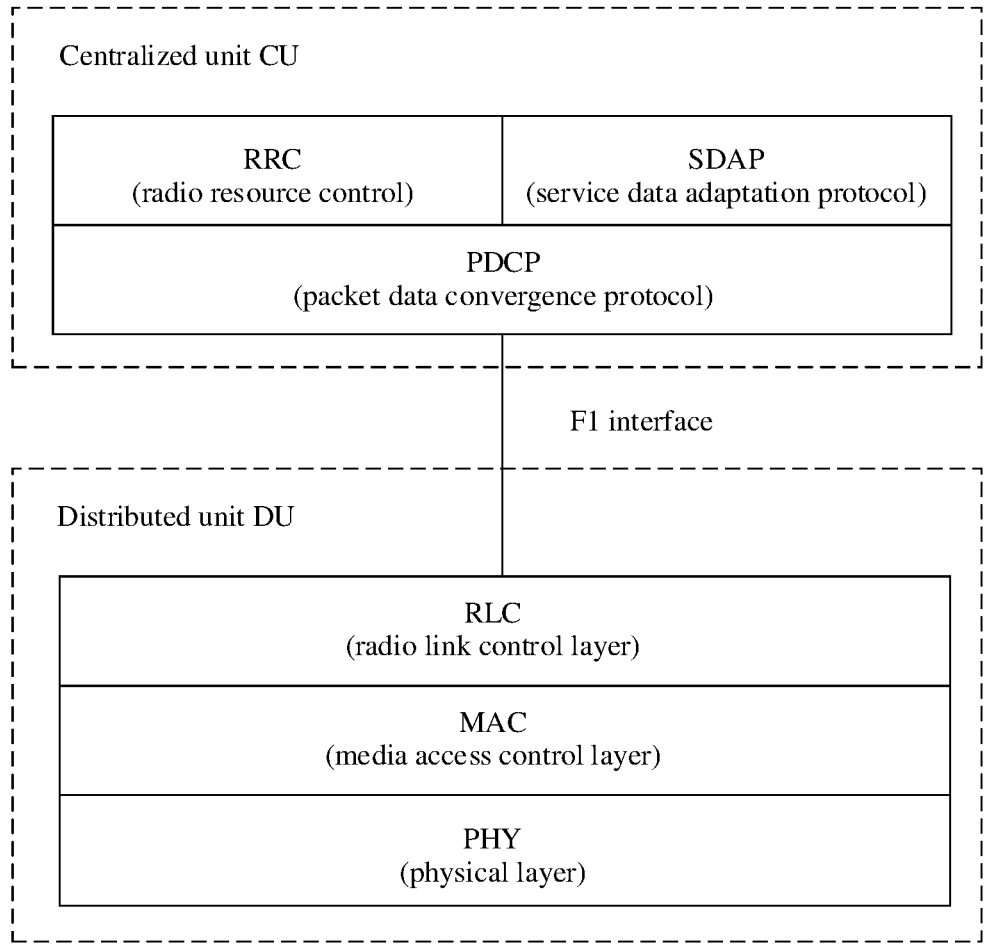
FIG. 2 is a schematic diagram of a CU-DU architecture according to an embodiment of this application.

For example, in a CU-DU architecture shown in FIG. 2, the CU is configured to perform functions of the RRC protocol stack, the SDAP protocol stack, and the PDCP layer, and the DU is configured to perform functions of the RLC layer, the MAC layer, the PHY, and the like. The CU and the DU are connected through an F1 interface.

Figure 3:
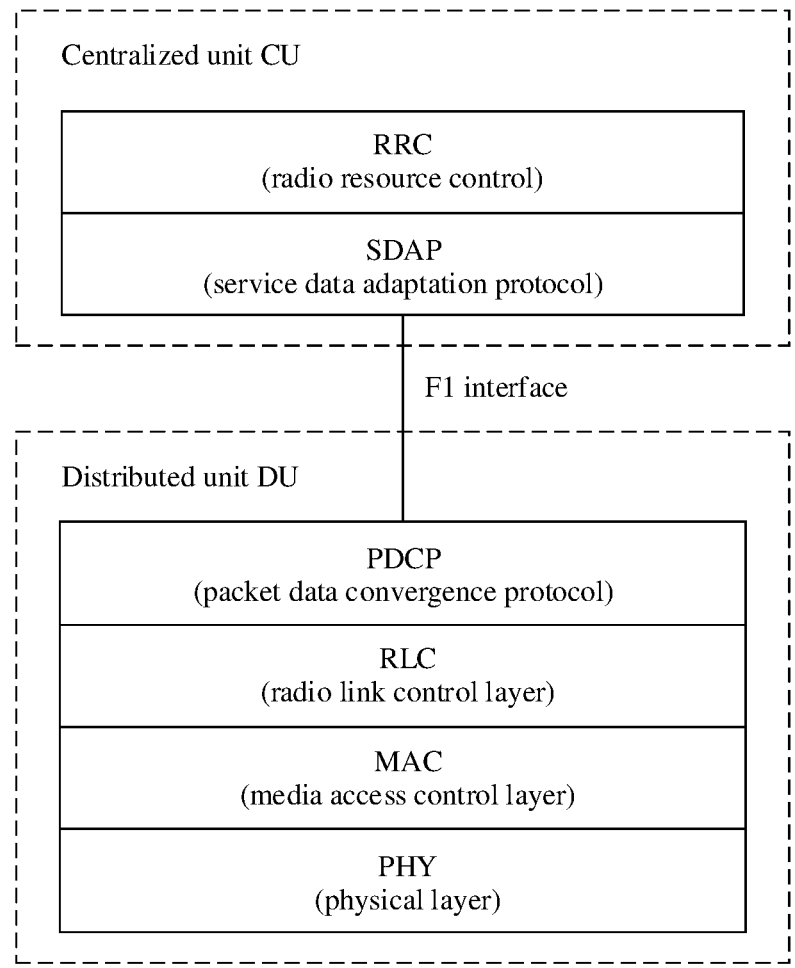
FIG. 3 is a schematic diagram of another CU-DU architecture according to an embodiment of this application.

For another example, in a CU-DU architecture shown in FIG. 3, the CU is configured to perform functions of the RRC protocol stack and the SDAP protocol stack, and the DU is configured to perform functions of the PDCP layer, the RLC layer, the MAC layer, the PHY, and the like.

It may be understood that schematic diagrams of the CU-DU architectures shown in FIG. 2 and FIG. 3 are merely descriptions of examples of division according to the protocol layers. A specific division manner of the CU-DU architecture is not limited in the embodiments of this application. For example, some functions of the RLC layer and a function of a protocol layer above the RLC layer are set on the CU, and remaining functions of the RLC layer and a function of a protocol layer below the RLC layer are set on the DU.

Figure 4:
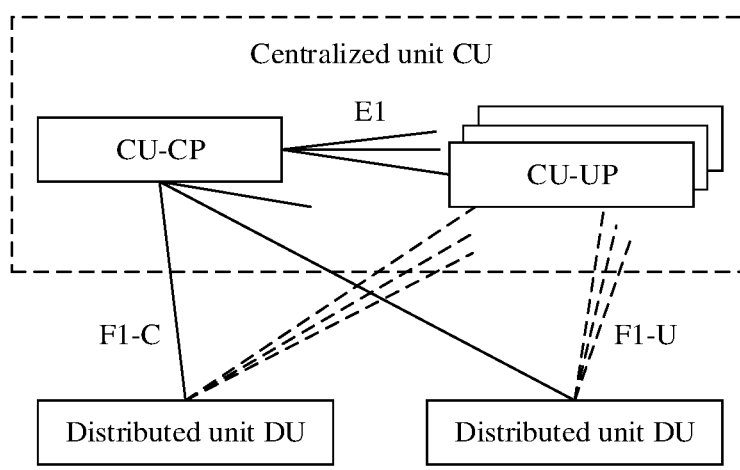
FIG. 4 is a schematic diagram of another CU-DU architecture according to an embodiment of this application.

For example, functions of the CU may be implemented by one entity, or may be implemented by different entities. For example, as shown in FIG. 4, in a CU-DU architecture, the CU may be further subdivided into a CU-CP and a CU-UP. The CU-CP and the CU-UP may be implemented by different functional entities. The CU-CP and the CU-UP may be coupled to the DU to jointly implement functions of the base station. As shown in FIG. 4, one base station may have one CU-CP, one or more CU-UPs, and one or more DUs. One CU-CP is connected to a plurality of CU-UPs through an E1 interface, one CU-CP may be connected to a plurality of DUs through an F1-C interface, and one DU may be connected to a plurality of CU-UPs through an F1-U interface. It may be understood that in FIG. 4, only an example in which the base station includes two DUs is used. The base station may be a 4G base station, or may be a 5G base station. This is not limited in this embodiment of this application.

It may be understood that the CU-DU architectures shown in FIG. 2 and FIG. 4 are merely examples for description. A specific composition of the CU-DU architecture is not limited in the embodiments of this application. Herein, only FIG. 2 to FIG. 4 are used as examples for description. In the following embodiments, only the CU-DU architecture shown in FIG. 2 is used as an example for description.

Figure 5A:
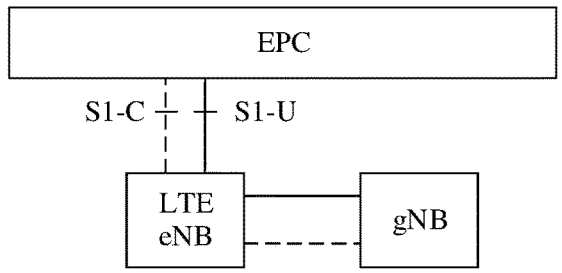
FIG. 5(a) and FIG. 5(b) are a schematic architectural diagram of a DC network according to an embodiment of this application.
Figure 5B:
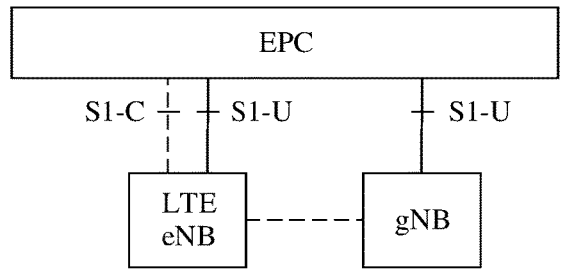

For example, DC may be implemented between access network devices of different standards. FIG. 5(a) and FIG. 5(b) are a schematic diagram of an LTE-NR DC (E-UTRA-NR Dual Connectivity, EN-DC) network. The EN-DC network is DC between a 4G radio access network and 5G NR. An LTE base station (LTE eNB) functions as an MN, and an NR base station (NR gNB) functions as an SN. As shown in FIG. 5(a) and FIG. 5(b), an S1 interface exists between the LTE eNB and an evolved packet core (EPC) in the LTE system, there is at least a CP connection, and there may also be a UP connection. As shown in FIG. 5(a) and FIG. 5(b), an S1-U interface exists between the NR gNB and the EPC, that is, there may be only the UP connection.

Figure 6A:
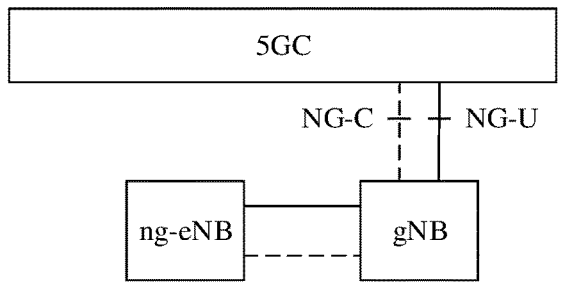
FIG. 6(a) and FIG. 6(b) are a schematic architectural diagram of another DC network according to an embodiment of this application.
Figure 6B:
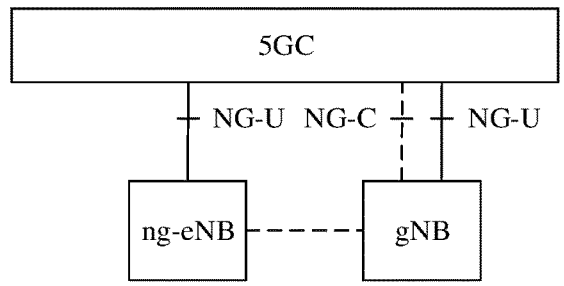

FIG. 6(a) and FIG. 6 (b schematic diagram of an NR-LTE DC (NR-E-UTRA Dual Connectivity, NE-DC) network. The NE-DC network is DC between a 4G radio access network and 5G NR in a 5G CN. An NR base station (gNB) functions as an MN, an LTE base station (ng-eNB) functions as an SN, and both the MN and the SN are connected to the 5G CN (5GC). As shown in FIG. 6(a) and FIG. 6(b), an NG interface exists between the gNB and the 5GC, and a CP connection and a UP connection may be established for a terminal. The ng-eNB sends UP data to the 5GC by using the gNB. As shown in FIG. 6(a) and FIG. 6(b), an NG-U interface exists between the ng-eNB and the 5GC, and only the UP connection is established for the terminal. The ng-eNB directly sends the UP data to the 5GC.

Figure 7A:
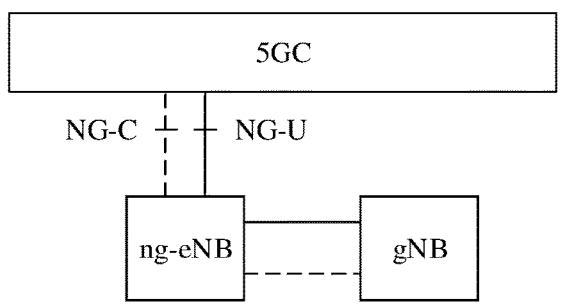
FIG. 7(a) and FIG. 7(b) are a schematic architectural diagram of another DC network according to an embodiment of this application.
Figure 7B:
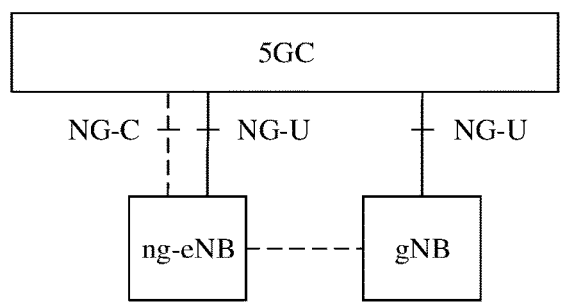

FIG. 7(a) and FIG. 7(b) are a schematic diagram of a 5G CN LTE-NR DC (Next Generation E-UTRA-NR Dual Connectivity, NGEN-DC) network. The NGEN-DC network is DC between a 4G radio access network and 5G NR in a 5G CN. An LTE base station (ng-eNB) functions as an MN, an NR base station (gNB) functions as an SN, and both the MN and the SN are connected to the 5GC. As shown in FIG. 7(a) and FIG. 7(b), an NG interface exists between the ng-eNB and the 5GC, and a CP connection and a UP connection may be established for a terminal. The gNB sends UP data to the 5GC by using the ng-eNB. As shown in FIG. 7(a) and FIG. 7(b), an NG-U interface exists between the gNB and the 5GC, and only the UP connection is established for the terminal. The gNB directly sends the UP data to the 5GC.

In the DC networks shown in FIG. 5(a) and FIG. 5(b) to FIG. 7(a) and FIG. 7(b), no UP connection may be established between the SN and the CN, and data is transferred by using the MN. For example, in a downlink direction, data of the terminal first arrives at the MN, and the MN offloads the data of the terminal to the SN at a PDCP layer. A form of the offloaded data is, for example, a PDCP protocol data unit (Protocol Data Unit, PDU).

It may be understood that the communication method provided in the embodiments of this application may be applied to conventional LTE DC, or may be applied to the EN-DC network, the NE-DC network, or the NGEN-DC network in a 5G system. The communication method may alternatively be applied to 5G CN NR-NR DC (NR-DC) and another future DC architecture. A specific architecture of a DC network to which the communication method is applied is not limited in the embodiments of this application. FIG. 5(a) and FIG. 5(b) to FIG. 7(a) and FIG. 7(b) are merely used as examples for description herein. In the following embodiments, an EN-DC network architecture is used as an example to describe the communication method provided in the embodiments of this application.

In DC, a data radio bearer (DRB) established between the terminal and an access network side may be independently provided by the MN or the SN, or may be provided by both the MN and the SN. A bearer on which an air interface resource is provided by the MN is referred to as a master cell group (MCG) bearer, where an MCG includes a cell managed by at least one MN configured to provide an air interface resource for the terminal. A bearer on which an air interface resource is provided by the SN is referred to as an SCG bearer, where an SCG includes a cell managed by at least one SN configured to provide an air interface resource for the terminal. In addition, a bearer on which an air interface resource is provided by both the MN and the SN is referred to as a split bearer.

When there is only one cell in the MCG, the cell is a primary cell (PCell) of the terminal. When there is only one cell in the SCG, the cell is a primary secondary cell (PSCell) of the terminal. The PCell and the PSCell may be collectively referred to as a special cell (SpCell). When there are a plurality of cells in the MCG or the SCG, all cells other than the SpCell may be referred to as secondary cells (SCells). In this case, an SCell and a SpCell in each cell group perform carrier aggregation (CA) to jointly provide a transmission resource for the terminal. The PSCell is a cell, in which the UE is indicated to perform random access or initial PUSCH transmission, in cells of the SCG. The SCell is a cell that works on a secondary carrier. Once an RRC connection is established, the SCell may be configured to provide an additional radio resource.

Figure 8:
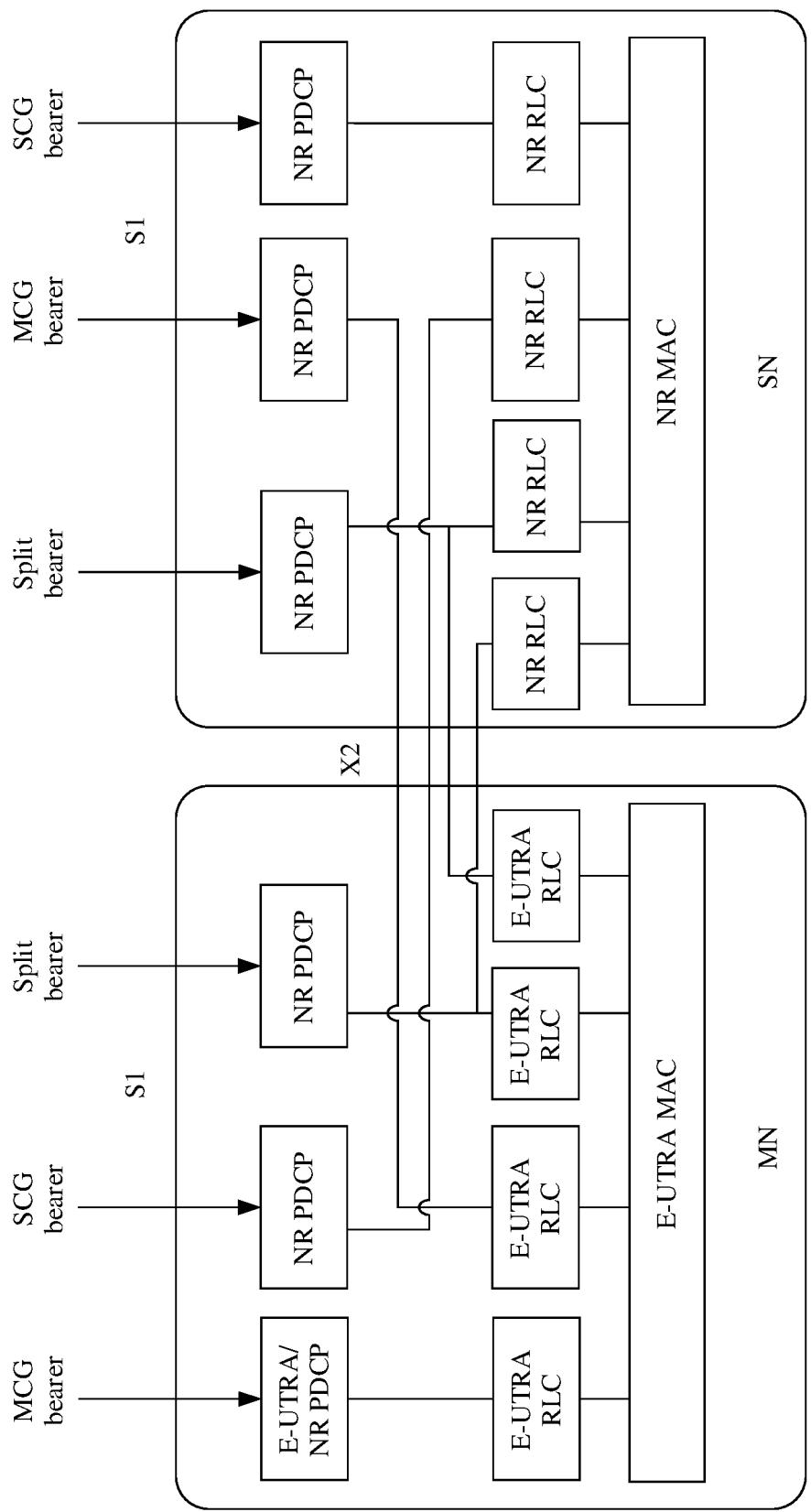
FIG. 8 is a schematic diagram of a UP architecture in an EN-DC network architecture according to an embodiment of this application.
Figure 9:
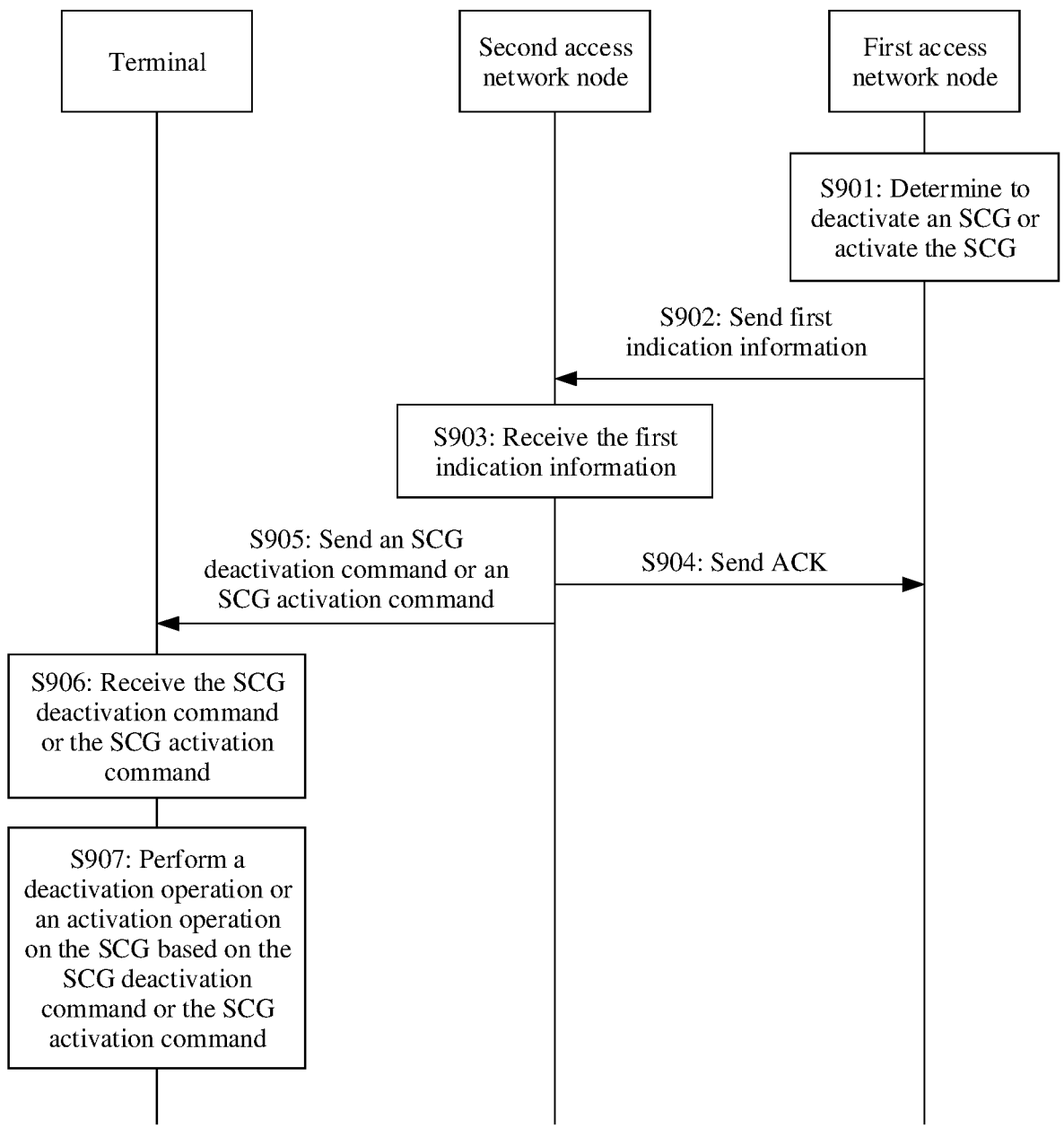
FIG. 9 is a schematic flowchart of a communication method according to an embodiment of this application.

The following uses the EN-DC network as an example to describe a UP architecture in the EN-DC network architecture. As shown in FIG. 8, in the EN-DC network, a data radio bearer may be independently served by the MN or the SN, or may be served by both the MN and the SN. When a bearer on which an air interface resource is provided only by the MN, that is, a data flow flows only from a CN to the MN, the bearer is an MCG bearer. When a bearer on which an air interface resource is provided only by the SN, that is, a data flow flows only from a CN to the SN, the bearer is an SCG bearer. When a bearer on which an air interface resource is provided by both the MN and the SN, that is, a data flow is offloaded at the MN or the SN, the bearer is a split bearer.

For example, with reference to FIG. 8, each bearer type has corresponding PDCP layer processing and RLC layer processing. An RLC bearer transmitted through an MCG air interface resource is referred to as an MCG RLC bearer, and an RLC bearer transmitted through an SCG air interface resource is referred to as an SCG RLC bearer. In FIG. 8, a PDCP entity may be terminated at the MN, or may be terminated at the SN. A bearer whose PDCP is terminated at the MN is referred to as an MN terminated bearer. In other words, downlink data directly arrives at the MN from the CN, and is processed by the PDCP of the MN and then sent to the terminal through the RLC bearer. Similarly, a bearer whose PDCP is terminated at the SN is referred to as an SN terminated bearer. In other words, downlink data directly arrives at the SN from the CN, and is processed by the PDCP of the SN and then sent to the terminal through the RLC bearer.

For example, depending on whether the PDCP entity is established at the MN or the SN, a bearer in DC may be further classified into the following types: an MCG bearer terminated at the MN (MN terminated MCG Bearer), an SCG bearer terminated at the MN (MN terminated SCG Bearer), a split bearer terminated at the MN (MN terminated split Bearer), an MCG bearer terminated at the SN (SN terminated MCG Bearer), an SCG bearer terminated at the SN (SN terminated SCG Bearer), and a split bearer terminated at the SN (SN terminated split Bearer). For a bearer terminated at the MN, a PDCP entity is established at the MN, and a UP connection to the CN is terminated at the MN, that is, the MN is used as an anchor (anchor). For a bearer terminated at the SN, a PDCP entity is established at the SN, and a UP connection to the CN is terminated at the SN, that is, the SN is used as an anchor. It may be understood that whether a bearer is terminated at the MN or the SN indicates that whether data transmission with the CN is performed by using the MN or the SN, and an air interface transmission resource is provided by the MCG or the SCG. For example, if the MN terminated SCG bearer is used, downlink data delivered by the CN is processed by a PDCP layer of the MN, and all the downlink data is transferred to an RLC layer and a MAC layer of the SN for further processing and then sent to the terminal by using the SCG. Correspondingly, uplink data sent by the terminal is processed by the MAC layer and the RLC layer of the SN, and all the uplink data is transferred to the PDCP layer of the MN for processing and then sent to a CN device through an interface between the MN and the CN. If the MN terminated split bearer is used, after downlink data delivered by the CN is processed by a PDCP layer of the MN, a part of the data is transferred to the SN and then sent to the terminal by using the SCG, and the rest is still sent by the MN to the terminal by using the MCG. Correspondingly, a part of uplink data sent by the terminal is sent to the MN by using the MCG, and the other part is sent to the SN by using the SCG. The two parts of data are converged at the PDCP layer of the MN for processing, and are sent to a CN device through an interface between the MN and the CN.

In a process of DC communication between the terminal and the MN and SN, a network side configures the terminal to perform a DC operation when the terminal is in a high data rate state, that is, perform SN addition. When the terminal enters a low data rate state, the network side configures the terminal to release the DC operation, that is, perform SN release, to save power of the network device and the terminal device. However, when an SN release procedure is used to release the DC operation for the terminal, and an SN addition procedure is used to re-add the SN for the terminal, because interaction, of a plurality of pieces of information, between the MN and the SN are in the SN addition and SN release procedures, configuration given by the SN to the terminal may not need to be updated, and the terminal may continue to use the original configuration, frequent SN addition and release increase overheads of air interface signaling, cause a large delay, and consequently reduce communication efficiency. In addition, when the MN and the SN are in a CU-DU split architecture, a problem of high power consumption, of the base station and the terminal, caused by maintaining a dual link of DC for a long time is urgently to be resolved.

To resolve the problem in a conventional technology that frequent SN addition and release increase overheads of air interface signaling, cause a large delay, and consequently reduce communication efficiency, and the problem of high power consumption, of the base station and the terminal, caused by maintaining the dual link of DC for a long time when the MN and the SN are in the CU-DU split architecture, the embodiments of this application provide a communication method, to reduce power consumption of the network device and the terminal while reducing the overheads of air interface signaling and the delay. In addition, the method can adapt to different network deployments, and processing in the method is more flexible.

With reference to FIG. 1 to FIG. 8, FIG. 9 shows a communication method according to an embodiment of this application. The communication method includes steps S901 to S907.

S901: A first access network node determines to deactivate an SCG or activate the SCG.

For example, the first access network node belongs to a first base station, the first base station is an MN or an SN of a terminal during DC communication, and the SCG includes one or more cells managed by the SN. The first access network node is a CU of the first base station. For example, the first access network node may be an MN CU or an SN CU. To be specific, when the first base station is in a CU-DU architecture, the first access network node is a CU of the first base station.

For example, the deactivating the SCG may also be suspending (suspend) SCG configuration, and the activating the SCG is recovering the suspended SCG configuration. Suspending means stopping or breaking off. After the SCG configuration is suspended, data is not transmitted by using the SCG. For example, the deactivating the SCG may include at least one of the following operations: stopping data transmission on an SCG RLC bearer; stopping data transmission on an SN terminated bearer; stopping data transmission on an SCG RLC entity (RLC entity); or stopping data transmission on an SN PDCP entity. The activating the SCG may include at least one of the following operations: recovering the data transmission on the SCG RLC bearer; recovering the data transmission on the SN terminated bearer; recovering the data transmission on the SCG RLC entity; and recovering the data transmission on the SN PDCP entity.

For example, that a first access network node determines to deactivate an SCG or activate the SCG in step S901 may include: The first access network node determines, based on any one or more of assistance information sent by a second base station, assistance information sent by the terminal, or a transmission situation of data carried by the first base station, to deactivate the SCG or activate the SCG. When the first base station is an MN, the second base station is an SN; or when the first base station is an SN, the second base station is an MN. For example, step S901 may include: The MN CU determines, based on any one or more of assistance information sent by the SN, assistance information sent by the terminal, or a transmission situation of data carried by the MN, to deactivate the SCG or activate the SCG. For another example, step S901 may alternatively include: The SN CU determines, based on any one or more of assistance information sent by the MN, assistance information sent by the terminal, or a transmission situation of data carried by the SN, to deactivate the SCG or activate the SCG.

For example, the assistance information sent by the MN/SN may include a power saving indication. The assistance information sent by the terminal may include an active status of SCG data of the terminal, a power saving requirement of the terminal, or an indication that is of the terminal and that indicates the first base station to suspend the SCG configuration. The active status of the SCG data may be measured by using a data amount, for example, whether there is data, or whether the data amount is high, medium, or low.

For example, the first access network node may determine, based on a power saving indication sent by the second base station, to deactivate the SCG, to reduce power consumption of the base station and the terminal. For another example, the first access network node may determine, based on a power saving indication sent by the terminal, to deactivate the SCG. For another example, the first access network node may determine, based on an indication that is sent by the terminal and that indicates to suspend the SCG, to deactivate the SCG. For another example, the first access network node may determine, based on a data amount that is sent by the terminal and that is transmitted by the terminal by using the SCG, to deactivate the SCG or activate the SCG. If the data amount transmitted by the terminal by using the SCG is less than a preset threshold, the first access network node determines to deactivate the SCG. If the data amount transmitted by the terminal by using the SCG is greater than or equal to a preset threshold, the first access network node determines to activate the SCG.

Optionally, when the first access network node determines, based on the assistance information sent by the second base station and/or the assistance information sent by the terminal, to deactivate the SCG or activate the SCG, before step S901, the method may further include: The first access network node receives the assistance information sent by the second base station and/or receives the assistance information sent by the terminal. For example, when the first access network node is an SN CU, the SN CU may receive the assistance information sent by the terminal, where the assistance information may be carried in a signaling radio bearer named as SRB 3, and the SRB 3 is a radio bearer between the terminal and the SN; or the terminal sends the MN a signaling radio bearer named as SRB 1 including the assistance information, and then the MN sends the SRB 1 to the SN CU, where the SRB 1 is a radio bearer between the terminal and the MN.

For example, when the first base station is an SN, that a first access network node determines to deactivate an SCG or activate the SCG includes: The first access network node deactivates the SCG or activates the SCG. For example, that the first access network node determines to deactivate the SCG may include at least one of the following operations: stopping data transmission on an SCG RLC bearer; stopping data transmission on an SN terminated bearer; stopping data transmission on an SCG RLC entity; or stopping data transmission on an SN PDCP entity. For example, when the first access network node is an SN CU, the CU-DU architecture shown in FIG. 2 is used as an example, a PDCP layer is deployed on the CU, the SN CU determines to suspend the SN terminated bearer, and the SN CU may stop the data transmission on the SN terminated bearer; and/or the SN CU determines, based on assistance information sent by the SN DU, to suspend the SCG RLC bearer, and the SN CU may stop the data transmission on the SCG RLC bearer. For another example, when the first access network node is an MN CU, the CU-DU architecture shown in FIG. 2 is used as an example, a PDCP layer is deployed on the CU, the MN CU determines, based on the assistance information sent by the SN, to suspend the SN terminated bearer and/or the SCG RLC bearer, and the MN CU may stop the data transmission on the SN terminated bearer and/or the SCG RLC bearer.

Optionally, when the first base station is an MN, that a first access network node determines to deactivate an SCG or activate the SCG includes: The first access network node suspends/recovers a data transmission tunnel on an X2/Xn interface corresponding to a bearer established at the SN.

S902: The first access network node sends first indication information to a second access network node, where the first indication information is used to indicate the second access network node to send an SCG deactivation command or an SCG activation command to the terminal.

The second access network node and the first access network node both belong to the first base station. For example, the second access network node may be an MN DU or an SN DU. To be specific, when the first base station is in the CU-DU architecture, the second access network node is a DU of the first base station. That is, the first access network node and the second access network node may be respectively a CU and a DU of the first base station.

For example, when the first base station is an MN, step S902 specifically includes: The MN CU sends the first indication information to the MN DU, to indicate the MN DU to send the SCG deactivation command or the SCG activation command to the terminal.

For example, when the first base station is an SN, step S902 specifically includes: The SN CU sends the first indication information to the SN DU, to indicate the SN DU to send the SCG deactivation command or the SCG activation command to the terminal.

For example, the SCG deactivation command may also be referred to as an SCG deactivation indication, and the SCG activation command may also be referred to as an SCG activation indication. This is not limited in this embodiment of this application.

S903: The second access network node receives the first indication information.

For example, when the first base station is an MN, step S903 specifically includes: The MN DU receives the first indication information sent by the MN CU.

For example, when the first base station is an SN, step S903 specifically includes: The SN DU receives the first indication information sent by the SN CU.

Optionally, when the first base station is an SN, after receiving the first indication information, the second access network node may further deactivate the SCG or activate the SCG. For example, after receiving the first indication information, the second access network node may perform at least one of the following operations: stopping the data transmission on the SCG RLC bearer; stopping the data transmission on the SN terminated bearer; stopping the data transmission on the SCG RLC entity; or stopping the data transmission on the SN PDCP entity. For example, when the second access network node is an SN DU, the CU-DU architecture shown in FIG. 2 is used as an example, an RLC layer is deployed on the DU. If the SN CU determines to suspend the SCG RLC bearer in step S901, the SN DU may stop the data transmission on the SCG RLC bearer.

Optionally, when the first base station is an MN, after receiving the first indication information, the second access network node may further suspend/recover the data transmission tunnel on the X2/Xn interface corresponding to the bearer established at the SN. For example, when the second access network node is an MN DU, the CU-DU architecture shown in FIG. 2 is used as an example, an RLC layer is deployed on the DU. If the MN CU determines to suspend an SN terminated MCG RLC bearer in step S901, the MN DU may suspend a data transmission tunnel on an X2/Xn interface corresponding to the SN terminated MCG RLC bearer. It may be understood that in this embodiment of this application, suspending the SN terminated MCG RLC bearer is suspending a PDCP entity of the SN terminated bearer, or suspending a PDCP entity on the SN.

Optionally, in an implementation of this application, the method further includes: S904: The second access network node sends an acknowledgement (Acknowledgement, ACK) message to the first access network node.

The ACK message is used to indicate that the second access network node successfully receives the first indication information sent by the first access network node.

For example, when the first base station is an MN, step S904 specifically includes: The MN DU sends the ACK message to the MN CU.

For example, when the first base station is an SN, step S904 specifically includes: The SN DU sends the ACK message to the SN CU.

S905: The second access network node sends the SCG deactivation command or the SCG activation command to the terminal.

For example, the SN DU or the MN DU sends the SCG deactivation command or the SCG activation command to the terminal.

For example, the SCG deactivation command is used to instruct the terminal to deactivate the SCG. The deactivating the SCG may be that the terminal temporarily stops transmitting data by using an SCG communication link, but the terminal retains or stores a part or all of configuration of the SN, to quickly recover the SCG communication link. Deactivation (deactivation) may also be referred to as suspending (suspending) or hibernation.

For example, the SCG activation command is used to indicate the terminal to activate the SCG. That the terminal activates the SCG may be that the terminal recovers the configuration of the SN, and transmits data by using the SCG communication link. Activation may also be referred to as recovery (resumption/recovery).

For example, the SCG deactivation command or the SCG activation command may be carried in a MAC CE (control element), PHY signaling, or RRC signaling. For example, the PHY signaling may be downlink control information (DCI). Optionally, the deactivation command or the activation command may be one or more bits in the MAC CE. The MAC CE may be a MAC CE used to indicate that an SCell is in a deactivated state or an activated state, or may be a MAC CE specially designed for the deactivation command. This is not limited in this embodiment of this application.

S906: The terminal receives the SCG deactivation command or the SCG activation command.

For example, the terminal receives the SCG deactivation command or the SCG activation command sent by the MN DU or the SN DU.

Optionally, when the SCG deactivation command or the SCG activation command is carried in the MAC CE, when the terminal receives the MAC CE, the terminal may read content of the MAC CE, and determine, based on the MAC CE, to deactivate the SCG or activate the SCG. A bit in the MAC CE indicates that a PSCell is in a deactivated state/an activated state, and another bit is used to indicate a status of an SCell.

S907: The terminal performs a deactivation operation or an activation operation on the SCG based on the SCG deactivation command or the SCG activation command.

For example, when the terminal performs the SCG deactivation operation on the SCG, the terminal retains the SCG configuration, and the SCG configuration is used for DC communication between the SN and the terminal.

For example, that the terminal performs an SCG deactivation operation on the SCG may include: The terminal suspends the SCG RLC bearer corresponding to a bearer established at the SN and/or suspends the PDCP entity of the SN terminated bearer. The SCG RLC bearer may be an SCG RLC bearer corresponding to the SN terminated bearer and/or an SCG RLC bearer corresponding to an MN terminated bearer, namely, an SN terminated SCG RLC bearer and/or an MN terminated SCG RLC bearer. The suspending the SCG RLC bearer and the PDCP entity of the SN terminated bearer is suspending all SN terminated bearers. Suspending may be not transmitting data by using the SCG RLC bearer and/or the PDCP entity of the SN terminated bearer, or may be stopping providing an air interface transmission resource of the SCG to the terminal. It may be understood that in this embodiment of this application, suspending the MN terminated SCG RLC bearer is suspending the SCG RLC bearer, suspending the SN terminated MCG RLC bearer is suspending the PDCP entity of the SN terminated bearer or suspending the PDCP entity on the SN.

Optionally, on the basis of suspending the SCG RLC bearer, the terminal may continue to suspend a PDCP entity/an SDAP entity of the SN. In other words, data processing and transmission are not performed by using the PDCP/SDAP entity of the SN. Specifically, suspending the PDCP/SDAP entity may be implemented by freezing the PDCP/SDAP entity or recovering (recovery) the PDCP/SDAP entity. It may be understood that the PDCP/SDAP entity of the SN may be shared with the MN or used independently by the SN. This is not limited in this embodiment of this application. The PDCP/SDAP entity of the SN may also be referred to as the PDCP/SDAP entity terminated at the SN.

For example, when the terminal performs the activation operation on the SCG, SCG configuration reserved during the deactivation operation performed on the SCG is used in DC communication between the SN and the terminal. That is, the terminal reapplies the stored SCG configuration used for DC.

For example, that the terminal performs an SCG activation operation on the SCG may include: The terminal recovers (recovery) the SCG RLC bearer corresponding to the bearer established at the SN and/or recovers the PDCP entity of the SN terminated bearer. That is, the terminal continues to transmit data by using the SCG RLC bearer and/or the PDCP entity of the SN terminated bearer. That is, the terminal may reuse an air interface resource of the SN.

It may be understood that the deactivation operation corresponds to the activation operation in this application. After performing a deactivation operation on the SCG, the terminal performs a corresponding activation (recovery) operation when activating the SCG. For example, deactivating (suspending) the SCG RLC bearer corresponds to activating (recovering) the SCG RLC bearer. For descriptions of each activation (recovery) operation performed by the terminal, refer to the foregoing corresponding deactivation operation. Similar content is not described again. It should be noted that when the terminal considers, by default based on a deactivation indication, that all SCells are in a deactivated state, when performing the SCG activation operation, the terminal may activate (recover) all the SCells, or may activate (recover) only one or more of the SCells based on a requirement.

According to the communication method provided in this embodiment of this application, the first access network node determines to deactivate the SCG or activate the SCG. The first access network node sends the first indication information to the second access network node, where the first indication information is used to indicate the second access network node to send the SCG deactivation command or the SCG activation command to the terminal. The second access network node receives the first indication information. The second access network node sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that the SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the first access network node and the second access network node may be respectively a CU and a DU of the MN or the SN. In other words, in this embodiment, the MN or the SN performs signaling interaction in the CU-DU architecture, to implement the SCG deactivation and activation operations, and this embodiment can adapt to different network deployments, so that the SCG deactivation and activation operations are performed more flexibly.

Figure 10:
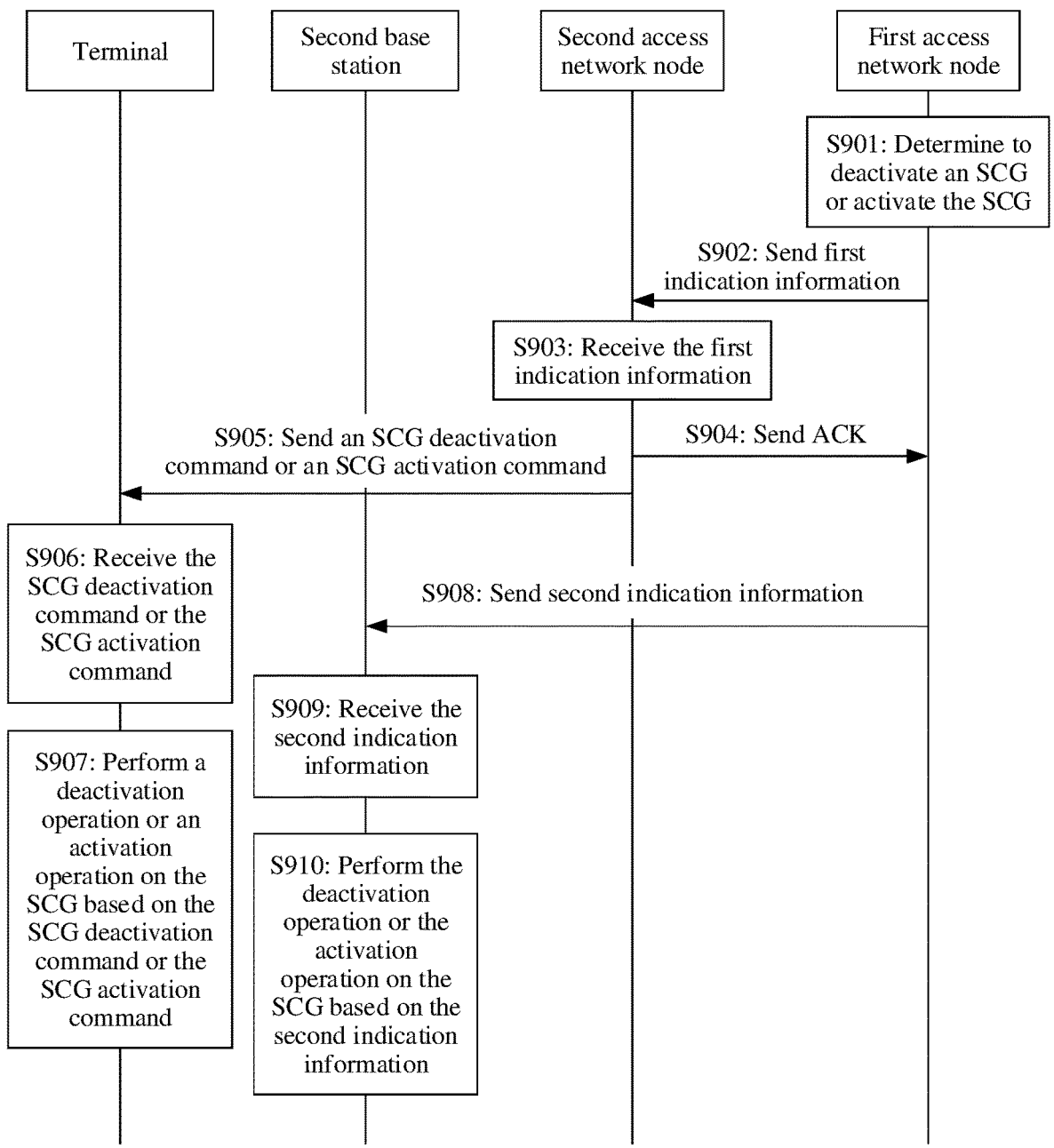
FIG. 10 is a schematic flowchart of another communication method according to an embodiment of this application.

Optionally, when the first base station is an MN, and the second base station is an SN, the first access network node is an MN CU, and the second access network node is an MN DU. As shown in FIG. 10, on the basis of steps S901 to S907, the method may further include steps S908 to S910.

S908: The first access network node sends second indication information to the second base station, where the second indication information is used to indicate the second base station to deactivate the SCG or activate the SCG.

For example, the MN determines that a suspended bearer is the SCG RLC bearer and/or the PDCP entity of the SN terminated bearer, and the MN CU sends the second indication information to the SN, to indicate the SN to deactivate the SCG or activate the SCG.

Optionally, when the second base station is in the CU-DU architecture, step S908 includes: The MN CU sends the second indication information to the SN CU. Alternatively, step S908 may further include: The MN CU sends the second indication information to the SN CU, and the SN CU instructs the SN DU to deactivate the SCG or activate the SCG. For example, when the MN determines that a suspended bearer is the PDCP entity of the SN terminated bearer, and the PDCP layer is divided to the SN CU, the MN CU sends the second indication information to the SN CU; when the MN determines that a suspended bearer is the SCG RLC bearer, and the RLC layer is divided to the SN DU, the MN CU sends the second indication information to the SN CU, and the SN CU instructs the SN DU to deactivate the SCG or activate the SCG.

For example, the MN determines that a suspended bearer is the SN terminated MCG RLC bearer, and a CU-DU architecture of the SN is shown in FIG. 2. The PDCP layer is deployed on the CU, and the MN CU sends the second indication information to the SN CU. For another example, the MN determines that a suspended bearer is the MN terminated SCG RLC bearer, and a CU-DU architecture of the SN is shown in FIG. 2. The RLC layer is deployed on the DU, the MN CU sends the second indication information to the SN CU, and the SN CU instructs the SN DU to deactivate the SCG or activate the SCG.

Optionally, step S908 may be performed before step S902, or may be performed after step S902, or step S908 and step S902 may be simultaneously performed. An execution sequence of step S908 and step S902 is not limited in this embodiment of this application.

S909: The second base station receives the second indication information.

For example, the SN receives the second indication information sent by the MN CU.

For example, when the second base station is in the CU-DU architecture, step S909 includes: The SN CU receives the second indication information sent by the MN CU. Alternatively, step S909 includes: The SN CU receives the second indication information sent by the MN CU, and the SN DU receives a notification message sent by the SN CU, to instruct the SN DU to deactivate the SCG or activate the SCG.

Optionally, after step S909, the second base station may send an ACK message to the first access network node, to indicate that the second base station successfully receives the second indication information sent by the first access network node.

S910: The second base station performs the deactivation operation or the activation operation on the SCG based on the second indication information.

For example, when the second base station is in the CU-DU architecture, step S910 includes: The SN CU deactivates the SCG or activates the SCG; and/or the SN DU deactivates the SCG or activates the SCG.

For example, when the MN determines that a suspended bearer is the PDCP entity of the SN terminated bearer, and the PDCP layer is divided to the SN CU, the SN CU suspends or recovers the bearer; when the MN determines that a suspended bearer is the SCG RLC bearer, and the RLC layer is divided to the SN DU, the SN DU suspends or recovers the bearer.

For example, the MN determines that a suspended bearer is the SN terminated MCG RLC bearer, and a CU-DU architecture of the SN is shown in FIG. 2. The PDCP layer is deployed on the CU, the MN CU sends the second indication information to the SN CU, and after the SN CU receives the second indication information sent by the MN CU, the SN CU suspends or recovers the PDCP entity of the SN terminated bearer. For another example, the MN determines that a suspended bearer is the MN terminated SCG RLC bearer, and a CU-DU architecture of the SN is shown in FIG. 2. The RLC layer is deployed on the DU, and the MN CU sends the second indication information to the SN CU. The SN CU instructs the SN DU to deactivate the SCG or activate the SCG, and the SN DU suspends or recovers the SCG RLC bearer.

It may be understood that in this embodiment, when determining to deactivate the SCG or activate the SCG, the MN notifies the SN, and indicates the SN to deactivate the SCG or activate the SCG, so that the SN can retain the SCG related configuration, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 11:
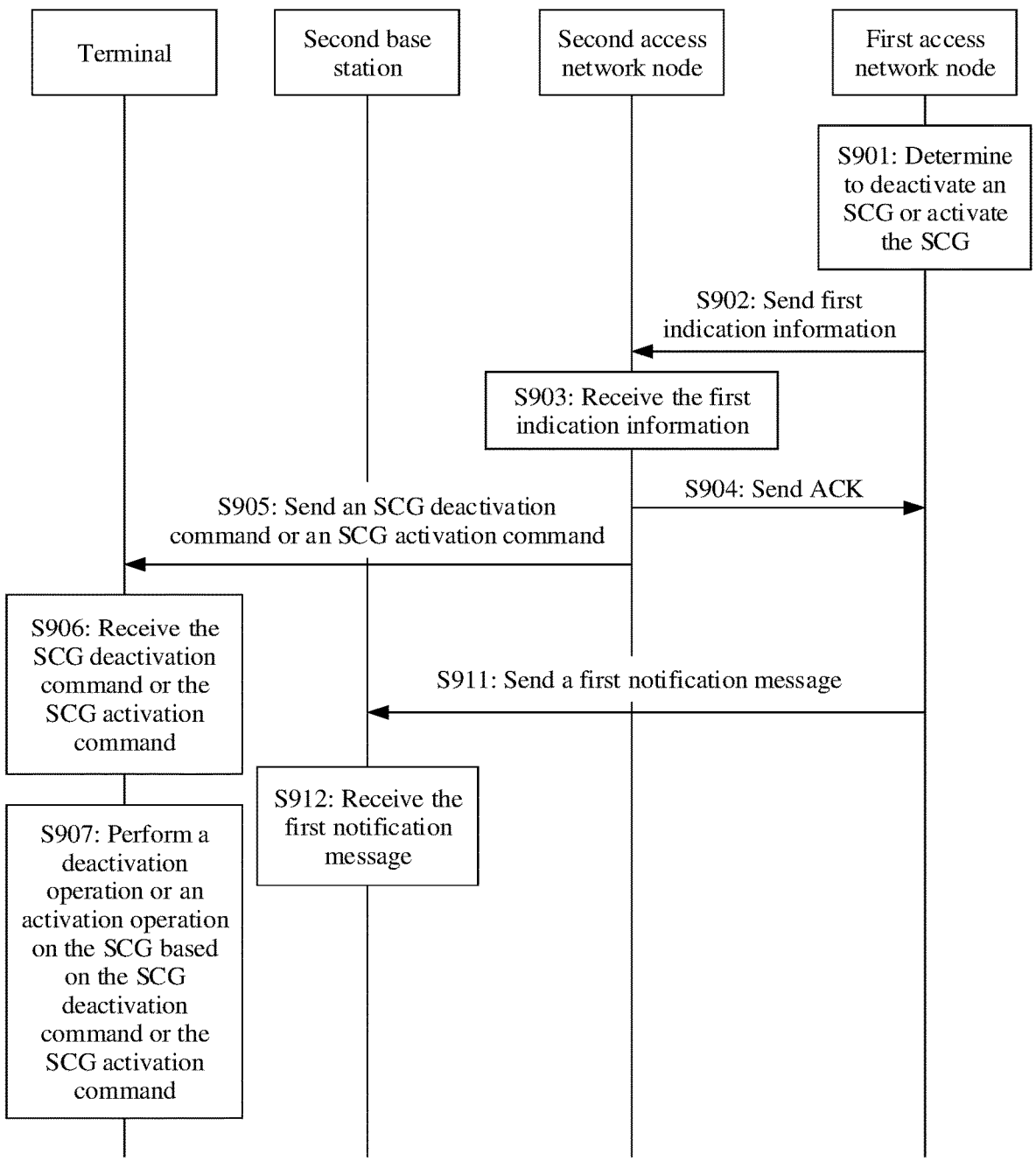
FIG. 11 is a schematic flowchart of another communication method according to an embodiment of this application.

Optionally, when the first base station is an SN, and the second base station is an MN, the first access network node is an SN CU, and the second access network node is an SN DU. As shown in FIG. 11, on the basis of steps S901 to S907, the method may further include steps S911 and S912.

S911: The first access network node sends a first notification message to the second base station, where the first notification message is used to notify the second base station that the first base station deactivates the SCG or activates the SCG.

For example, the SN determines that a suspended bearer is the MN terminated SCG RLC bearer and/or the SN terminated MCG RLC bearer, and the SN CU sends the first notification message to the MN, to notify the MN that the SN deactivates the SCG or activates the SCG.

Optionally, when the second base station is in the CU-DU architecture, step S911 includes: The SN CU sends the first notification message to the MN CU. Alternatively, step S911 may further include: The SN CU sends the first notification message to the MN CU, and the MN CU instructs the MN DU to send the notification message, to notify the MN DU that the SN deactivates the SCG or activates the SCG.

For example, when the SN determines that a suspended bearer is a PDCP entity of the MN terminated bearer, and the PDCP layer is divided to the MN CU, the SN CU sends the first notification message to the MN CU; when the SN determines that a suspended bearer is an MCG RLC bearer, and the RLC layer is divided to the MN DU, the SN CU sends the first notification message to the MN CU, and the MN CU notifies the MN DU that the SN deactivates the SCG or activates the SCG.

For example, the SN determines that a suspended bearer is the MN terminated SCG RLC bearer, and a CU-DU architecture of the MN is shown in FIG. 2. The PDCP layer is deployed on the CU, and the SN CU sends the first notification message to the MN CU. For another example, the SN determines that a suspended bearer is the SN terminated MCG RLC bearer, and a CU-DU architecture of the MN is shown in FIG. 2. The RLC layer is deployed on the DU, the SN CU sends the first notification message to the MN CU, and the MN CU notifies the MN DU that the SN deactivates the SCG or activates the SCG.

Optionally, step S911 may be performed before step S902, or may be performed after step S902, or step S911 and step S902 may be simultaneously performed. An execution sequence of step S911 and step S902 is not limited in this embodiment of this application.

S912: The second base station receives the first notification message sent by the first access network node.

For example, the MN receives the first notification message sent by the SN CU.

For example, when the second base station is in the CU-DU architecture, step S912 includes: The MN CU receives the first notification message sent by the SN CU. Alternatively, step S912 includes: The MN CU receives the first notification message sent by the SN CU, and the MN DU receives the notification message sent by the MN CU, to notify the MN DU that the SN deactivates the SCG or activates the SCG.

Optionally, after step S912, the method may further include: The MN suspends/recovers the data transmission tunnel on the X2/Xn interface corresponding to the bearer established at the SN. For example, the SN determines that a suspended bearer is the MN terminated SCG RLC bearer. When the SN suspends the SCG RLC bearer, the MN may further suspend a data transmission tunnel on an X2/Xn interface corresponding to the MN terminated SCG RLC bearer. For another example, the SN determines that a suspended bearer is the SN terminated MCG RLC bearer. When the SN suspends the PDCP entity of the SN terminated bearer, the MN may further suspend the data transmission tunnel on the X2/Xn interface corresponding to the SN terminated MCG RLC bearer.

It may be understood that, when the SN determines that a suspended bearer is the MN terminated SCG RLC bearer, after the SN suspends the SCG RLC bearer, the MN may further suspend the data transmission tunnel on the X2/Xn interface corresponding to the MN terminated SCG RLC bearer; when the SN determines that a suspended bearer is the SN terminated MCG RLC bearer, after the SN suspends the PDCP entity of the SN terminated bearer, the MN may further suspend the data transmission tunnel on the X2/Xn interface corresponding to the SN terminated MCG RLC bearer.

Optionally, after step S912, the second base station may send an ACK message to the first access network node, to indicate that the second base station successfully receives the first notification message sent by the first access network node.

It may be understood that in this embodiment, when determining to deactivate the SCG or activate the SCG, the SN notifies the MN, so that the MN may suspend/recover the data transmission tunnel on the X2/Xn interface corresponding to the bearer established at the SN. In this embodiment, the SCG related configuration can be retained, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 12:
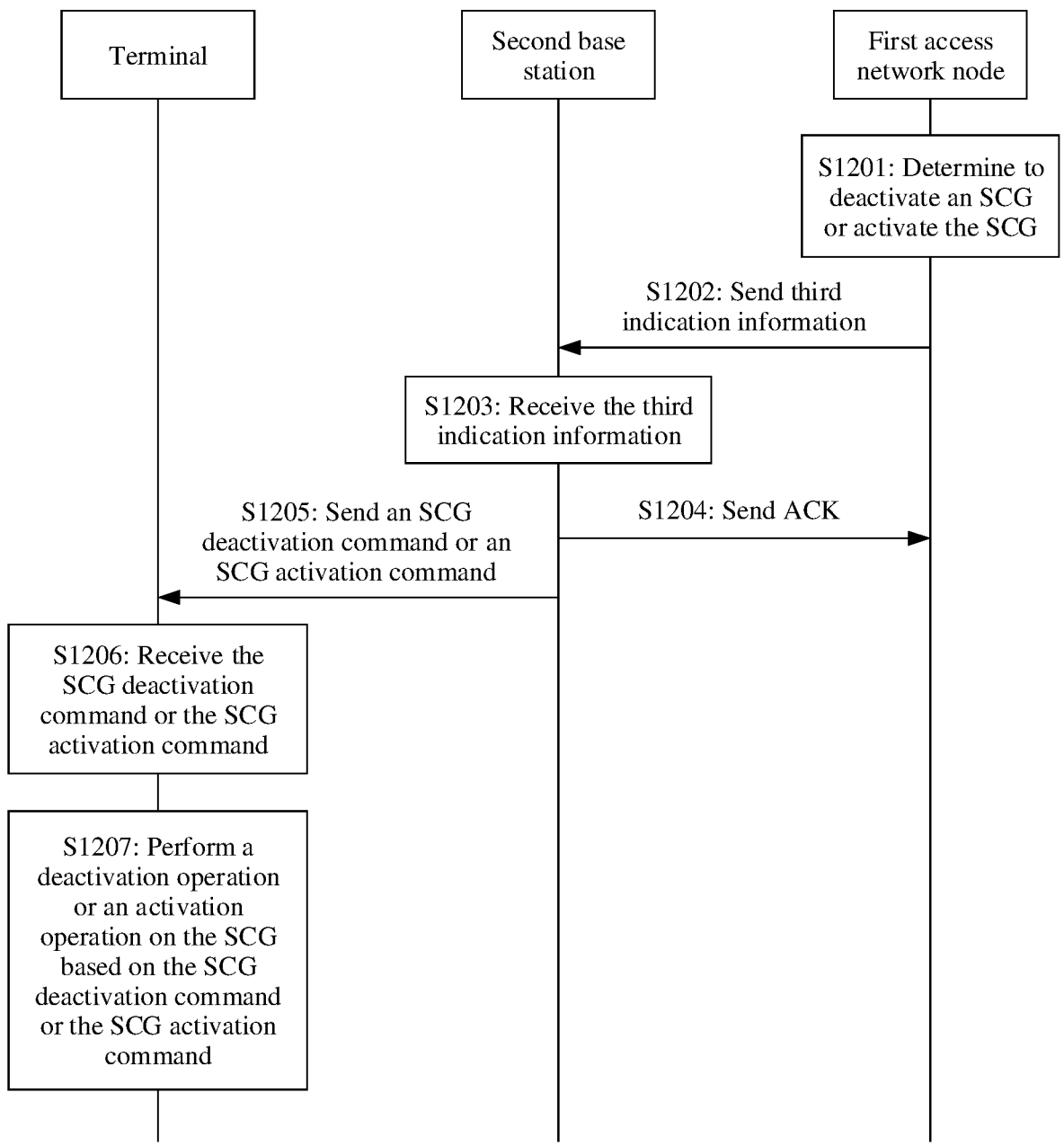
FIG. 12 is a schematic flowchart of another communication method according to an embodiment of this application.

An embodiment of this application further provides a communication method. As shown in FIG. 12, the communication method includes steps S1201 to S1207.

S1201: A first access network node determines to deactivate an SCG or activate the SCG.

For example, the first access network node belongs to a first base station, the first base station is an MN or an SN of a terminal during DC communication, and the SCG includes one or more cells managed by the SN. The first access network node is a CU of the first base station. For example, the first access network node may be an MN CU or an SN CU.

It may be understood that, for a specific implementation in which the first access network node determines to deactivate the SCG or activate the SCG in step S1201, refer to related descriptions in step S901. Details are not described herein again.

S1202: The first access network node sends third indication information to a second base station, where the third indication information is used to indicate the second base station to send an SCG deactivation command or an SCG activation command to a terminal.

The second base station is an MN or an SN of the terminal during DC communication. When the second base station is an MN, the first base station is an SN; or when the second base station is an SN, the first base station is an MN.

In an implementation, the first base station is an MN, and the second base station is an SN. Step S1202 may include: The MN CU sends the third indication information to the SN, to indicate the SN to send the SCG deactivation command or the SCG activation command to the terminal. Optionally, the second base station may be in a CU-DU architecture. When the second base station is in the CU-DU architecture, step S1202 includes: The MN CU sends the third indication information to the SN CU, to indicate the SN CU to instruct an SN DU to send the SCG deactivation command or the SCG activation command to the terminal.

In another implementation, the first base station is an SN, and the second base station is an MN. Step S1202 may include: The SN CU sends the third indication information to the MN, to indicate the MN to send the SCG deactivation command or the SCG activation command to the terminal. Optionally, the second base station may be in a CU-DU architecture. When the second base station is in the CU-DU architecture, step S1202 includes: The SN CU sends the third indication information to the MN CU, to indicate the MN CU to instruct an MN DU to send the SCG deactivation command or the SCG activation command to the terminal.

S1203: The second base station receives the third indication information.

For example, when the first base station is an MN, and the second base station is an SN, the SN receives the third indication information sent by the MN CU. Optionally, when the second base station is in the CU-DU architecture, the SN CU receives the third indication information sent by the MN CU, and the SN DU receives a notification message sent by the SN CU, to instruct the SN DU to send the SCG deactivation command or the SCG activation command to the terminal.

Optionally, after the second base station (SN) receives the third indication information, the method further includes: The SN performs a deactivation operation or an activation operation on the SCG. When the SN is in the CU-DU architecture, specifically, the SN CU and/or the SN DU perform/performs the deactivation operation or the activation operation on the SCG.

For example, when the first base station is an SN, and the second base station is an MN, the MN receives the third indication information sent by the SN CU. Optionally, when the second base station may be in the CU-DU architecture, the MN CU receives the third indication information sent by the SN CU, and the MN DU receives a notification message sent by the MN CU, to instruct the MN DU to send the SCG deactivation command or the SCG activation command to the terminal.

Optionally, after the second base station (MN) receives the third indication information, the method further includes: The MN suspends/recovers a data transmission tunnel on an X2/Xn interface corresponding to a bearer established at the SN. When the MN is in the CU-DU architecture, specifically, the MN CU suspends/recovers and/or the MN DU suspends/recovers the data transmission tunnel on the X2/Xn interface corresponding to the bearer established at the SN.

Optionally, in an implementation of this application, the method further includes: S1204: The second base station sends an ACK message to the first access network node.

The ACK message is used to indicate that the second base station successfully receives the third indication information sent by the first access network node.

For example, when the first base station is an MN, and the second base station is an SN, step S1204 specifically includes: The SN sends the ACK message to the MN CU. Optionally, when the second base station is in the CU-DU architecture, the SN CU sends the ACK message to the MN CU, and the SN DU sends the ACK message to the SN CU.

For example, when the first base station is an SN, and the second base station is an MN, step S1204 specifically includes: The MN sends the ACK message to the SN CU. Optionally, when the second base station is in the CU-DU architecture, the MN CU sends the ACK message to the SN CU, and the MN DU sends the ACK message to the MN CU.

S1205: The second base station sends the SCG deactivation command or the SCG activation command to the terminal.

For example, when the first base station is an MN, and the second base station is an SN, step S1205 specifically includes: The SN sends the SCG deactivation command or the SCG activation command to the terminal. Optionally, when the second base station is in the CU-DU architecture, specifically, the SN DU sends the SCG deactivation command or the SCG activation command to the terminal.

For example, when the first base station is an SN, and the second base station is an MN, step S1205 specifically includes: The MN sends the SCG deactivation command or the SCG activation command to the terminal. Optionally, when the second base station is in the CU-DU architecture, specifically, the MN DU sends the SCG deactivation command or the SCG activation command to the terminal.

It may be understood that, for related descriptions of the SCG deactivation command or the SCG activation command, a manner of carrying the SCG deactivation command or the SCG activation command, and the like, refer to step S905. Details are not described herein again.

S1206: The terminal receives the SCG deactivation command or the SCG activation command.

For example, the terminal receives the SCG deactivation command or the SCG activation command sent by the MN or the SN. When the MN is in a CU-DU split architecture, specifically, the terminal receives the SCG deactivation command or the SCG activation command sent by the MN DU. When the SN is in the CU-DU split architecture, specifically, the terminal receives the SCG deactivation command or the SCG activation command sent by the SN DU.

S1207: The terminal performs the deactivation operation or the activation operation on the SCG based on the SCG deactivation command or the SCG activation command.

It may be understood that, for a specific implementation of step S1207, refer to step S907. Details are not described herein again.

According to the communication method provided in this embodiment of this application, the first access network node determines to deactivate the SCG or activate the SCG. The first access network node sends the third indication information to the second base station, where the third indication information is used to indicate the second base station to send the SCG deactivation command or the SCG activation command to the terminal. The second base station receives the third indication information. The second base station sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the MN or the SN performs signaling interaction in the CU-DU architecture, to implement the SCG deactivation and activation operations, and this embodiment can adapt to different network deployments, so that the SCG deactivation and activation operations are performed more flexibly.

Figure 13:
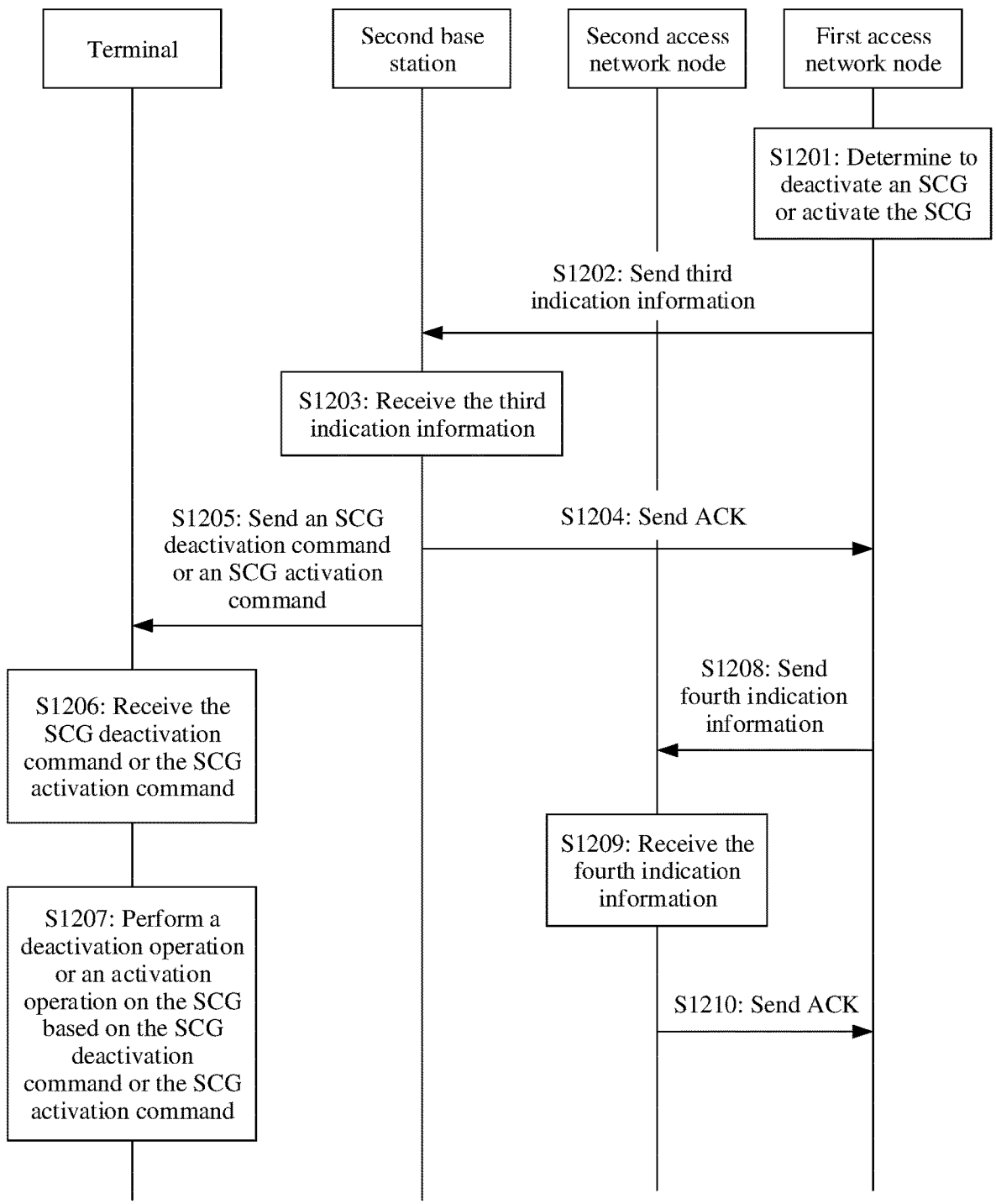
FIG. 13 is a schematic flowchart of another communication method according to an embodiment of this application.

Optionally, as shown in FIG. 13, on the basis of steps S1201 to S1207, the method may further include steps S1208 to S1210.

S1208: The first access network node sends fourth indication information to a second access network node.

The fourth indication information is used to indicate the second access network node to deactivate the SCG or activate the SCG, or the fourth indication information is used to notify the second access network node that the SN deactivates the SCG or activates the SCG.

The second access network node and the first access network node both belong to the first base station. For example, the second access network node may be an MN DU or an SN DU.

For example, when the first base station is an MN, step S1208 includes: The MN CU sends the fourth indication information to the MN DU, to notify the MN DU that the SN deactivates the SCG or activates the SCG.

For example, when the first base station is an SN, step S1208 includes: The SN CU sends the fourth indication information to the SN DU, to indicate the SN DU to deactivate the SCG or activate the SCG.

It may be understood that, when the first base station is an SN, when the SN CU determines that a suspended or recovered bearer is a PDCP entity of an SN terminated bearer, and a PDCP layer is divided to the SN DU, the SN CU may send the fourth indication information to the SN DU, to indicate the SN DU to deactivate the SCG or activate the SCG.

Optionally, step S1208 may be performed before step S1202, or may be performed after step S1202, or step S1208 and step S1202 may be simultaneously performed. An execution sequence of step S1208 and step S1202 is not limited in this embodiment of this application.

S1209: The second access network node receives the fourth indication information.

For example, when the first base station is an MN, step S1209 includes: The MN DU receives the fourth indication information sent by the MN CU. Optionally, after the MN DU receives the fourth indication information, the method further includes: The MN DU suspends/recovers the data transmission tunnel on the X2/Xn interface corresponding to the bearer established at the SN.

For example, when the first base station is an SN, step S1209 includes: The SN DU receives the fourth indication information sent by the SN CU. Optionally, after the SN DU receives the fourth indication information, the method further includes: The SN DU performs the deactivation operation or the activation operation on the SCG.

Optionally, in an implementation of this application, the method further includes: S1210: The second access network node sends an ACK message to the first access network node.

The ACK message is used to indicate that the second access network node successfully receives the fourth indication information sent by the first access network node.

For example, when the first base station is an MN, step S1210 includes: The MN DU sends the ACK message to the MN CU. When the first base station is an SN, step S1210 includes: The SN DU sends the ACK message to the SN CU.

It may be understood that in this embodiment, when the first base station is an SN, when determining to deactivate the SCG or activate the SCG, the first access network node notifies the second access network node, so that the first access network node determines that the suspended or recovered bearer is an SCG RLC bearer. In addition, when an RLC layer is divided to the second access network node, the second access network node may perform a deactivation operation or an activation operation on the bearer. When the first base station is the MN, when determining to deactivate the SCG or activate the SCG, the first access network node notifies the second access network node, so that the second access network node suspends/recovers the data transmission tunnel on the X2/Xn interface corresponding to the bearer established at the SN. In this embodiment, the SN can retain the SCG related configuration, and the SCG link communication can be quickly recovered through the activation operation, so as to reduce the overheads of air interface signaling and the delay while reducing the power consumption of the network side and the terminal, thereby improving the communication efficiency.

Figure 14:
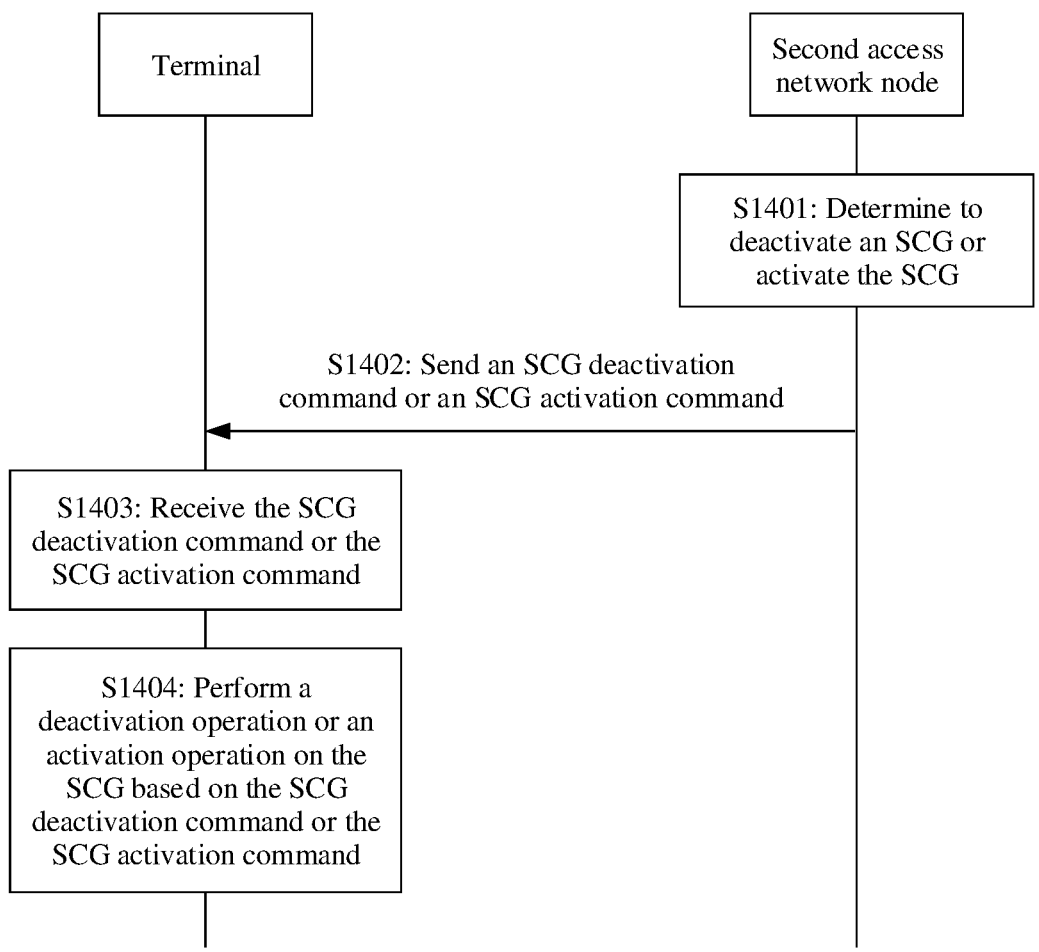
FIG. 14 is a schematic flowchart of another communication method according to an embodiment of this application.

An embodiment of this application further provides a communication method. As shown in FIG. 14, the method may include steps S1401 to S1404.

S1401: A second access network node determines to deactivate an SCG or activate the SCG.

For example, the second access network node belongs to a first base station, the first base station is an MN or an SN of a terminal during DC communication, and the SCG includes one or more cells managed by the SN. The second access network node is a DU of the first base station. For example, the second access network node may be an MN DU or an SN DU.

It may be understood that, for a specific implementation in which the second access network node determines to deactivate the SCG or activate the SCG in step S1401, refer to the implementation in which the first access network node determines to deactivate the SCG or activate the SCG in step S901. Details are not described herein again.

S1402: The second access network node sends an SCG deactivation command or an SCG activation command to the terminal.

For example, the MN DU or the SN DU sends the SCG deactivation command or the SCG activation command to the terminal.

It may be understood that, for related descriptions of the SCG deactivation command or the SCG activation command, a manner of carrying the SCG deactivation command or the SCG activation command, and the like, refer to step S905. Details are not described herein again.

S1403: The terminal receives the SCG deactivation command or the SCG activation command.

For example, the terminal receives the SCG deactivation command or the SCG activation command sent by the MN DU or the SN DU.

S1404: The terminal performs a deactivation operation or an activation operation on the SCG based on the SCG deactivation command or the SCG activation command.

It may be understood that, for a specific implementation of step S1404, refer to step S907. Details are not described herein again.

According to the communication method provided in this embodiment of this application, the second access network node determines to deactivate the SCG or activate the SCG. The second access network node sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform an SN addition or release, so as to reduce overheads of air interface signaling and a delay while reducing power consumption of a network side and the terminal, thereby improving communication efficiency. In addition, the MN or the SN performs signaling interaction in a CU-DU architecture, to implement the SCG deactivation and activation operations, and this embodiment can adapt to different network deployments, so that the SCG deactivation and activation operations are performed more flexibly.

Figure 15:
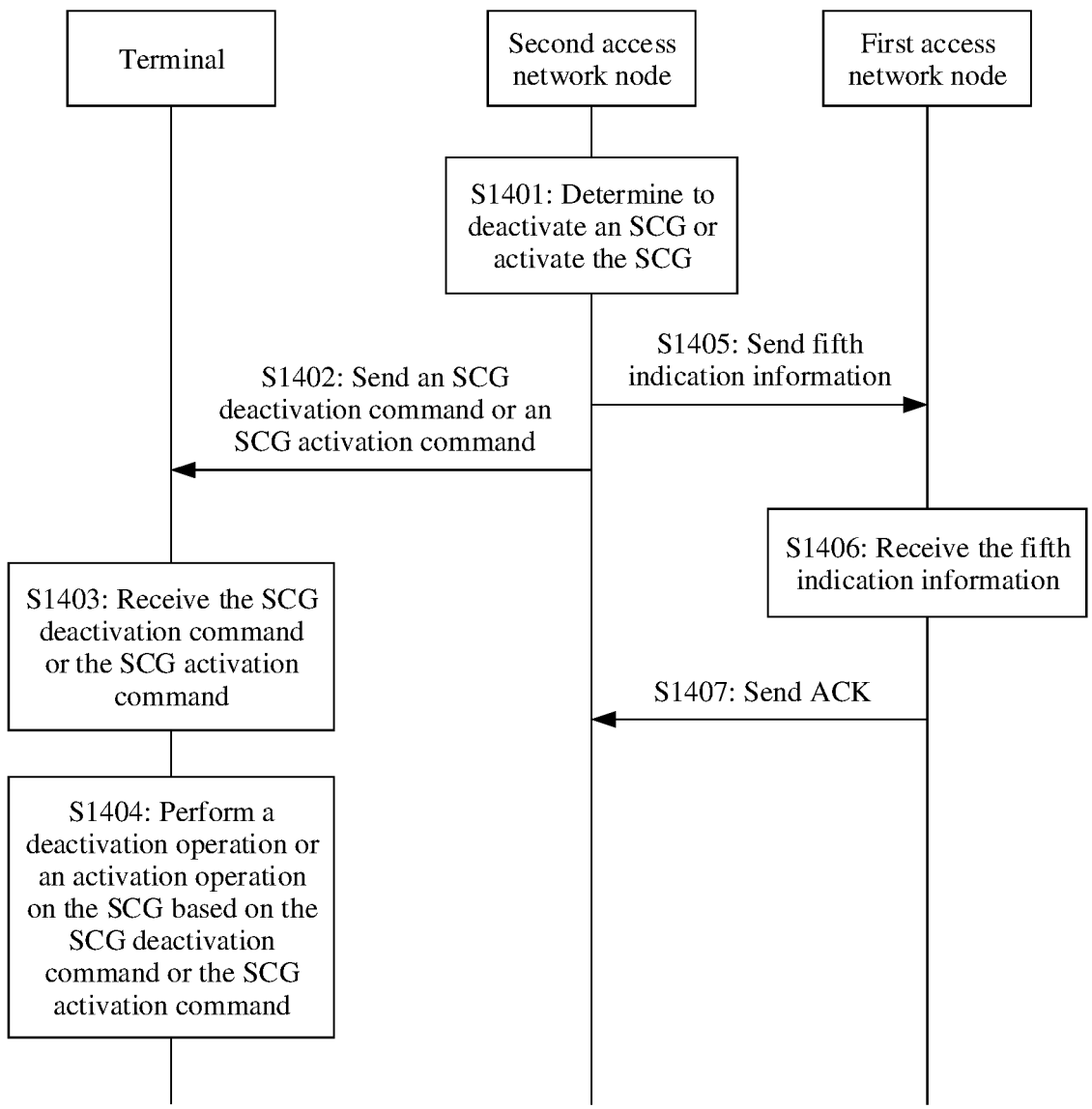
FIG. 15 is a schematic flowchart of another communication method according to an embodiment of this application.

Optionally, as shown in FIG. 15, on the basis of steps S1401 to S1404, the method may further include S1405 to S1407.

S1405: The second access network node sends fifth indication information to a first access network node.

The fifth indication information is used to indicate the first access network node to deactivate the SCG or activate the SCG, or the fifth indication information is used to notify the second access network node that the SN deactivates the SCG or activates the SCG.

The first access network node also belongs to the first base station. For example, the first access network node may be an MN CU or an SN CU.

For example, when the first base station is an MN, step S1405 includes: The MN DU sends the fifth indication information to the MN CU, to notify the MN CU that the SN deactivates the SCG or activates the SCG.

Optionally, the first access network node may include a first apparatus and a second apparatus, the first apparatus is configured to perform a CP function of the first access network node, and the second apparatus is configured to perform a UP function of the first access network node. For example, the first apparatus is an MN CU-CP, and the second apparatus is an MN CU-UP. Step S1405 includes: The MN DU sends the fifth indication information to the MN CU-CP, to notify the MN CU-CP that the SN deactivates the SCG or activates the SCG; or the MN DU sends the fifth indication information to the MN CU-CP, and the MN CU-CP notifies the MN CU-UP that the SN deactivates the SCG or activates the SCG.

For example, when the first base station is an SN, step S1405 includes: The SN DU sends the fifth indication information to the SN CU, to indicate the SN CU to deactivate the SCG or activate the SCG.

Optionally, the first access network node may include a first apparatus and a second apparatus, the first apparatus is configured to perform a CP function of the first access network node, and the second apparatus is configured to perform a UP function of the first access network node. For example, the first apparatus is an SN CU-CP, and the second apparatus is an SN CU-UP. Step S1405 includes: The SN DU sends the fifth indication information to the SN CU-CP, to indicate the SN CU-CP to deactivate the SCG or activate the SCG; or the SN DU sends the fifth indication information to the SN CU-CP, and the SN CU-CP instructs the SN CU-UP to deactivate the SCG or activate the SCG.

It may be understood that in this embodiment, when the first base station is an SN, when the second access network node determines that a suspended or recovered bearer is an SCG RLC bearer, and an RLC layer is divided to the first access network node, the second access network node may send the fifth indication information to the first access network node, to indicate the first access network node to deactivate the SCG or activate the SCG. When the first base station is an MN, when determining to deactivate the SCG or activate the SCG, the second access network node notifies the first access network node, so that the first access network node suspends/recovers a data transmission tunnel on an X2/Xn interface corresponding to a bearer established at the SN.

Optionally, step S1405 may be performed before step S1402, or may be performed after step S1402, or step S1405 and step S1402 may be simultaneously performed. An execution sequence of step S1405 and step S1402 is not limited in this embodiment of this application.

S1406: The first access network node receives the fifth indication information.

For example, when the first base station is an MN, step S1406 includes: The MN CU receives the fifth indication information sent by the MN DU. When the first apparatus included in the first access network node (MN CU) is an MN CU-CP, and the second apparatus included in the first access network node is an MN CU-UP, step S1406 includes: The MN CU-CP receives the fifth indication information sent by the MN DU; or the MN CU-CP receives the fifth indication information sent by the MN DU, and the MN CU-UP receives a notification message sent by the MN CU-CP, to deactivate the SCG or activate the SCG. Optionally, after the MN CU receives the fifth indication information, the method further includes: The MN CU suspends/recovers the data transmission tunnel on the X2/Xn interface corresponding to the bearer established at the SN. Specifically, the MN CU-CP suspends/recovers and/or the MN CU-UP suspends/recovers the data transmission tunnel on the X2/Xn interface corresponding to the bearer established at the SN.

For example, when the first base station is an SN, step S1406 includes: The SN CU receives the fifth indication information sent by the SN DU. When the first apparatus included in the first access network node (SN CU) is an SN CU-CP, and the second apparatus included in the first access network node is an SN CU-UP, step S1406 includes: The SN CU-CP receives the fifth indication information sent by the SN DU; or the SN CU-CP receives the fifth indication information sent by the SN DU, and the SN CU-UP receives a notification message sent by the SN CU-CP, to deactivate the SCG or activate the SCG. Optionally, after the SN CU receives the fifth indication information, the method further includes: The SN CU performs the deactivation operation or the activation operation on the SCG. Specifically, the SN CU-CP and/or the SN CU-UP perform/performs the deactivation operation or the activation operation on the SCG.

Optionally, in an implementation of this application, the method further includes: S1407: The first access network node sends an ACK message to the second access network node.

The ACK message is used to indicate that the first access network node successfully receives the fifth indication information sent by the second access network node.

For example, when the first base station is an MN, step S1407 includes: The MN CU sends the ACK message to the MN DU. Optionally, when the first apparatus included in the first access network node (MN CU) is an MN CU-CP, and the second apparatus included in the first access network node is an MN CU-UP, step S1407 includes: The MN CU-CP sends the ACK message to the MN DU; or the MN CU-UP sends the ACK message to the MN CU-CP, and the MN CU-CP sends the ACK message to the MN DU.

For example, when the first base station is an SN, step S1407 includes: The SN CU sends the ACK message to the SN DU. Optionally, when the first apparatus included in the first access network node (SN CU) is an SN CU-CP, and the second apparatus included in the first access network node is an SN CU-UP, step S1407 includes: The SN CU-CP sends the ACK message to the SN DU; or the SN CU-UP sends the ACK message to the SN CU-CP, and the SN CU-CP sends the ACK message to the SN DU.

It may be understood that in this embodiment, when the first base station is an SN, the second access network node notifies the first access network node when determining to deactivate the SCG or activate the SCG, so that the second access network node determines that a suspended or recovered bearer is a PDCP entity of an SN terminated bearer. In addition, when the PDCP layer is divided to the first access network node, the first access network node may perform a deactivation operation or an activation operation on the bearer, so that the SN can retain the SCG related configuration, and the SCG link communication can be quickly recovered through the activation operation. In this way, the overheads of air interface signaling and the delay are reduced while the power consumption of the network side and the terminal is reduced, thereby improving the communication efficiency.

Figure 16:
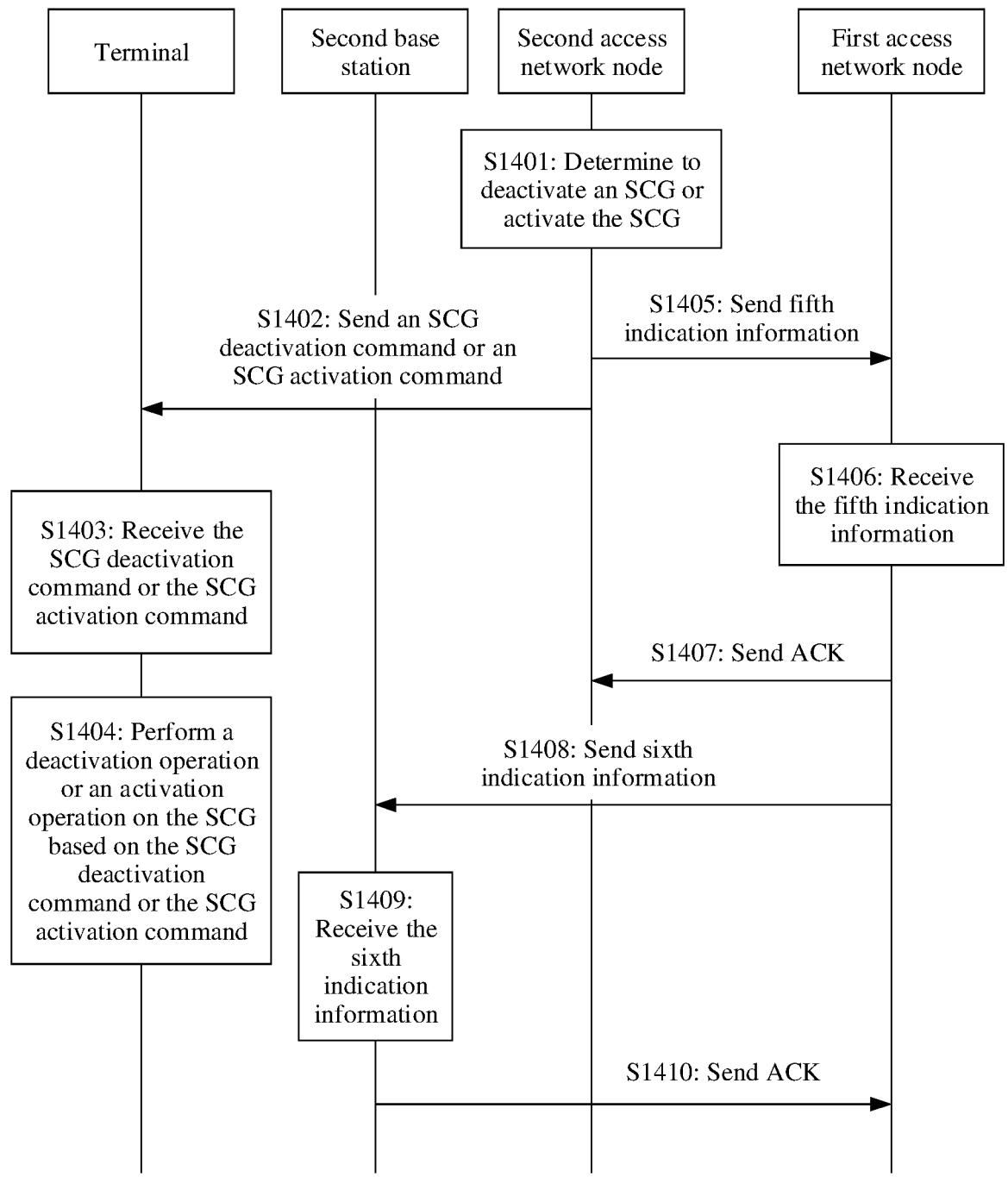
FIG. 16 is a schematic flowchart of another communication method according to an embodiment of this application.

Optionally, when the first base station is an MN, and the second base station is an SN, the first access network node is an MN CU, and the second access network node is an MN DU. As shown in FIG. 16, the method may further include S1408 to S1410.

S1408: The first access network node sends sixth indication information to the second base station, where the sixth indication information is used to indicate the second base station to deactivate the SCG or activate the SCG.

It may be understood that, for a specific implementation in which the first access network node sends the sixth indication information to the second base station in step S1408, refer to the implementation in which the first access network node sends the second indication information to the second base station in step S908. Details are not described herein again.

Optionally, when the first base station is an MN, and the second base station is an SN, when the first apparatus included in the first access network node (MN CU) is an MN CU-CP, and the second apparatus included in the first access network node is an MN CU-UP, step S1408 includes: The first apparatus MN CU-CP sends the sixth indication information to the second base station. Optionally, the second base station SN may be in a CU-DU architecture, and the SN CU may include the SN CU-CP and the SN CU-UP.

Optionally, when the first base station is an SN, and the second base station is an MN, when the first apparatus included in the first access network node (SN CU) is an SN CU-CP, and the second apparatus included in the first access network node is an SN CU-UP, step S1408 includes: The first apparatus SN CU-CP sends the sixth indication information to the second base station. Optionally, the second base station MN may be in the CU-DU architecture, and the MN CU may include the MN CU-CP and the MN CU-UP.

S1409: The second base station receives the sixth indication information.

It may be understood that, for a specific implementation in which the second base station receives the sixth indication information in step S1409, refer to the implementation in which the second base station receives the second indication information in step S909. Details are not described herein again.

After the second base station receives the sixth indication information, the second base station may perform the deactivation operation or the activation operation on the SCG based on the sixth indication information. For example, when the second base station is in the CU-DU architecture, that the second base station performs the deactivation operation or the activation operation on the SCG includes: The SN CU deactivates the SCG or activates the SCG; and/or the SN DU deactivates the SCG or activates the SCG.

For example, when the MN determines that a suspended bearer is the PDCP entity of the SN terminated bearer, and the PDCP layer is divided to the SN CU, the SN CU suspends or recovers the bearer; when the MN determines that a suspended bearer is the SCG RLC bearer, and the RLC layer is divided to the SN DU, the SN DU suspends or recovers the bearer.

For example, the MN determines that a suspended bearer is an SN terminated MCG RLC bearer, and a CU-DU architecture of the SN is shown in FIG. 2. The PDCP layer is deployed on a CU, the MN CU sends the second indication information to the SN CU, and after the SN CU receives the second indication information sent by the MN CU, the SN CU suspends or recovers the PDCP entity of the SN terminated bearer. For another example, the MN determines that a suspended bearer is an MN terminated SCG RLC bearer, and a CU-DU architecture of the SN is shown in FIG. 2. The RLC layer is deployed on the DU, and the MN CU sends the second indication information to the SN CU. The SN CU instructs the SN DU to deactivate the SCG or activate the SCG, and the SN DU suspends or recovers the SCG RLC bearer.

Optionally, when the first base station is an MN, and the second base station is an SN, when the first apparatus included in the first access network node (MN CU) is an MN CU-CP, and the second apparatus included in the first access network node is an MN CU-UP, step S1409 includes: The SN receives the sixth indication information sent by the first apparatus MN CU-CP. Optionally, the second base station SN may be in the CU-DU architecture, and the SN CU may include the SN CU-CP and the SN CU-UP.

Optionally, when the first base station is an SN, and the second base station is an MN, when the first apparatus included in the first access network node (SN CU) is an SN CU-CP, and the second apparatus included in the first access network node is an SN CU-UP, step S1409 includes: The MN receives the sixth indication information sent by the first apparatus SN CU-CP. Optionally, the second base station MN may be in the CU-DU architecture, and the MN CU may include the MN CU-CP and the MN CU-UP.

Optionally, in an implementation of this application, the method further includes: S1410: The second base station sends an ACK message to the first access network node.

The ACK message is used to indicate that the second base station successfully receives the sixth indication information sent by the first access network node.

Optionally, when the first base station is an MN, and the second base station is an SN, when the first apparatus included in the first access network node (MN CU) is an MN CU-CP, and the second apparatus included in the first access network node is an MN CU-UP, step S1410 includes: The SN sends the ACK message to the MN CU-CP. Optionally, the second base station SN may be in the CU-DU architecture, and the SN CU may include the SN CU-CP and the SN CU-UP.

Optionally, when the first base station is an SN, and the second base station is an MN, when the first apparatus included in the first access network node (SN CU) is an SN CU-CP, and the second apparatus included in the first access network node is an SN CU-UP, step S1410 includes: The MN sends the ACK message to the SN CU-CP. Optionally, the second base station MN may be in the CU-DU architecture, and the MN CU may include the MN CU-CP and the MN CU-UP.

It may be understood that in this embodiment, when determining to deactivate the SCG or activate the SCG, the MN notifies the SN, and indicates the SN to deactivate the SCG or activate the SCG, so that the SN can retain the SCG related configuration, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 17:
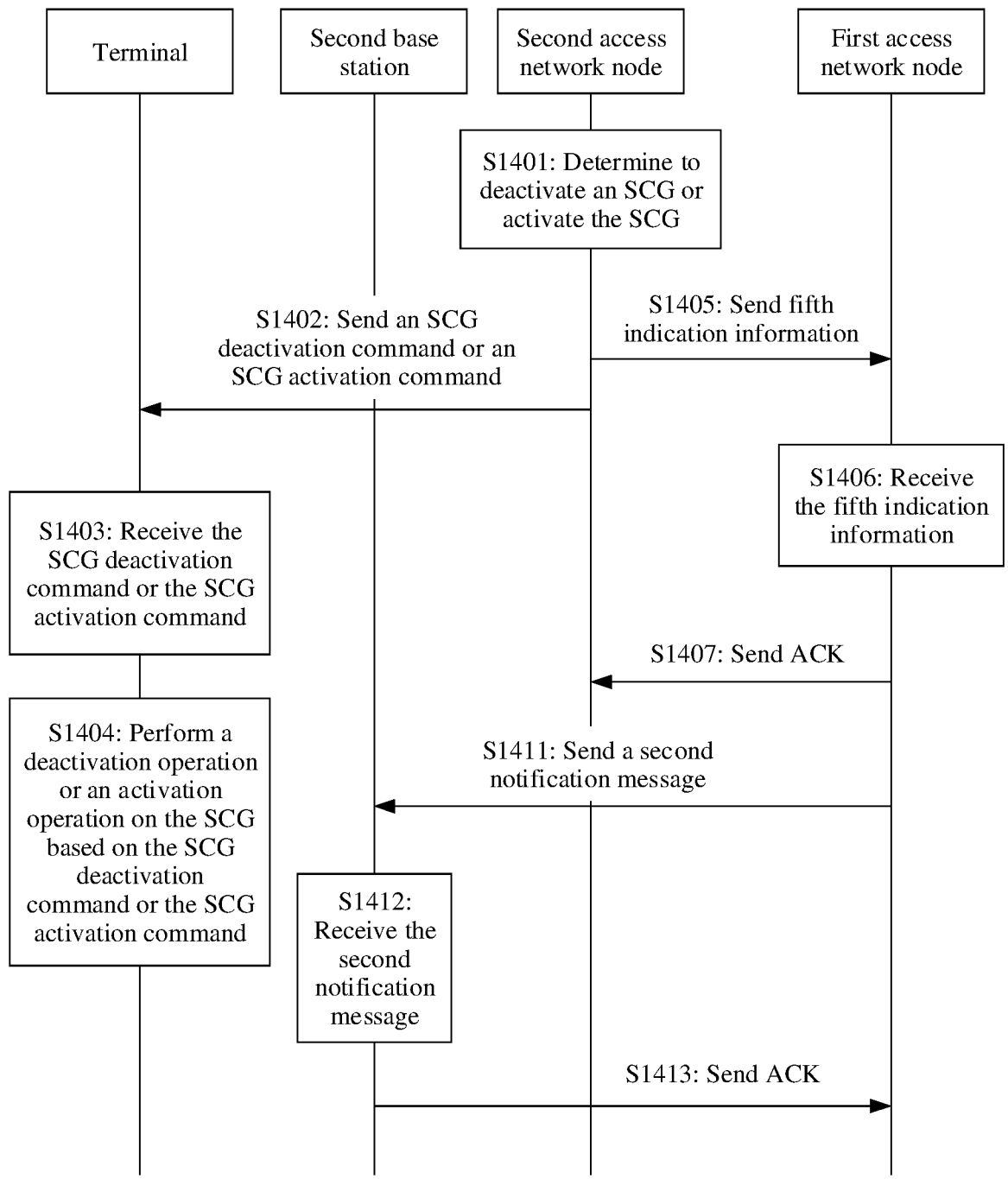
FIG. 17 is a schematic flowchart of another communication method according to an embodiment of this application.

Optionally, when the first base station is an SN, and the second base station is an MN, the first access network node is an SN CU, and the second access network node is an SN DU. As shown in FIG. 17, the method may further include S1411 to S1413.

S1411: The first access network node sends a second notification message to the second base station, where the second notification message is used to notify the second base station that the first base station deactivates the SCG or activates the SCG.

It may be understood that, for a specific implementation in which the first access network node sends the second notification message to the second base station in step S1411, refer to the implementation in which the first access network node sends the first notification message to the second base station in step S911. Details are not described herein again.

S1412: The second base station receives the second notification message.

It may be understood that, for a specific implementation in which the second base station receives the second notification message in step S1412, refer to the implementation in which the second base station receives the first notification message sent by the first access network node in step S912. Details are not described herein again.

Optionally, in an implementation of this application, the method further includes: S1413: The second base station sends an ACK message to the first access network node.

The ACK message is used to indicate that the second base station successfully receives the second notification message sent by the first access network node.

It may be understood that in this embodiment, when determining to deactivate the SCG or activate the SCG, the SN notifies the MN, so that the MN may suspend/recover the data transmission tunnel on the X2/Xn interface corresponding to the bearer established at the SN. In this embodiment, the SCG related configuration can be retained, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 18:
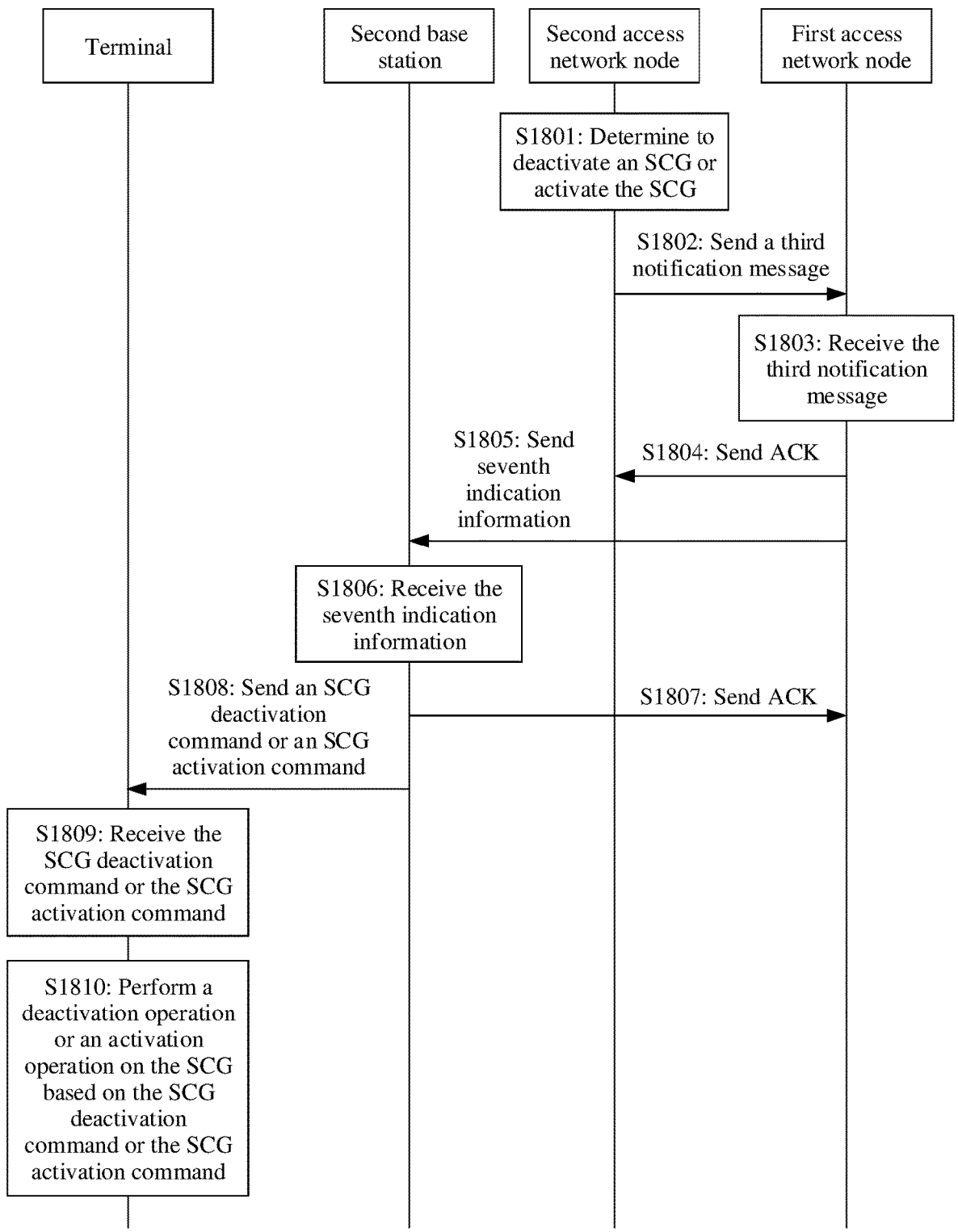
FIG. 18 is a schematic flowchart of another communication method according to an embodiment of this application.

This application further provides an embodiment. As shown in FIG. 18, the communication method includes steps S1801 to S1810.

S1801: A second access network node determines to deactivate an SCG or activate the SCG.

For example, the second access network node belongs to a first base station, the first base station is an MN or an SN of a terminal during DC communication, and the SCG includes one or more cells managed by the SN. The second access network node is a DU of the first base station. For example, the second access network node may be an MN DU or an SN DU.

It may be understood that, for a specific implementation in which the second access network node determines to deactivate the SCG or activate the SCG in step S180, refer to the implementation in which the first access network node determines to deactivate the SCG or activate the SCG in step S901. Details are not described herein again.

S1802: The second access network node sends a third notification message to the first access network node, to instruct the first access network node to send seventh indication information to a second base station.

The seventh indication information is used to indicate the second base station to send an SCG deactivation command or an SCG activation command to the terminal. The first access network node and the second access network node both belong to the first base station. For example, the first access network node may be an MN CU or an SN CU.

The second base station is an MN or an SN of the terminal during DC communication. When the second base station is an MN, the first base station is an SN; or when the second base station is an SN, the first base station is an MN.

For example, when the first base station is an MN, step S1802 includes: The MN DU sends the third notification message to the MN CU. When the first base station is an SN, step S1802 includes: The SN DU sends the third notification message to the SN CU.

S1803: The first access network node receives the third notification message sent by the second access network node.

For example, when the first base station is an MN, step S1803 includes: The MN CU receives the third notification message sent by the MN DU. Optionally, the MN CU may further suspend/recover a data transmission tunnel on an X2/Xn interface corresponding to a bearer established at the SN.

For example, when the first base station is an SN, step S1803 includes: The SN CU receives the third notification message sent by the SN DU. Optionally, the SN CU may further deactivate the SCG or activate the SCG.

For example, when the first base station is an SN, when the second access network node determines that a suspended or recovered bearer is a PDCP entity of an SN terminated bearer, and a PDCP layer is divided to the first access network node, after the first access network node receives the third notification message sent by the second access network node, the method may further include: The first access network node suspends or recovers the bearer.

Optionally, in an implementation of this application, the method further includes: S1804: The first access network node sends an ACK message to the second access network node.

The ACK message is used to indicate that the first access network node successfully receives the third notification message sent by the second access network node.

S1805: The first access network node sends the seventh indication information to the second base station.

The seventh indication information is used to indicate the second base station to send the SCG deactivation command or the SCG activation command to the terminal.

It may be understood that, for a specific implementation in which the first access network node sends the seventh indication information to the second base station in step S1805, refer to the implementation in which the first access network node sends the third indication information to the second base station in step S1202. Details are not described herein again.

S1806: The second base station receives the seventh indication information.

It may be understood that, for a specific implementation in which the second base station receives the seventh indication information in step S1806, refer to the implementation in which the second base station receives the third indication information in step S1203. Details are not described herein again.

Optionally, in an implementation of this application, the method further includes: S1807: The second base station sends an ACK message to the first access network node.

The ACK message is used to indicate that the second base station successfully receives the seventh indication information sent by the first access network node.

It may be understood that, for a specific implementation in which the second base station sends the ACK message to the first access network node in step S1807, refer to the implementation in which the second base station sends the ACK message to the first access network node in step S1204. Details are not described herein again.

S1808: The second base station sends the SCG deactivation command or the SCG activation command to the terminal.

S1809: The terminal receives the SCG deactivation command or the SCG activation command.

S1810: The terminal performs a deactivation operation or an activation operation on the SCG based on the SCG deactivation command or the SCG activation command.

It may be understood that, for specific implementations of steps S1808 to S1810, refer to the implementations of steps S1205 to S1207. Details are not described herein again.

According to the communication method provided in this embodiment of this application, the second access network node determines to deactivate the SCG or activate the SCG. The second access network node sends the third notification message to the first access network node, to instruct the first access network node to send the seventh indication information to the second base station. The first access network node receives the third notification message sent by the second access network node. The first access network node sends the seventh indication information to the second base station. The second base station receives the seventh indication information. The second base station sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, the MN or the SN performs signaling interaction in a CU-DU architecture, to implement the SCG deactivation and activation operations, and this embodiment can adapt to different network deployments, so that the SCG deactivation and activation operations are performed more flexibly.

Figure 19:
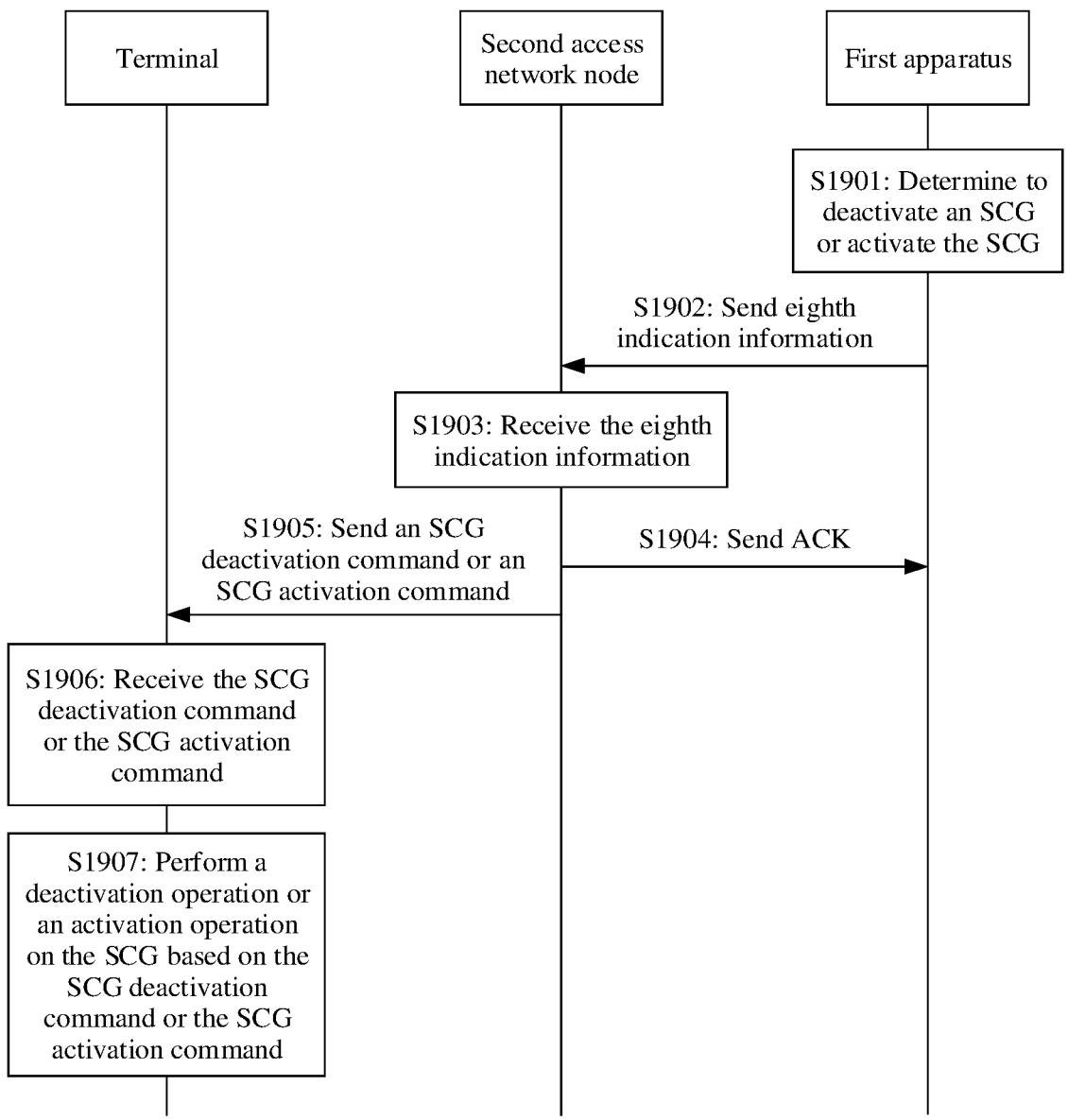
FIG. 19 is a schematic flowchart of another communication method according to an embodiment of this application.

For example, when the first access network node includes a first apparatus and a second apparatus, an embodiment of this application further provides a communication method. As shown in FIG. 19, the method includes steps S1901 to S1907. The first apparatus is configured to perform a CP function of the first access network node, and the second apparatus is configured to perform a UP function of the first access network node, the first access network node belongs to a first base station, and the first base station is an MN or an SN of a terminal during DC communication.

S190: The first apparatus determines to deactivate an SCG or activate the SCG.

For example, the first apparatus is configured to perform the CP function of the first access network node, the first access network node is an MN CU or an SN CU, and the first apparatus is an MN CU-CP or an SN CU-CP.

It may be understood that, for a specific implementation in which the first apparatus determines to deactivate the SCG or activate the SCG in step S1901, refer to the implementation in which the first access network node determines to deactivate the SCG or activate the SCG in step S901. Details are not described herein again.

S1902: The first apparatus sends eighth indication information to a second access network node.

For example, the second access network node also belongs to the first base station. For example, the second access network node may be an MN DU or an SN DU.

For example, when the first base station is an MN, step S1902 specifically includes: The MN CU-CP sends the eighth indication information to the MN DU, to indicate the MN DU to send an SCG deactivation command or an SCG activation command to the terminal.

For example, when the first base station is an SN, step S1902 specifically includes: The SN CU-CP sends the eighth indication information to the SN DU, to indicate the SN DU to send an SCG deactivation command or an SCG activation command to the terminal.

S1903: The second access network node receives the eighth indication information.

For example, when the first base station is an MN, step S1903 specifically includes: The MN DU receives the eighth indication information sent by the MN CU-CP.

For example, when the first base station is an SN, step S1903 specifically includes: The SN DU receives the eighth indication information sent by the SN CU-CP.

Optionally, when the first base station is an SN, after receiving the eighth indication information, the second access network node may further deactivate the SCG or activate the SCG. For example, after receiving the eighth indication information, the second access network node may perform at least one of the following operations: stopping data transmission on an SCG RLC bearer; stopping data transmission on an SN terminated bearer; stopping data transmission on an SCG RLC entity; or stopping data transmission on an SN PDCP entity. For example, when the second access network node is an SN DU, the CU-DU architecture shown in FIG. 2 is used as an example, an RLC layer is deployed on a DU. If the SN CU-CP determines to suspend the SCG RLC bearer in step S190, the SN DU may stop the data transmission on the SCG RLC bearer.

Optionally, when the first base station is an MN, after receiving the eighth indication information, the second access network node may further suspend/recover a data transmission tunnel on an X2/Xn interface corresponding to a bearer established at the SN. For example, when the second access network node is an MN DU, the CU-DU architecture shown in FIG. 2 is used as an example, an RLC layer is deployed on a DU. If the MN CU-CP determines to suspend an SN terminated MCG RLC bearer in step S190, the MN DU may suspend a data transmission tunnel on an X2/Xn interface corresponding to the SN terminated MCG RLC bearer.

Optionally, in an implementation of this application, the method further includes: S1904: The second access network node sends an ACK message to the first apparatus.

The ACK message is used to indicate that the second access network node successfully receives the eighth indication information sent by the first apparatus.

For example, when the first base station is an MN, step S1904 specifically includes: The MN DU sends the ACK message to the MN CU-CP.

For example, when the first base station is an SN, step S1904 specifically includes: The SN DU sends the ACK message to the SN CU-CP.

S1905: The second access network node sends the SCG deactivation command or the SCG activation command to the terminal.

S1906: The terminal receives the SCG deactivation command or the SCG activation command.

S1907: The terminal performs a deactivation operation or an activation operation on the SCG based on the SCG deactivation command or the SCG activation command.

It may be understood that, for specific implementations of steps S1905 to S1907, refer to steps S905 to S907. Details are not described herein again.

According to the communication method provided in this embodiment of this application, the first apparatus determines to deactivate the SCG or activate the SCG. The first apparatus sends the eighth indication information to the second access network node. The second access network node receives the eighth indication information. The second access network node sends the ACK message to the first apparatus. The second access network node sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, signaling interaction is performed in an architecture in which a CU of the MN or the SN includes a CP and a UP, to implement the SCG deactivation and activation operations, and this embodiment can adapt to different network deployments, so that the SCG deactivation and activation operations are performed more flexibly.

Figure 20:
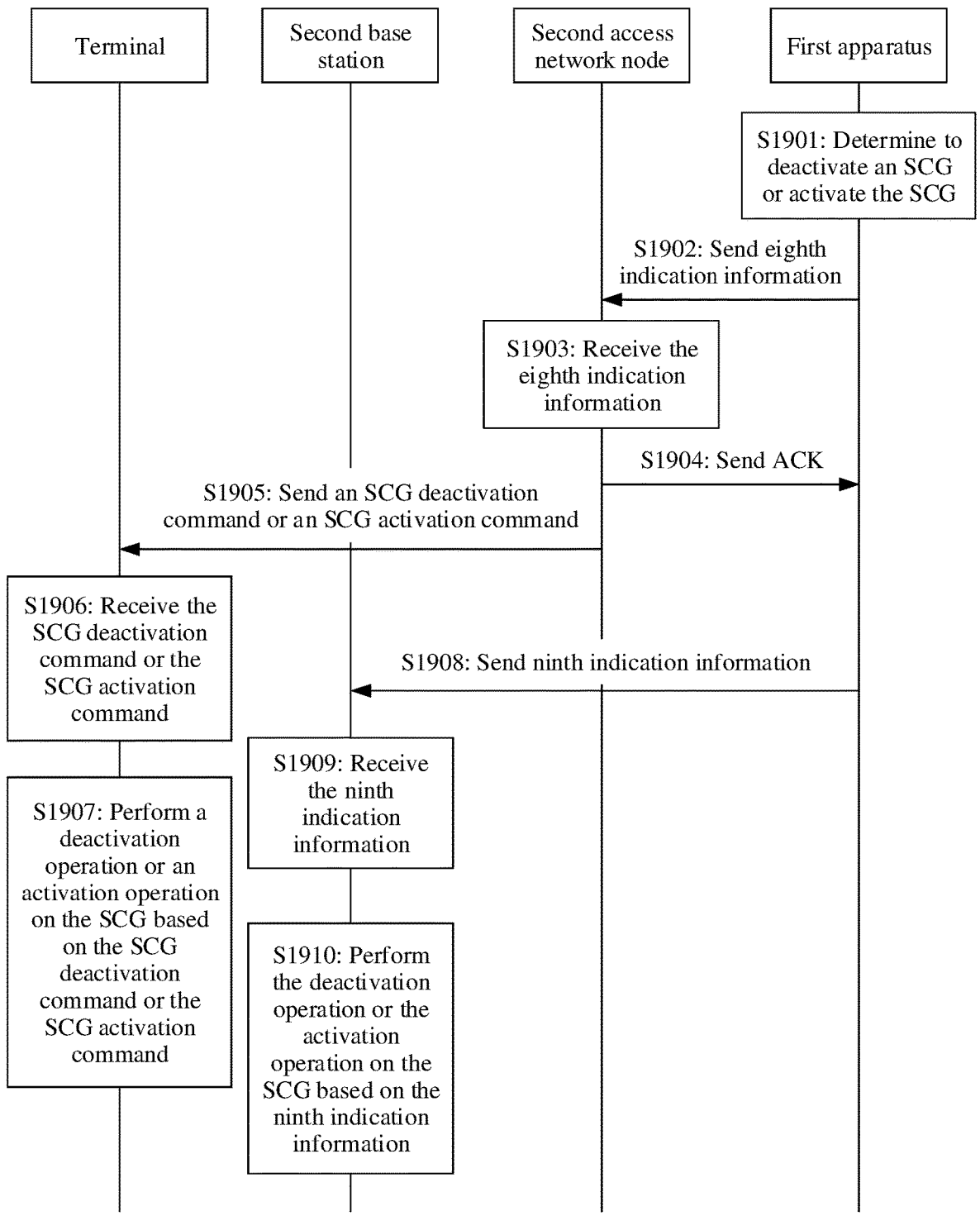
FIG. 20 is a schematic flowchart of another communication method according to an embodiment of this application.

Optionally, when the first base station is an MN, and the second base station is an SN, the first access network node is an MN CU, the second access network node is an MN DU, the first apparatus is an MN CU-CP, and the second apparatus is an MN CU-UP. As shown in FIG. 20, on the basis of steps S1901 to S1907, the method may further include steps S1908 to S1910.

S1908: The first apparatus sends ninth indication information to the second base station, where the ninth indication information is used to indicate the second base station to deactivate the SCG or activate the SCG.

For example, the MN determines that a suspended bearer is the SCG RLC bearer and/or a PDCP entity of the SN terminated bearer, and the MN CU-CP sends the ninth indication information to the SN, to indicate the SN to deactivate the SCG or activate the SCG.

Optionally, when the second base station is in a CU-DU architecture, step S1908 includes: The MN CU-CP sends the ninth indication information to the SN CU. Alternatively, step S1908 may further include: The MN CU-CP sends the ninth indication information to the SN CU, and the SN CU instructs the SN DU to deactivate the SCG or activate the SCG. For example, when the MN determines that a suspended bearer is the PDCP entity of the SN terminated bearer, and a PDCP layer is divided to the SN CU, the MN CU sends the ninth indication information to the SN CU; when the MN determines that a suspended bearer is the SCG RLC bearer, and the RLC layer is divided to the SN DU, the MN CU sends the ninth indication information to the SN CU, and the SN CU instructs the SN DU to deactivate the SCG or activate the SCG.

Optionally, when the CU of the second base station includes a CU-CP and a CU-UP, step S1908 includes: The MN CU-CP sends the ninth indication information to the SN CU-CP; or the MN CU-CP sends the ninth indication information to the SN CU-CP, and the SN CU-CP instructs the SN CU-UP and/or the SN DU to deactivate the SCG or activate the SCG.

Optionally, step S1908 may be performed before step S1902, or may be performed after step S1902, or step S1908 and step S1902 may be simultaneously performed. An execution sequence of step S1908 and step S1902 is not limited in this embodiment of this application.

S1909: The second base station receives the ninth indication information.

For example, the SN receives the ninth indication information sent by the MN CU.

For example, when the second base station is in the CU-DU architecture, step S1909 includes: The SN CU receives the ninth indication information sent by the MN CU-CP. Alternatively, step S1909 includes: The SN CU receives the ninth indication information sent by the MN CU-CP, and the SN DU receives a notification message sent by the SN CU, to instruct the SN DU to deactivate the SCG or activate the SCG.

Optionally, when the CU of the second base station includes a CU-CP and a CU-UP, step S1909 includes: The SN CU-CP receives the ninth indication information sent by the MN CU-CP. Alternatively, step S1909 includes: The SN CU-CP receives the ninth indication information sent by the MN CU-CP, and the SN CU-UP and/or the SN DU receive/ receives the notification message sent by the SN CU-CP, to instruct the SN CU-UP and/or the SN DU to deactivate the SCG or activate the SCG.

Optionally, after step S1909, the second base station may send an ACK message to the first apparatus, to indicate that the second base station successfully receives the ninth indication information sent by the first apparatus.

S1910: The second base station performs a deactivation operation or an activation operation on the SCG based on the ninth indication information.

For example, when the second base station is in the CU-DU architecture, step S1910 includes: The SN CU deactivates the SCG or activates the SCG; or the SN DU deactivates the SCG or activates the SCG.

For example, when the CU of the second base station includes a CU-CP and a CU-UP, step S1910 includes: The SN CU-CP and/or the SN CU-UP deactivate/deactivates the SCG or activate/activates the SCG; and/or the SN DU deactivates the SCG or activates the SCG.

It may be understood that in this embodiment, when determining to deactivate the SCG or activate the SCG, the MN notifies the SN, and indicates the SN to deactivate the SCG or activate the SCG, so that the SN can retain the SCG related configuration, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 21:
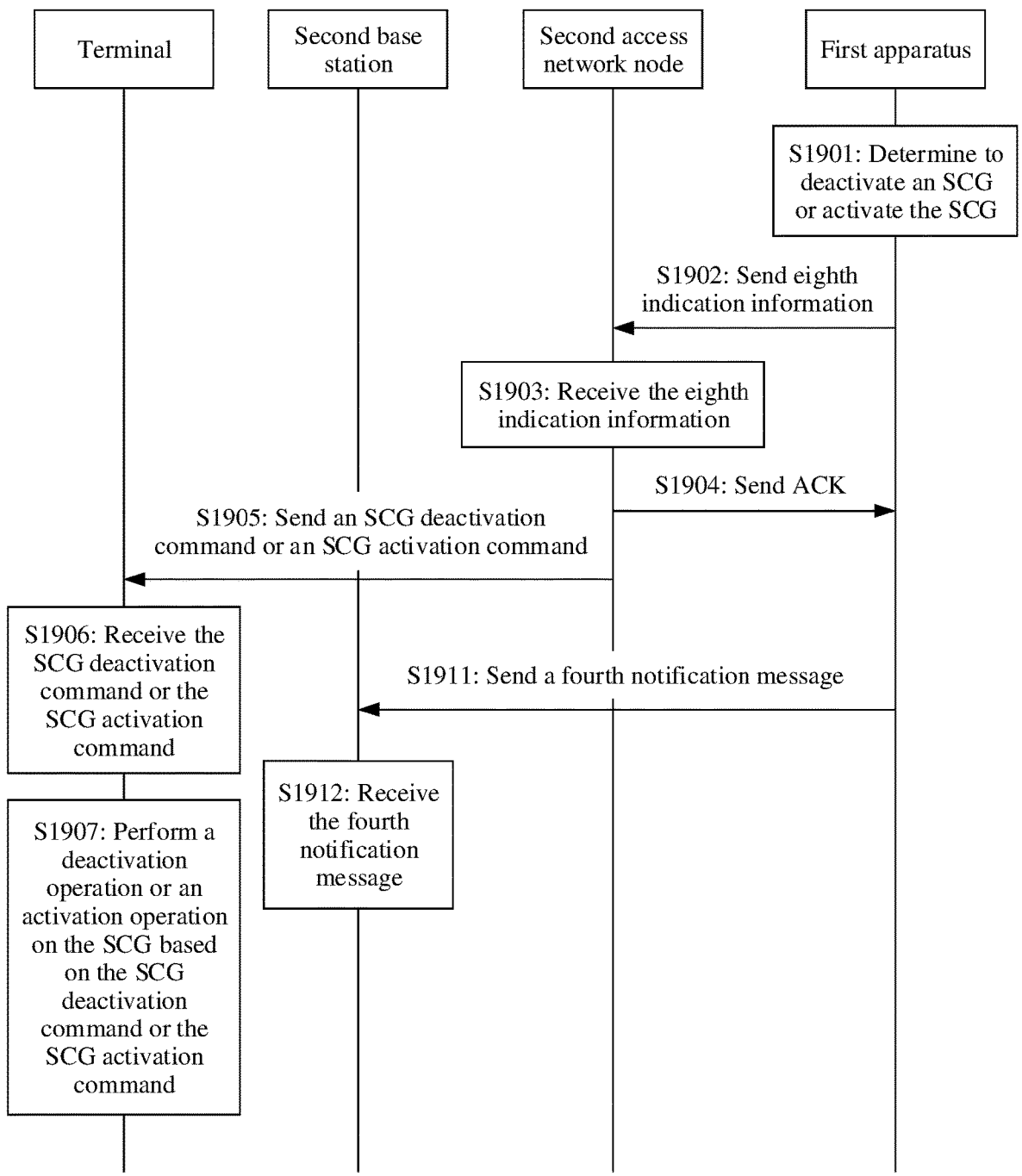
FIG. 21 is a schematic flowchart of another communication method according to an embodiment of this application.

Optionally, when the first base station is an SN, and the second base station is an MN, the first access network node is an SN CU, the second access network node is an SN DU, the first apparatus is an SN CU-CP, and the second apparatus is an SN CU-UP. As shown in FIG. 21, on the basis of steps S1901 to S1907, the method may further include steps S1911 and S1912.

S1911: The first apparatus sends a fourth notification message to the second base station, where the fourth notification message is used to notify the second base station that the first base station deactivates the SCG or activates the SCG.

For example, when the second base station is in the CU-DU architecture, step S1911 includes: The SN CU-CP sends the fourth notification message to the MN CU. Alternatively, step S1911 may further include: The SN CU-CP sends the fourth notification message to the MN CU, and the MN CU notifies the MN DU that the SN deactivates the SCG or activates the SCG.

Optionally, when the CU of the second base station includes a CU-CP and a CU-UP, step S1911 includes: The SN CU-CP sends the fourth notification message to the MN CU-CP. Alternatively, step S1911 may further include: The SN CU-CP sends the fourth notification message to the MN CU-CP, and the MN CU-CP notifies the MN CU-UP and/or the MN DU that the SN deactivates the SCG or activates the SCG.

Optionally, step S1911 may be performed before step S1902, or may be performed after step S1902, or step S1911 and step S1902 may be simultaneously performed. An execution sequence of step S1911 and step S1902 is not limited in this embodiment of this application.

S1912: The second base station receives the fourth notification message.

For example, the MN receives the fourth notification message sent by the SN CU-CP.

For example, when the second base station is in the CU-DU architecture, step S1912 includes: The MN CU receives the fourth notification message sent by the SN CU-CP. Alternatively, step S1912 includes: The MN CU receives the fourth notification message sent by the SN CU-CP, and the MN DU receives the notification message sent by the MN CU, to notify the MN DU that the SN deactivates the SCG or activates the SCG.

Optionally, when the CU of the second base station includes a CU-CP and a CU-UP, step S1912 includes: The MN CU-CP receives the fourth notification message sent by the SN CU-CP. Alternatively, step S1912 includes: The MN CU-CP receives the fourth notification message sent by the SN CU-CP, and the MN CU-UP and/or the MN DU receive/ receives the notification message sent by the MN CU-CP, to notify the MN CU-UP and/or the MN DU that the SN deactivates the SCG or activates the SCG.

Optionally, after step S1912, the second base station may send an ACK message to the first apparatus, to indicate that the second base station successfully receives the fourth notification message sent by the first apparatus.

It may be understood that in this embodiment, when determining to deactivate the SCG or activate the SCG, the SN notifies the MN, so that the MN may suspend/recover the data transmission tunnel on the X2/Xn interface corresponding to the bearer established at the SN. In this embodiment, the SCG related configuration can be retained, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 22:
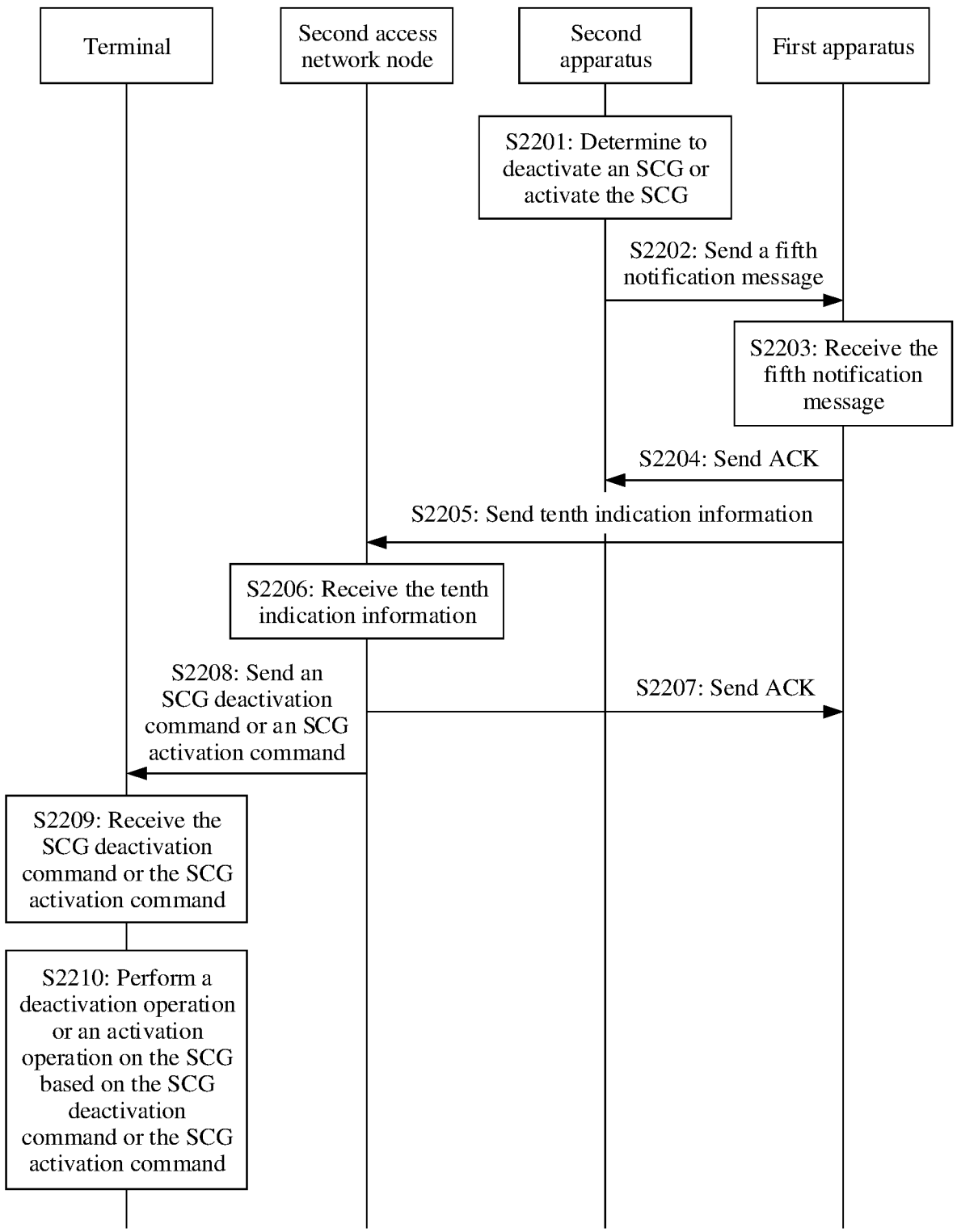
FIG. 22 is a schematic flowchart of another communication method according to an embodiment of this application.

For example, when the first access network node includes a first apparatus and a second apparatus, an embodiment of this application further provides a communication method. As shown in FIG. 22, the method includes steps S2201 to S2210. The first apparatus is configured to perform a CP function of the first access network node, and the second apparatus is configured to perform a UP function of the first access network node, the first access network node belongs to a first base station, and the first base station is an MN or an SN of a terminal during DC communication.

S2201: The second apparatus determines to deactivate an SCG or activate the SCG.

For example, the second apparatus is configured to perform the UP function of the first access network node, the first access network node is an MN CU or an SN CU, and the second apparatus is an MN CU-UP or an SN CU-UP.

It may be understood that, for a specific implementation in which the second apparatus determines to deactivate the SCG or activate the SCG in step S2201, refer to the implementation in which the first access network node determines to deactivate the SCG or activate the SCG in step S901. Details are not described herein again.

S2202: The second apparatus sends a fifth notification message to the first apparatus, to instruct the first apparatus to send tenth indication information to a second access network node.

The tenth indication information is used to indicate the second access network node to send an SCG deactivation command or an SCG activation command to the terminal.

For example, the first apparatus is configured to perform the CP function of the first access network node, and the first apparatus is an MN CU-CP or an SN CU-CP.

For example, when the first base station is an MN, step S2202 specifically includes: The MN CU-UP sends the fifth notification message to the MN CU-CP, to instruct the MN CU-CP to send the tenth indication information to the MN DU.

For example, when the first base station is an SN, step S2202 specifically includes: The SN CU-UP sends the fifth notification message to the SN CU-CP, to instruct the SN CU-CP to send the tenth indication information to the SN DU.

S2203: The first apparatus receives the fifth notification message.

For example, when the first base station is an MN, step S2203 specifically includes: The MN CU-CP receives the fifth notification message sent by the MN CU-UP.

For example, when the first base station is an SN, step S2203 specifically includes: The SN CU-CP receives the fifth notification message sent by the SN CU-UP.

Optionally, in an implementation of this application, the method further includes: S2204: The first apparatus sends an ACK message to the second apparatus.

The ACK message is used to indicate that the first apparatus successfully receives the fifth notification message sent by the second apparatus.

For example, when the first base station is an MN, step S2204 specifically includes: The MN CU-CP sends the ACK message to the MN CU-UP.

For example, when the first base station is an SN, step S2204 specifically includes: The SN CU-CP sends the ACK message to the SN CU-UP.

S2205: The first apparatus sends the tenth indication information to the second access network node.

For example, when the first base station is an MN, step S2205 specifically includes: The MN CU-CP sends the tenth indication information to the MN DU.

For example, when the first base station is an SN, step S2205 specifically includes: The SN CU-CP sends the tenth indication information to the SN DU.

S2206: The second access network node receives the tenth indication information.

For example, when the first base station is an MN, step S2206 specifically includes: The MN DU receives the tenth indication information sent by the MN CU-CP. Optionally, the MN DU may further suspend/recover a data transmission tunnel on an X2/Xn interface corresponding to a bearer established at the SN.

For example, when the first base station is an SN, step S2206 specifically includes: The SN DU receives the tenth indication information sent by the SN CU-CP. Optionally, the SN DU may further perform a deactivation operation or an activation operation on the SCG.

Optionally, in an implementation of this application, the method further includes: S2207: The second access network node sends the ACK message to the first apparatus.

For example, when the first base station is an MN, step S2207 specifically includes: The MN DU sends the ACK message to the MN CU-CP.

For example, when the first base station is an SN, step S2207 specifically includes: The SN DU sends the ACK message to the SN CU-CP.

S2208: The second access network node sends the SCG deactivation command or the SCG activation command to the terminal.

S2209: The terminal receives the SCG deactivation command or the SCG activation command.

S2210: The terminal performs the deactivation operation or the activation operation on the SCG based on the SCG deactivation command or the SCG activation command.

It may be understood that, for specific implementations of steps S2208 to S2210, refer to steps S905 to S907. Details are not described herein again.

Optionally, on the basis of steps S2201 to S2210, the communication method may further include steps S1908 to S1910 or steps S1911 to S1922. For details, refer to related descriptions in the foregoing embodiment. Details are not described herein again.

According to the communication method provided in this embodiment of this application, the second apparatus determines to deactivate the SCG or activate the SCG. The second apparatus sends the fifth notification message to the first apparatus, to instruct the first apparatus to send the tenth indication information to the second access network node. The first apparatus receives the fifth notification message. The first apparatus sends the tenth indication information to the second access network node. The second access network node receives the tenth indication information. The second access network node sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, signaling interaction is performed in an architecture in which a CU of the MN or the SN includes a CP and a UP, to implement the SCG deactivation and activation operations, and this embodiment can adapt to different network deployments, so that the SCG deactivation and activation operations are performed more flexibly.

Figure 23:
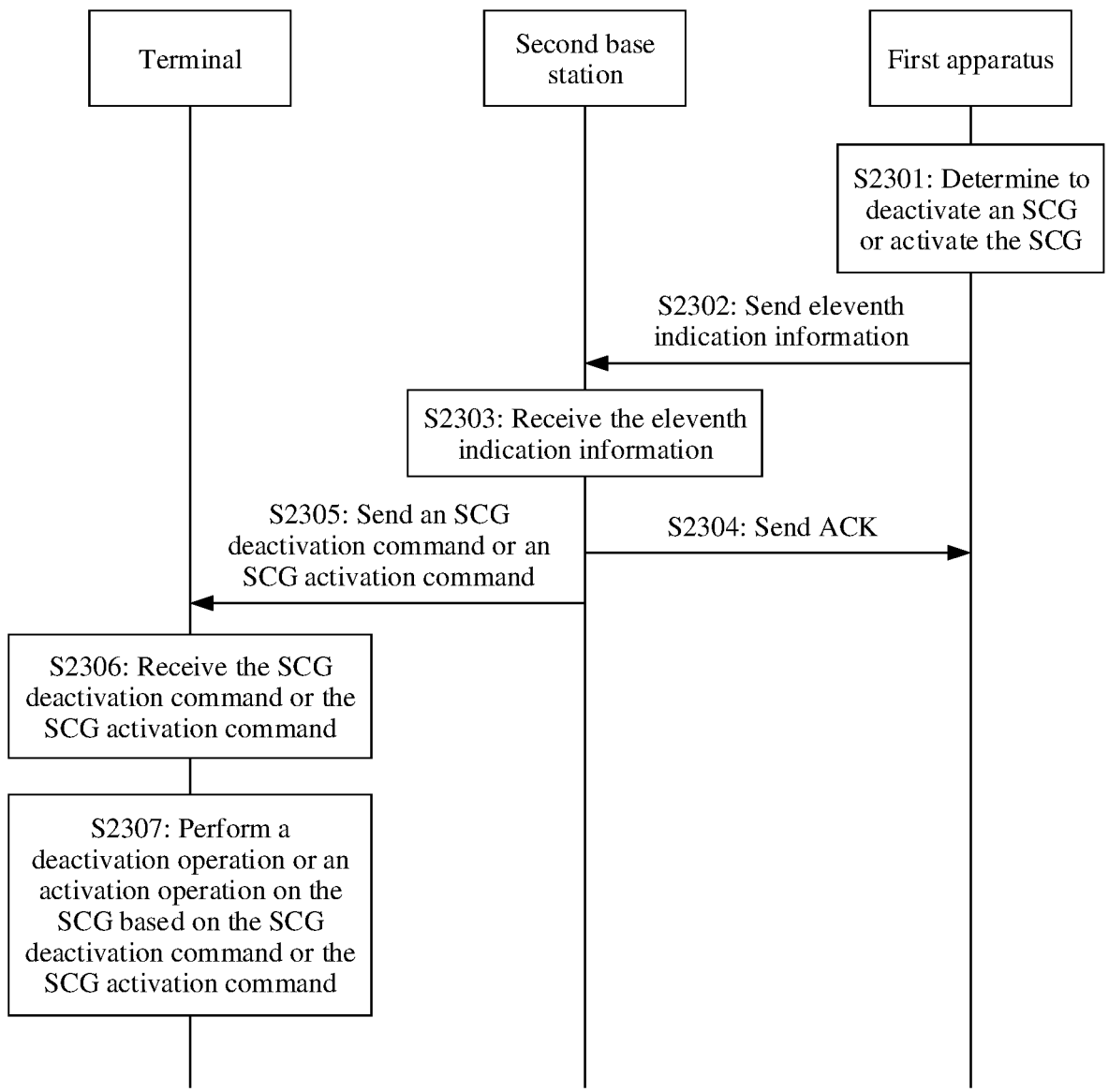
FIG. 23 is a schematic flowchart of another communication method according to an embodiment of this application.

For example, when the first access network node includes a first apparatus and a second apparatus, an embodiment of this application further provides a communication method. As shown in FIG. 23, the method includes steps S2301 to S2307. The first apparatus is configured to perform a CP function of the first access network node, and the second apparatus is configured to perform a UP function of the first access network node, the first access network node belongs to a first base station, and the first base station is an MN or an SN of a terminal during DC communication.

S2301: The first apparatus determines to deactivate an SCG or activate the SCG.

For example, the first apparatus is configured to perform the CP function of the first access network node, the first access network node is an MN CU or an SN CU, and the first apparatus is an MN CU-CP or an SN CU-CP.

It may be understood that, for a specific implementation in which the first apparatus determines to deactivate the SCG or activate the SCG in step S2301, refer to the implementation in which the first access network node determines to deactivate the SCG or activate the SCG in step S901. Details are not described herein again.

S2302: The first apparatus sends eleventh indication information to a second base station, where the eleventh indication information is used to indicate the second base station to send an SCG deactivation command or an SCG activation command to the terminal.

The second base station is an MN or an SN of the terminal during DC communication. When the second base station is an MN, the first base station is an SN; or when the second base station is an SN, the first base station is an MN.

For example, when the first base station is an MN, and the second base station is an SN, when the second base station is in a CU-DU architecture, step S2302 includes: The MN CU-CP sends the eleventh indication information to the SN CU, and the SN CU instructs an SN DU to send the SCG deactivation command or the SCG activation command to the terminal.

Optionally, when a CU of the second base station includes a CU-CP and a CU-UP, step S2302 includes: The MN CU-CP sends the eleventh indication information to the SN CU-CP, and the SN CU-CP instructs the SN DU to send the SCG deactivation command or the SCG activation command to the terminal.

For example, when the first base station is an SN, and the second base station is an MN, when the second base station is in a CU-DU architecture, step S2302 includes: The SN CU-CP sends the eleventh indication information to the MN CU, and the MN CU instructs an MN DU to send the SCG deactivation command or the SCG activation command to the terminal.

Optionally, when a CU of the second base station includes a CU-CP and a CU-UP, step S2302 includes: The SN CU-CP sends the eleventh indication information to the MN CU-CP, and the MN CU-CP instructs the MN DU to send the SCG deactivation command or the SCG activation command to the terminal.

S2303: The second base station receives the eleventh indication information.

For example, when the first base station is an MN, and the second base station is an SN, and when the second base station is in a CU-DU architecture, step S2303 includes: The SN CU receives the eleventh indication information sent by the MN CU-CP, and the SN DU receives a notification message sent by the SN CU. Optionally, the SN CU and/or the SN DU may further perform a deactivation operation or an activation operation on the SCG.

Optionally, when a CU of the second base station includes a CU-CP and a CU-UP, step S2303 includes: The SN CU-CP receives the eleventh indication information sent by the MN CU-CP, and the SN DU receives the notification message sent by the SN CU-CP. Optionally, the SN CU-CP and/or the SN DU may further perform the deactivation operation or the activation operation on the SCG.

For example, when the first base station is an SN, and the second base station is an MN, and when the second base station is in a CU-DU architecture, step S2303 includes: The MN CU receives the eleventh indication information sent by the SN CU-CP, and the MN DU receives a notification message sent by the MN CU. Optionally, the MN CU and/or the MN DU may further suspend/recover a data transmission tunnel on an X2/Xn interface corresponding to a bearer established at the SN.

Optionally, when a CU of the second base station includes a CU-CP and a CU-UP, step S2303 includes: The MN CU-CP receives the eleventh indication information sent by the SN CU-CP, and the MN DU receives the notification message sent by the MN CU-CP. Optionally, the MN CU-CP and/or the MN DU may further suspend/recover the data transmission tunnel on the X2/Xn interface corresponding to the bearer established at the SN.

Optionally, in an implementation of this application, the method further includes: S2304: The second base station sends an ACK message to the first apparatus.

For example, when the first base station is an MN, and the second base station is an SN, and when the second base station is in a CU-DU architecture, step S2304 includes: The SN CU sends the ACK message to the MN CU-CP, and the SN DU sends the ACK message to the SN CU.

Optionally, when a CU of the second base station includes a CU-CP and a CU-UP, step S2304 includes: The SN CU-CP sends the ACK message to the MN CU-CP, and the SN DU sends the ACK message to the SN CU-CP.

For example, when the first base station is an SN, and the second base station is an MN, and when the second base station is in a CU-DU architecture, step S2304 includes: The MN CU sends the ACK message to the SN CU-CP, and the MN DU sends the ACK message to the MN CU.

Optionally, when a CU of the second base station includes a CU-CP and a CU-UP, step S2304 includes: The MN CU-CP sends the ACK message to the SN CU-CP, and the MN DU sends the ACK message to the MN CU-CP.

S2305: The second base station sends the SCG deactivation command or the SCG activation command to the terminal.

S2306: The terminal receives the SCG deactivation command or the SCG activation command.

S2307: The terminal performs the deactivation operation or the activation operation on the SCG based on the SCG deactivation command or the SCG activation command.

It may be understood that, for specific implementations of steps S2305 to S2307, refer to steps S905 to S907. Details are not described herein again.

According to the communication method provided in this embodiment of this application, the first apparatus determines to deactivate the SCG or activate the SCG. The first apparatus sends the eleventh indication information to the second base station, where the eleventh indication information is used to indicate the second base station to send the SCG deactivation command or the SCG activation command to the terminal. The second base station receives the eleventh indication information. The second base station sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, signaling interaction is performed in an architecture in which a CU of the MN or the SN includes a CP and a UP, to implement the SCG deactivation and activation operations, and this embodiment can adapt to different network deployments, so that the SCG deactivation and activation operations are performed more flexibly.

Figure 24:
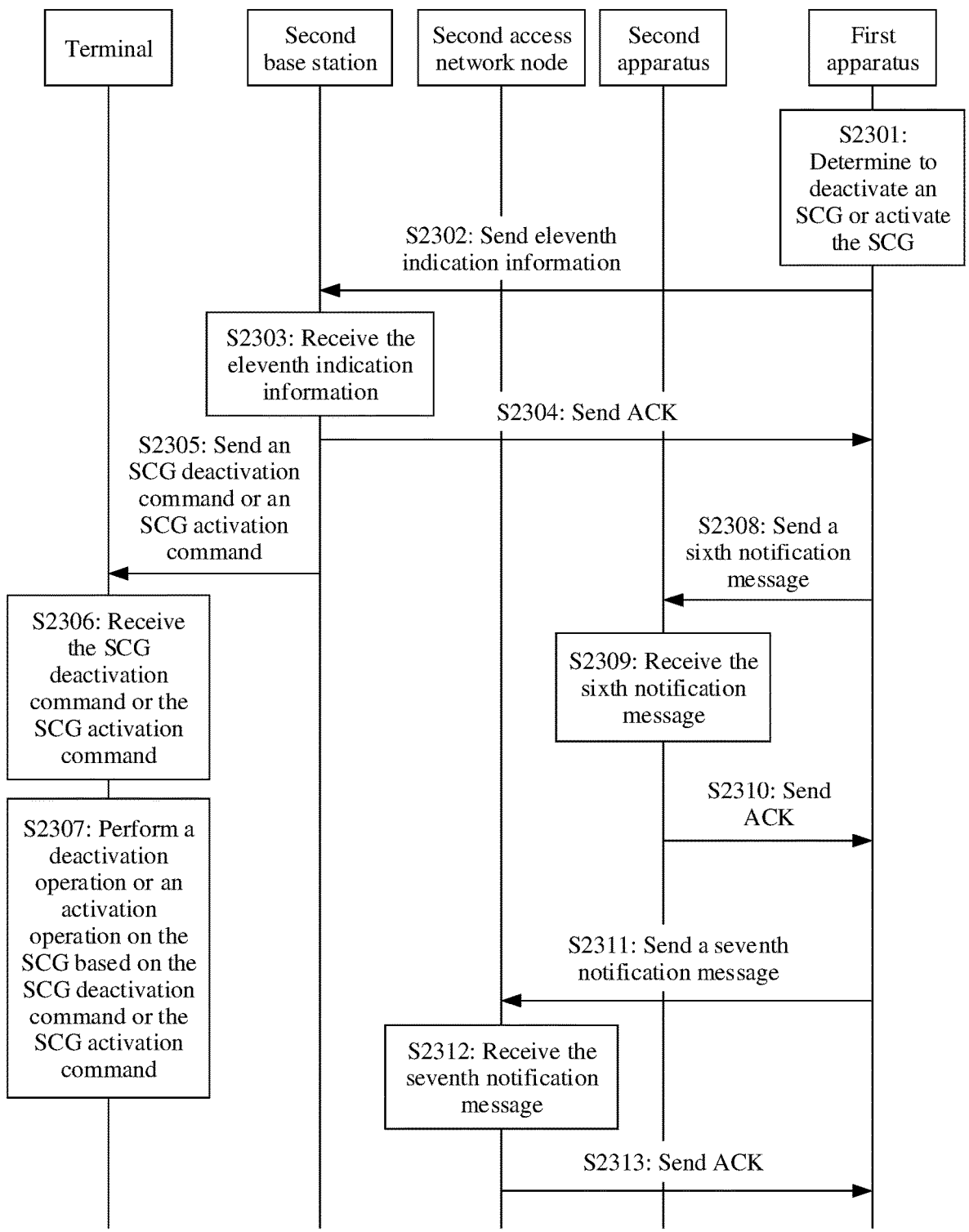
FIG. 24 is a schematic flowchart of another communication method according to an embodiment of this application.

Optionally, when the first base station is an MN, and the second base station is an SN, in steps S2301 to S2307, the first apparatus is an MN CU-CP, and the second apparatus is an MN CU-UP. As shown in FIG. 24, on the basis of steps S2301 to S2307, the communication method may further include steps S2308 to S2313.

S2308: The first apparatus sends a sixth notification message to the second apparatus, to notify the second apparatus that the first base station deactivates the SCG or activates the SCG.

For example, the MN CU-CP sends the sixth notification message to the MN CU-UP, to notify the MN CU-UP that the first base station deactivates the SCG or activates the SCG.

S2309: The second apparatus receives the sixth notification message.

For example, the MN CU-UP receives the sixth notification message sent by the MN CU-CP, and learns that the first base station (SN) deactivates the SCG or activates the SCG. Optionally, the MN CU-UP may suspend/recover the data transmission tunnel on the X2/Xn interface corresponding to the bearer established at the SN.

Optionally, in an implementation of this application, the method further includes: S2310: The second apparatus sends an ACK message to the first apparatus.

The ACK message is used to indicate that the MN CU-UP successfully receives the sixth notification message sent by the MN CU-CP.

S2311: The first apparatus sends a seventh notification message to the second access network node, to notify the second access network node that the first base station deactivates the SCG or activates the SCG.

The second access network node is an MN DU.

For example, the MN CU-CP sends the seventh notification message to the MN DU, to notify the MN DU that the first base station deactivates the SCG or activates the SCG.

S2312: The second access network node receives the seventh notification message.

For example, the MN DU receives the seventh notification message sent by the MN CU-CP, and learns that the first base station (SN) deactivates the SCG or activates the SCG. Optionally, the MN DU may suspend/recover the data transmission tunnel on the X2/Xn interface corresponding to the bearer established at the SN.

Optionally, in an implementation of this application, the method further includes: S2313: The second access network node sends an ACK message to the first apparatus.

The ACK message is used to indicate that the MN DU successfully receives the seventh notification message sent by the MN CU-CP.

It may be understood that in this embodiment, when the MN CU-CP determines to deactivate the SCG or activate the SCG, the MN CU-UP and/or the MN DU are notified, so that the MN CU-UP and/or the MN DU suspend/recover the data transmission tunnel on the X2/Xn interface corresponding to the bearer established at the SN. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 25:
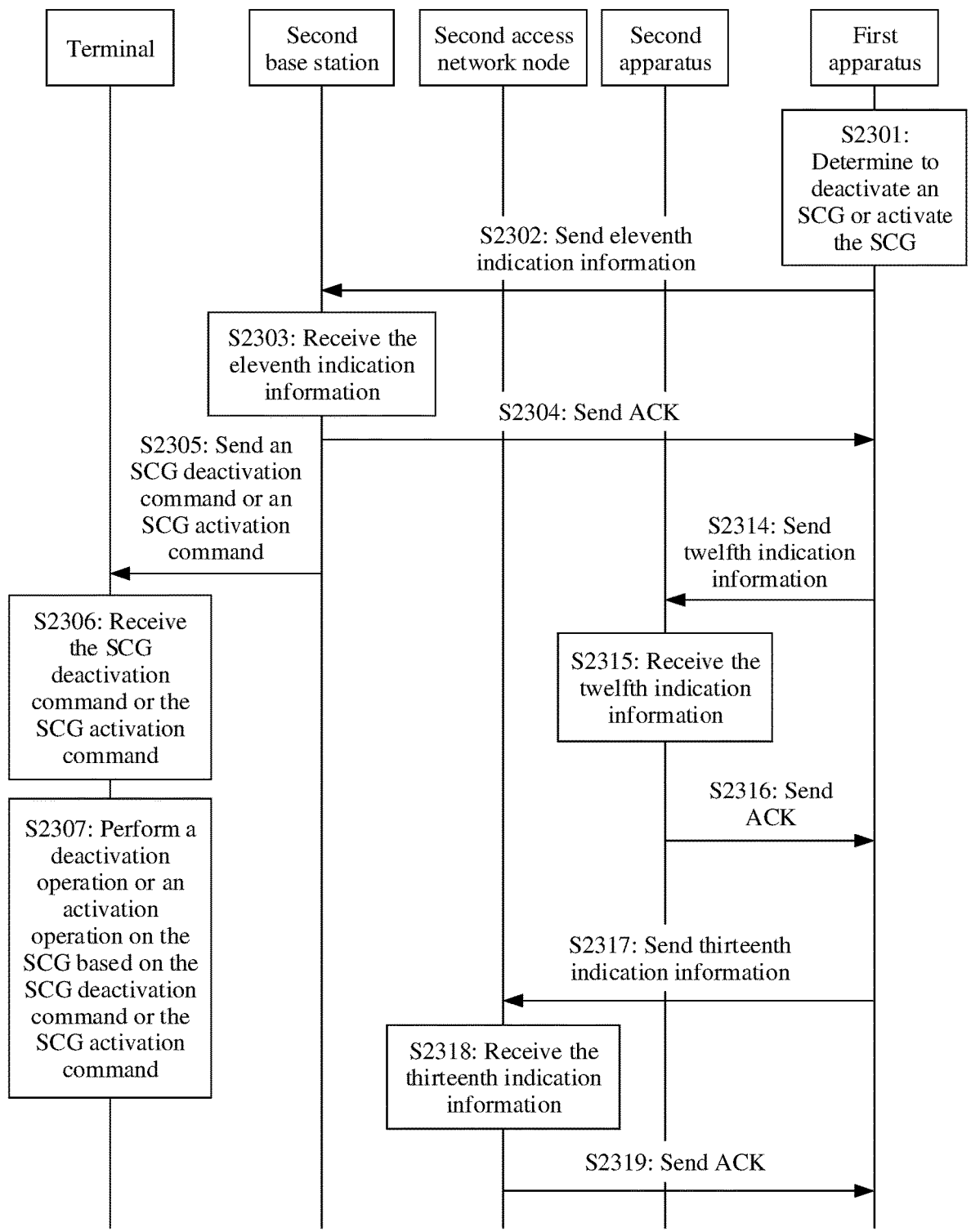
FIG. 25 is a schematic flowchart of another communication method according to an embodiment of this application.

Optionally, when the first base station is an SN, and the second base station is an MN, in steps S2301 to S2307, the first apparatus is an SN CU-CP, and the second apparatus is an SN CU-UP. As shown in FIG. 25, on the basis of steps S2301 to S2307, the communication method may further include steps S2314 to S2319.

S2314: The first apparatus sends twelfth indication information to the second apparatus, to indicate the second apparatus to deactivate the SCG or activate the SCG.

For example, the SN CU-CP sends the twelfth indication information to the SN CU-UP, to indicate the SN CU-UP to deactivate the SCG or activate the SCG.

S2315: The second apparatus receives the twelfth indication information.

For example, the SN CU-UP receives the twelfth indication information sent by the SN CU-CP, and the SN CU-UP deactivates the SCG or activates the SCG.

Optionally, in an implementation of this application, the method further includes: S2316: The second apparatus sends an ACK message to the first apparatus.

The ACK message is used to indicate that the SN CU-UP successfully receives the twelfth indication information sent by the SN CU-CP.

S2317: The first apparatus sends thirteenth indication information to the second access network node, to indicate the second access network node to deactivate the SCG or activate the SCG.

The second access network node is an SN DU.

For example, the SN CU-CP sends the thirteenth indication information to the SN DU, to indicate the SN DU to deactivate the SCG or activate the SCG.

S2318: The second access network node receives the thirteenth indication information.

For example, the SN DU receives the thirteenth indication information sent by the SN CU-CP, and the SN DU deactivates the SCG or activates the SCG.

Optionally, in an implementation of this application, the method further includes: S2319: The second access network node sends an ACK message to the first apparatus.

The ACK message is used to indicate that the SN DU successfully receives the thirteenth indication information sent by the SN CU-CP.

It may be understood that in this embodiment, when determining to deactivate the SCG or activate the SCG, the SN CU-CP notifies the SN CU-UP and/or the SN DU, and indicates the SN CU-UP and/or the SN DU to deactivate the SCG or activate the SCG, so that the SN can retain the SCG related configuration, and the SCG link communication can be quickly recovered through the activation operation. Therefore, compared with a conventional technology, in this embodiment, there is no need to perform SN addition or release, so as to reduce the overheads of air interface signaling and the delay while reducing the power consumption of the network side and the terminal, thereby improving the communication efficiency.

Figure 26:
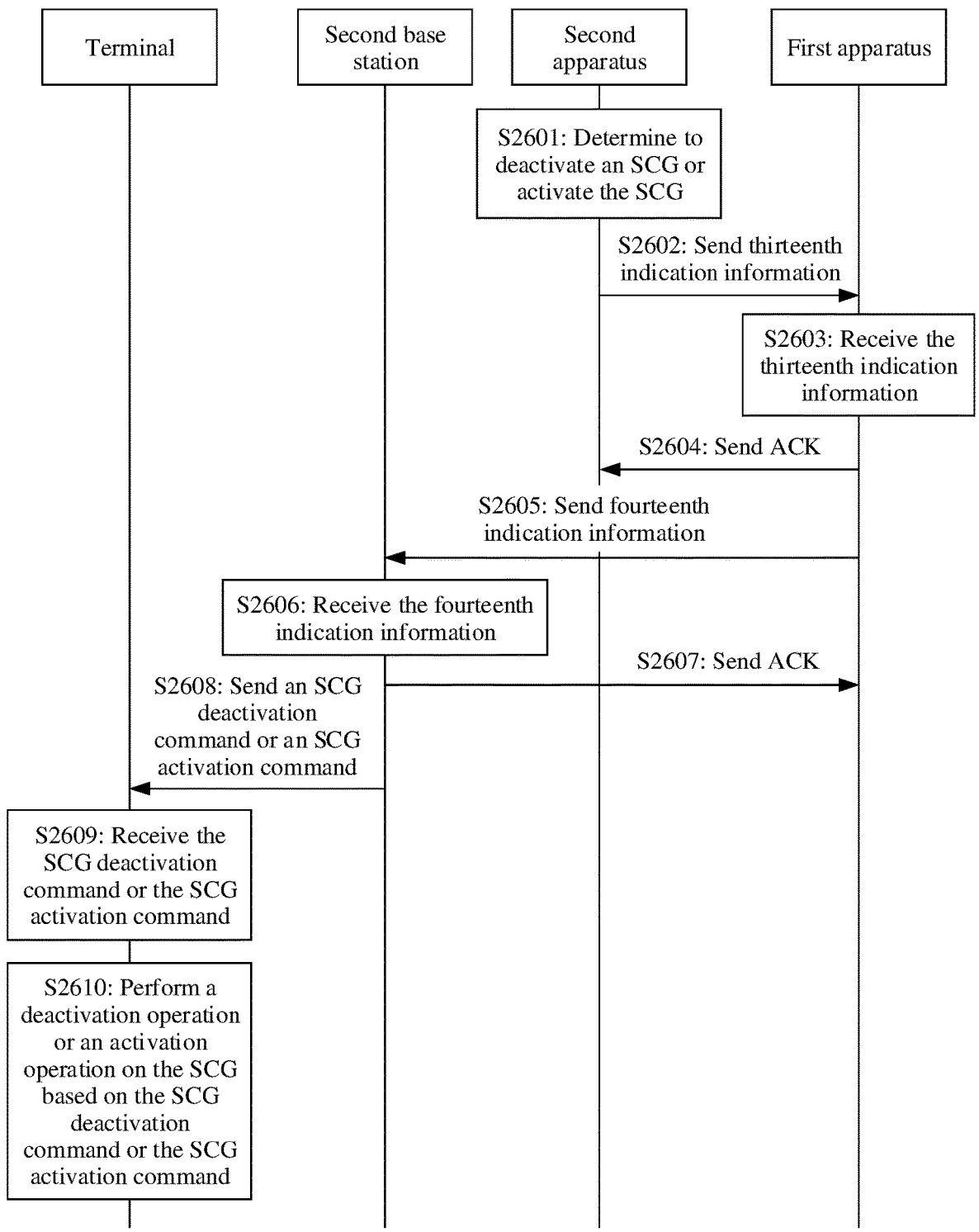
FIG. 26 is a schematic flowchart of another communication method according to an embodiment of this application.

For example, when the first access network node includes a first apparatus and a second apparatus, an embodiment of this application further provides a communication method. As shown in FIG. 26, the method includes steps S2601 to S2610. The first apparatus is configured to perform a CP function of the first access network node, and the second apparatus is configured to perform a UP function of the first access network node, the first access network node belongs to a first base station, and the first base station is an MN or an SN of a terminal during DC communication.

S2601: The second apparatus determines to deactivate an SCG or activate the SCG.

For example, the second apparatus is configured to perform the UP function of the first access network node, the first access network node is an MN CU or an SN CU, and the second apparatus is an MN CU-UP or an SN CU-UP.

It may be understood that, for a specific implementation in which the second apparatus determines to deactivate the SCG or activate the SCG in step S2601, refer to the implementation in which the first access network node determines to deactivate the SCG or activate the SCG in step S901. Details are not described herein again.

S2602: The second apparatus sends thirteenth indication information to the first apparatus, where the thirteenth indication information indicates the first apparatus to instruct a second base station to send an SCG deactivation command or an SCG activation command to the terminal.

For example, when the first base station is an MN, step S2602 specifically includes: The MN CU-UP sends the thirteenth indication information to the MN CU-CP.

For example, when the first base station is an SN, step S2602 specifically includes: The SN CU-UP sends the thirteenth indication information to the SN CU-CP.

S2603: The first apparatus receives the thirteenth indication information.

For example, when the first base station is an MN, step S2603 specifically includes: The MN CU-CP receives the thirteenth indication information sent by the MN CU-UP. Optionally, the MN CU-CP may further suspend/recover a data transmission tunnel on an X2/Xn interface corresponding to a bearer established at the SN.

For example, when the first base station is an SN, step S2603 specifically includes: The SN CU-CP receives the thirteenth indication information sent by the SN CU-UP. Optionally, the SN CU-CP may further perform a deactivation operation or an activation operation on the SCG.

Optionally, in an implementation of this application, the method further includes: S2604: The first apparatus sends an ACK message to the second apparatus.

The ACK message is used to indicate that the first apparatus successfully receives the thirteenth indication information sent by the second apparatus.

For example, when the first base station is an MN, step S2604 specifically includes: The MN CU-CP sends the ACK message to the MN CU-UP.

For example, when the first base station is an SN, step S2604 specifically includes: The SN CU-CP sends the ACK message to the SN CU-UP.

S2605: The first apparatus sends fourteenth indication information to the second base station, where the fourteenth indication information is used to indicate the second base station to send the SCG deactivation command or the SCG activation command to the terminal.

The second base station is an MN or an SN of the terminal during DC communication. When the second base station is an MN, the first base station is an SN; or when the second base station is an SN, the first base station is an MN.

S2606: The second base station receives the fourteenth indication information.

Optionally, in an implementation of this application, the method further includes: S2607: The second base station sends an ACK message to the first apparatus.

S2608: The second base station sends the SCG deactivation command or the SCG activation command to the terminal.

S2609: The terminal receives the SCG deactivation command or the SCG activation command.

S2610: The terminal performs the deactivation operation or the activation operation on the SCG based on the SCG deactivation command or the SCG activation command.

It may be understood that, for specific implementations of steps S2605 to S2610, refer to related descriptions of steps S2302 to S2307. Details are not described herein again.

According to the communication method provided in this embodiment of this application, the second apparatus determines to deactivate the SCG or activate the SCG. The second apparatus sends the thirteenth indication information to the first apparatus. The first apparatus receives the thirteenth indication information. The first apparatus sends the fourteenth indication information to the second base station, where the fourteenth indication information is used to indicate the second base station to send the SCG deactivation command or the SCG activation command to the terminal. The second base station receives the fourteenth indication information. The second base station sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, signaling interaction is performed in an architecture in which a CU of the MN or the SN includes a CP and a UP, to implement the SCG deactivation and activation operations, and this embodiment can adapt to different network deployments, so that the SCG deactivation and activation operations are performed more flexibly.

Figure 27:
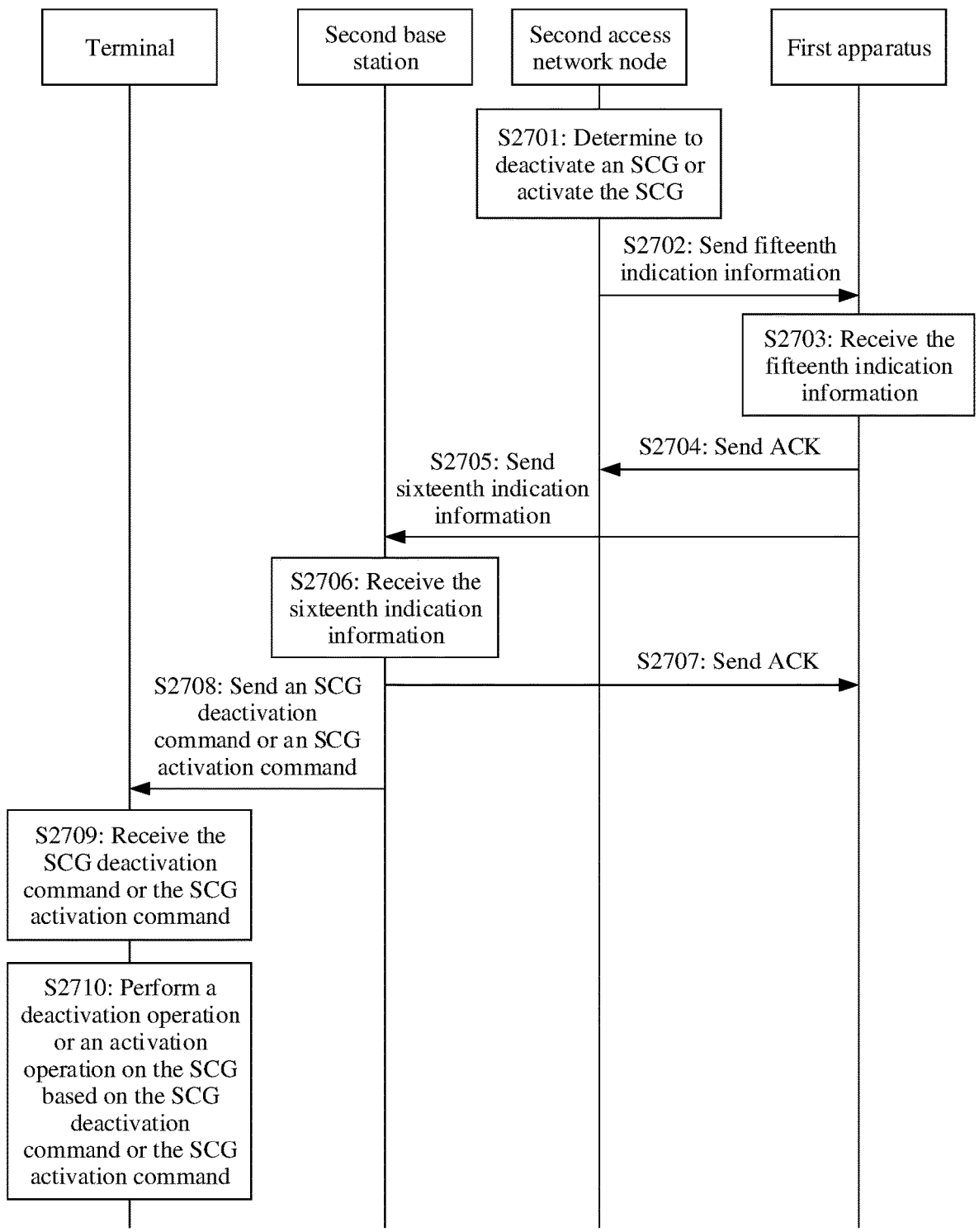
FIG. 27 is a schematic flowchart of another communication method according to an embodiment of this application.

For example, when the first access network node includes a first apparatus and a second apparatus, an embodiment of this application further provides a communication method. As shown in FIG. 27, the method includes steps S2701 to S2710. The first apparatus is configured to perform a CP function of the first access network node, and the second apparatus is configured to perform a UP function of the first access network node, the first access network node belongs to a first base station, and the first base station is an MN or an SN of a terminal during DC communication.

S2701: A second access network node determines to deactivate an SCG or activate the SCG.

For example, the second access network node and the first access network node both belong to the first base station, the first base station is an MN or an SN of the terminal during DC communication, and the SCG includes one or more cells managed by the SN. The second access network node is a DU of the first base station. For example, the second access network node may be an MN DU or an SN DU.

It may be understood that, for a specific implementation in which the second access network node determines to deactivate the SCG or activate the SCG in step S2701, refer to the implementation in which the first access network node determines to deactivate the SCG or activate the SCG in step S901. Details are not described herein again.

S2702: The second access network node sends fifteenth indication information to the first apparatus, where the fifteenth indication information is used to indicate the first apparatus to instruct a second base station to send an SCG deactivation command or an SCG activation command to the terminal.

For example, when the first base station is an MN, step S2702 includes: The MN DU sends the fifteenth indication information to the MN CU-CP.

For example, when the first base station is an SN, step S2702 includes: The SN DU sends the fifteenth indication information to the SN CU-CP.

S2703: The first apparatus receives the fifteenth indication information.

For example, when the first base station is an MN, step S2703 includes: The MN CU-CP receives the fifteenth indication information sent by the MN DU. Optionally, the MN CU-CP may further suspend/recover a data transmission tunnel on an X2/Xn interface corresponding to a bearer established at the SN.

For example, when the first base station is an SN, step S2703 includes: The SN CU-CP receives the fifteenth indication information sent by the SN DU. Optionally, the SN CU-CP may further perform a deactivation operation or an activation operation on the SCG.

Optionally, in an implementation of this application, the method further includes: S2704: The first apparatus sends an ACK message to the second access network node.

The ACK message is used to indicate that the first apparatus successfully receives the fifteenth indication information sent by the second access network node.

For example, when the first base station is an MN, step S2704 includes: The MN CU-CP sends the ACK message to the MN DU.

For example, when the first base station is an SN, step S2704 includes: The SN CU-CP sends the ACK message to the SN DU.

S2705: The first apparatus sends sixteenth indication information to the second base station, where the sixteenth indication information is used to indicate the second base station to send the SCG deactivation command or the SCG activation command to the terminal.

The second base station is an MN or an SN of the terminal during DC communication. When the second base station is an MN, the first base station is an SN; or when the second base station is an SN, the first base station is an MN.

S2706: The second base station receives the sixteenth indication information.

Optionally, in an implementation of this application, the method further includes: S2707: The second base station sends an ACK message to the first apparatus.

S2708: The second base station sends the SCG deactivation command or the SCG activation command to the terminal.

S2709: The terminal receives the SCG deactivation command or the SCG activation command.

S2710: The terminal performs the deactivation operation or the activation operation on the SCG based on the SCG deactivation command or the SCG activation command.

It may be understood that, for specific implementations of steps S2705 to S2710, refer to implementations of steps S2302 to S2307. Details are not described herein again.

According to the communication method provided in this embodiment of this application, the second access network node determines to deactivate the SCG or activate the SCG. The second access network node sends the fifteenth indication information to the first apparatus. The first apparatus receives the fifteenth indication information. The first apparatus sends the sixteenth indication information to the second base station, where the sixteenth indication information is used to indicate the second base station to send the SCG deactivation command or the SCG activation command to the terminal. The second base station receives the sixteenth indication information. The second base station sends the SCG deactivation command or the SCG activation command to the terminal. The terminal receives the SCG deactivation command or the SCG activation command. The terminal performs the deactivation operation or the activation operation on the SCG based on the SCG deactivation command or the SCG activation command. According to this embodiment, the deactivation operation is performed on the SCG, so that SCG related configuration can be retained, and SCG link communication can be quickly recovered through the activation operation. Therefore, compared with a conventional technology, in this embodiment, there is no need to perform SN addition or release, so as to reduce overheads of air interface signaling and a delay while reducing power consumption of a network side and the terminal, thereby improving communication efficiency. In addition, signaling interaction is performed in an architecture in which a CU of the MN or the SN includes a CP and a UP, to implement the SCG deactivation and activation operations, and this embodiment can adapt to different network deployments, so that the SCG deactivation and activation operations are performed more flexibly.

The foregoing mainly describes the embodiments provided in the embodiments of this application from a perspective of method steps. It may be understood that, to implement the foregoing functions, a computer includes corresponding hardware structures and/or software modules for performing the functions. A person skilled in the art should be easily aware that, in combination with modules and algorithm steps of the examples described in the embodiments disclosed in this specification, this application can be implemented by a combination of hardware and computer software. A person skilled in the art may use different methods to implement the described functions of each particular application, but it should not be considered that the implementation goes beyond the scope of this application.

In the embodiments of this application, the CU and the DU may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is merely an example, and is merely a logical function division. During actual implementation, another division manner may be used.

Figure 28:
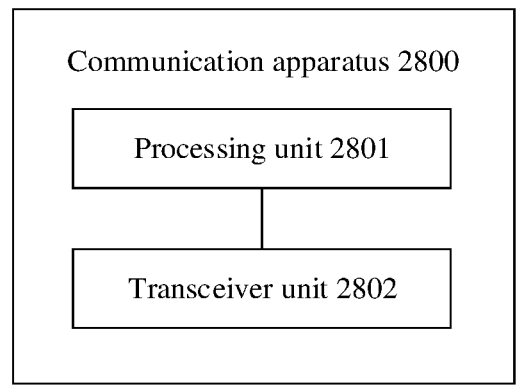
FIG. 28 is a schematic composition diagram of a communication apparatus according to an embodiment of this application.

When an integrated unit is used, FIG. 28 is a schematic diagram of a possible structure of a communication apparatus. The communication apparatus 2800 may be the first access network node in the foregoing embodiment, and the first access network node may be a CU. The communication apparatus 2800 includes a processing unit 2801 and a transceiver unit 2802.

The processing unit 2801 is configured to determine to deactivate an SCG or activate the SCG. The transceiver unit 2802 is configured to send first indication information to a second access network node, where the first indication information is used to indicate the second access network node to send an SCG deactivation command or an SCG activation command to a terminal. The second access network node and the first access network node both belong to a first base station, the first base station may be an MN or an SN, and the second access network node may be an MN DU or an SN DU.

Optionally, in an implementation of this application, the transceiver unit 2802 is further configured to receive an ACK message sent by the second access network node, where the ACK message is used to indicate that the second access network node successfully receives the first indication information sent by the transceiver unit 2802.

Optionally, in an implementation of this application, the transceiver unit 2802 is further configured to send second indication information to a second base station, where the second indication information is used to indicate the second base station to deactivate the SCG or activate the SCG. Optionally, the transceiver unit 2802 is further configured to receive an ACK message sent by the second base station, where the ACK message is used to indicate that the second base station successfully receives the second indication information sent by the first access network node.

Optionally, in an implementation of this application, the transceiver unit 2802 is further configured to send a first notification message to the second base station, where the first notification message is used to notify the second base station that the first base station deactivates the SCG or activates the SCG. Optionally, the transceiver unit 2802 is further configured to receive an ACK message sent by the second base station, where the ACK message is used to indicate that the second base station successfully receives the first notification message sent by the first access network node.

For example, the processing unit 2801 may be further configured to perform step S1201 in FIG. 12, and/or is used in another process of the technology described in this specification. The transceiver unit 2802 may be further configured to perform, for example, step S1202 in FIG. 12, S1208 in FIGS. 13, S1406 and S1407 in FIG. 15, S1408 in FIG. 16, S1411 in FIG. 17, or S1803, S1804, and S1805 in FIG. 18, and/or is used in another process of the technology described in this specification. All related content of the steps in the foregoing method embodiments may be cited in function descriptions of corresponding function modules. Details are not described herein again.

Figure 29:
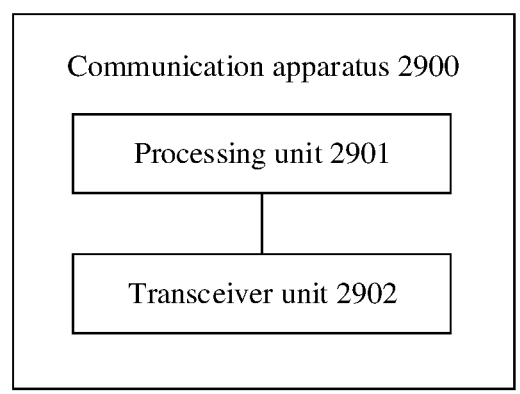
FIG. 29 is a schematic composition diagram of another communication apparatus according to an embodiment of this application.

When an integrated unit is used, FIG. 29 is a schematic diagram of a possible structure of a communication apparatus. The communication apparatus 2900 may perform the operation of the second access network node in the foregoing embodiment, and the second access network node may be a DU. The communication apparatus 2900 includes a processing unit 2901 and a transceiver unit 2902.

The transceiver unit 2902 is configured to receive first indication information sent by a first access network node, where the first indication information is used to indicate the second access network node to send an SCG deactivation command or an SCG activation command to a terminal. Optionally, the processing unit 2901 is configured to deactivate an SCG or activate the SCG. The first access network node and the second access network node both belong to a first base station, the first base station may be an MN or an SN, and the first access network node may be an MN CU or an SN CU.

The transceiver unit 2902 is further configured to send the SCG deactivation command or the SCG activation command to the terminal.

Optionally, in an implementation of this application, the transceiver unit 2902 is further configured to send an ACK message to the first access network node, where the ACK message is used to indicate that the communication apparatus 2900 successfully receives the first indication information sent by the first access network node.

For example, the processing unit 2901 may be further configured to perform step S1401 in FIG. 14 or S1801 in FIG. 18, and/or is used in another process of the technology described in this specification. The transceiver unit 2902 may be further configured to perform, for example, steps S1209 and S1210 in FIG. 13, S1402 in FIG. 14, S1405 in FIG. 15, S1802 in FIG. 18, S1903, S1904, and S1905 in FIG. 19, S2206, S2207, and S2208 in FIG. 22, S2312 and S2313 in FIG. 24, or S2318 and S2319 in FIG. 25, and/or is used in another process of the technology described in this specification. All related content of the steps in the foregoing method embodiments may be cited in function descriptions of corresponding function modules. Details are not described herein again.

Figure 30:
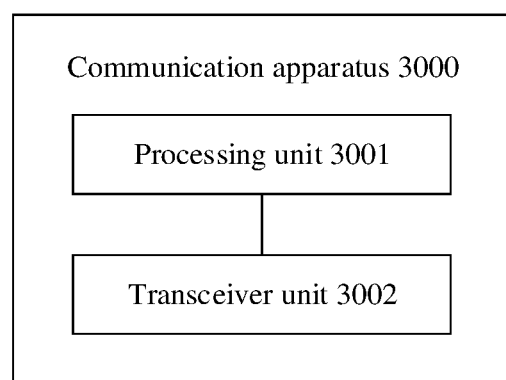
FIG. 30 is a schematic composition diagram of a terminal according to an embodiment of this application.

When an integrated unit is used, FIG. 30 is a schematic diagram of a possible structure of a communication apparatus. The communication apparatus 3000 may be the terminal in the foregoing embodiments or an apparatus used in the terminal, for example, a chip. The communication apparatus 3000 includes a processing unit 3001 and a transceiver unit 3002.

The transceiver unit 3002 is configured to receive an SCG deactivation command or an SCG activation command sent by a second access network node. The processing unit 3001 is configured to perform a deactivation operation or an activation operation on an SCG based on the SCG deactivation command or the SCG activation command.

For example, the processing unit 3001 may be further configured to perform, for example, step S1207 in FIG. 12, S1404 in FIG. 14, S1810 in FIG. 18, S1907 in FIG. 19, S2210 in FIG. 22, S2307 in FIG. 23, or S2610 in FIG. 26, and/or is used in another process of the technology described in this specification. The transceiver unit 3002 may be further configured to perform, for example, step S1206 in FIG. 12, S1403 in FIG. 14, S1809 in FIG. 18, S1906 in FIG. 19, S2209 in FIG. 22, S2306 in FIG. 23, or S2609 in FIG. 26, and/or is used in another process of the technology described in this specification. All related content of the steps in the foregoing method embodiments may be cited in function descriptions of corresponding function modules. Details are not described herein again.

Figure 31:
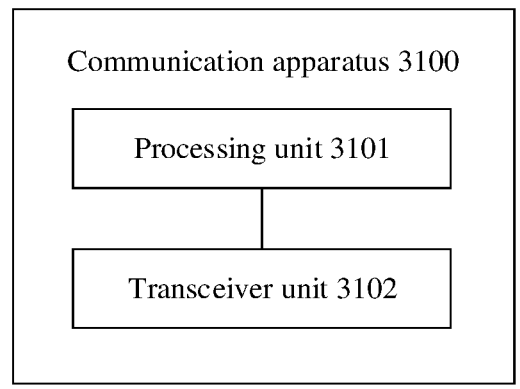
FIG. 31 is a schematic composition diagram of another communication apparatus according to an embodiment of this application.

When an integrated unit is used, FIG. 31 is a schematic diagram of a possible structure of a communication apparatus. The communication apparatus 3100 may be a base station or a chip used in the base station, and may perform the operation of the second base station in the foregoing embodiments. The communication apparatus 3100 includes a processing unit 3101 and a transceiver unit 3102.

When the communication apparatus is a base station, the base station may use a CU-DU split structure. Details are not described again.

The transceiver unit 3102 is configured to receive first indication information sent by a first access network node, where the first indication information is used to indicate a second access network node to send an SCG deactivation command or an SCG activation command to a terminal. The processing unit 3101 is configured to perform a deactivation operation or an activation operation on an SCG based on second indication information. Optionally, in an implementation of this application, the transceiver unit 3102 is further configured to send an ACK message to the first access network node, where the ACK message is used to indicate that the transceiver unit 3102 successfully receives the second indication information sent by the first access network node.

The transceiver unit 3102 is further configured to receive a first notification message sent by the first access network node, where the first notification message is used to notify the second base station that a first base station deactivates the SCG or activates the SCG. The processing unit 3101 is configured to suspend or recover, based on the first notification message, a data transmission tunnel on an X2/Xn interface corresponding to an SCG bearer. Optionally, in an implementation of this application, the transceiver unit 3102 is further configured to send an ACK message to the first access network node, where the ACK message is used to indicate that the transceiver unit 3102 successfully receives the first notification message sent by the first access network node.

For example, the processing unit 3101 may be further configured to perform, for example, step S1910 in FIG. 20, and/or is used in another process of the technology described in this specification. The transceiver unit 3102 may be further configured to perform, for example, steps S1203, S1204, and S1205 in FIGS. 12, S1409 and S1410 in FIGS. 16, S1412 and S1413 in FIG. 17, S1806 and S1807 in FIG. 18, S1909 in FIG. 20, S1912 in FIGS. 21, S2303, S2304, and S2305 in FIG. 23, or S2606, S2607, and S2608 in FIG. 26, and/or is used in another process of the technology described in this specification. All related content of the steps in the foregoing method embodiments may be cited in function descriptions of corresponding function modules. Details are not described herein again.

Figure 32:
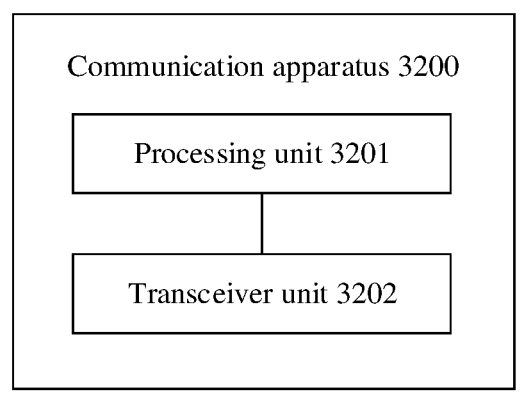
FIG. 32 is a schematic composition diagram of another communication apparatus according to an embodiment of this application.

When an integrated unit is used, FIG. 32 is a schematic diagram of a possible structure of a communication apparatus. The communication apparatus 3200 may perform the operation of the first apparatus in the foregoing embodiments, the first apparatus may be configured to perform a CP function of a first access network node, and the first access network node belongs to a first base station. The first base station is an MN or an SN, the first access network node may be an MN CU or an SN CU, and the first apparatus may be an MN CU-CP or an SN CU-CP. The communication apparatus 3200 includes a processing unit 3201 and a transceiver unit 3202.

The processing unit 3201 may be configured to control and manage an action of the communication apparatus 3200. For example, the processing unit 3201 may be configured to perform, for example, step S190 in FIG. 19 or S2301 in FIG. 23, and/or is used in another process of the technology described in this specification. The transceiver unit 3202 is configured to send and receive information, or communicate with another network element. For example, the transceiver unit 3202 may be configured to perform, for example, step S1902 in FIG. 19, S1908 in FIG. 20, S1911 in FIG. 21, S2203, S2204, and S2205 in FIG. 22, S2302 in FIG. 23, S2308 and S2311 in FIG. 24, S2314 and S2317 in FIG. 25, or S2603, S2604, and S2605 in FIG. 26, and/or is used in another process of the technology described in this specification. All related content of the steps in the foregoing method embodiments may be cited in function descriptions of corresponding function modules. Details are not described herein again.

Figure 33:
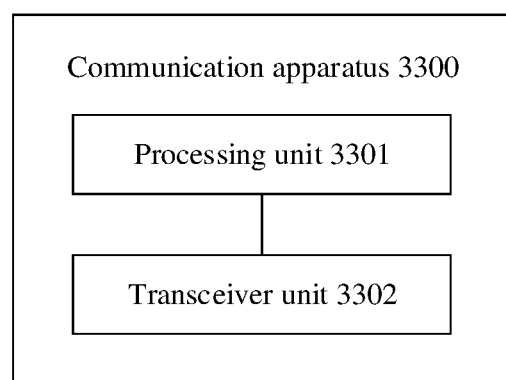
FIG. 33 is a schematic composition diagram of another communication apparatus according to an embodiment of this application.

When an integrated unit is used, FIG. 33 is a schematic diagram of a possible structure of a communication apparatus. The communication apparatus 3300 may perform the operation of the second apparatus in the foregoing embodiments, the second apparatus may be configured to perform a UP function of a first access network node, and the first access network node belongs to a first base station. The first base station is an MN or an SN, the first access network node may be an MN CU or an SN CU, and the first apparatus may be an MN CU-CP or an SN CU-CP. The communication apparatus 3300 includes a processing unit 3301 and a transceiver unit 3302.

The processing unit 3301 may be configured to control and manage an action of the communication apparatus 3300. For example, the processing unit 3301 may be configured to perform, for example, step S2201 in FIG. 22 or S2601 in FIG. 26, and/or is used in another process of the technology described in this specification. The transceiver unit 3302 is configured to send and receive information, or communicate with another network element. For example, the transceiver unit 3302 may be configured to perform, for example, step S2202 in FIG. 22, S2309 and S2310 in FIG. 24, S2315 and S2316 in FIG. 25, or S2602 in FIG. 26, and/or is used in another process of the technology described in this specification. All related content of the steps in the foregoing method embodiments may be cited in function descriptions of corresponding function modules. Details are not described herein again.

An embodiment of this application further provides a communication apparatus. The communication apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support a terminal device or an access network device such as a base station in implementing the communication method in any embodiment in FIG. 9 to FIG. 27.

An embodiment of this application further provides a computer storage medium. The computer storage medium stores computer program code. When the foregoing processor executes the computer program code, an electronic device performs the communication method in any embodiment in FIG. 9 to FIG. 27.

An embodiment of this application further provides a computer program product. When the computer program product runs on a computer, the computer is enabled to perform the communication method in any embodiment in FIG. 9 to FIG. 27.

An embodiment of this application further provides a communication apparatus. The apparatus may exist in a product form of a chip. A structure of the apparatus includes a processor and an interface circuit. The processor is configured to communicate with another apparatus through a receiving circuit, to enable the apparatus to perform the communication method in any embodiment in FIG. 9 to FIG. 27.

An embodiment of this application further provides a communication system, including a terminal and an access network device. The terminal and the access network device may perform the communication method in any embodiment in FIG. 9 to FIG. 27.

Method or algorithm steps described in combination with the content disclosed in this application may be implemented by hardware, or may be implemented by a processor by executing a software instruction. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may further be a component of the processor. The processor and the storage medium may be located in an ASIC. In addition, the ASIC may be located in a CN interface device. Certainly, the processor and the storage medium may exist in the CN interface device as discrete components.

A person of skill in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general purpose or dedicated computer.

The objectives, technical embodiments, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical embodiments of this application shall fall within the protection scope of this application.

What is claimed is:

1. A method, comprising:
    determining, by a first access network node, to deactivate a secondary cell group (SCG) or activate the SCG; and
    triggering a terminal, a first base station, a second base station, or another network device to store at least a recoverable portion of configuration information associated with reactivating the SCG or recover the recoverable portion of configuration information associated with reactivating the SCG, the triggering performed by at least sending, by the first access network node, first indication information to the second base station, wherein:
        the first indication information indicates, in response to the first access network node determining to deactivate the SCG, to the second base station to send an SCG deactivation command to the terminal or indicates, in response to the first access network node determining to activate the SCG, to the second base station to send an SCG activation command to the terminal;
        the first access network node belongs to the first base station, the first base station being a master node or a secondary node (SN) of the terminal during dual connectivity communication; and
        when the first base station is the master node, the second base station is the secondary node, or when the first base station is the secondary node, the second base station is the master node, the SCG comprising one or more cells managed by the secondary node.

2. The method according to claim 1, further comprising:
    sending, by the first access network node, second indication information to a second access network node, wherein the second indication information indicates, in response to the first access network node determining to deactivate the SCG, to the second access network node to deactivate the SCG or indicates, in response to the first access network node determining to activate the SCG, to the second access network node to activate the SCG, the second access network node belonging to the first base station,
    wherein the second indication information triggers the second access network node to store at least the recoverable portion of configuration information associated with reactivating the SCG or recover the recoverable portion of configuration information associated with reactivating the SCG.

3. The method according to claim 2, wherein:
    the first access network node is configured to perform one or more of the following operations of the first base station:
        a radio resource control (RRC) protocol stack;
        a service data adaptation protocol (SDAP) protocol stack; or
        a packet data convergence protocol (PDCP) layer; and
    the second access network node is configured to perform one or more of the following operations:
        a radio link control (RLC) protocol stack; a media access control (MAC) protocol stack; or
        a physical layer (PHY) protocol stack.

4. The method according to claim 1, wherein:
    the first access network node comprises a first apparatus and a second apparatus;
    the first apparatus is configured to perform a control plane function of the first access network node; and
    the second apparatus is configured to perform a user plane function of the first access network node.

5. The method according to claim 4, wherein:
    determining to deactivate the SCG or activate the SCG comprises determining, by the first apparatus, to deactivate the SCG or activate the SCG; and
    sending the first indication information to the second base station comprises sending, by the first apparatus, the first indication information to the second base station.

6. The method according to claim 5, further comprising:
    sending, by the first apparatus, third indication information to the second apparatus, wherein the third indication information indicates, in response to the first access network node determining to deactivate the SCG, to the second apparatus to deactivate the SCG or indicates, in response to the first access network node determining to activate the SCG, to the second apparatus to activate the SCG,
    wherein the third indication information triggers the second apparatus to store at least the recoverable portion of configuration information associated with reactivating the SCG or recover the recoverable portion of configuration information associated with reactivating the SCG.

7. The method according to claim 4, wherein:
    determining to deactivate the SCG or activate the SCG comprises determining, by the second apparatus, to deactivate the SCG or activate the SCG; and
    sending the first indication information to the second base station comprises sending, by the second apparatus, a notification message to the first apparatus to instruct the first apparatus to send the first indication information to the second base station.

8. The method according to claim 1, wherein determining to deactivate the SCG or activate the SCG comprises:
    determining, by the first access network node, to deactivate the SCG or activate the SCG based on one or more of: assistance information sent by the second base station, assistance information sent by the terminal, or a transmission situation of data carried by the first base station.

9. The method according to claim 1, wherein deactivating the SCG comprises at least one of:
    stopping data transmission on a secondary cell group radio link control bearer (SCG RLC) bearer;
    stopping data transmission on a bearer, or SN terminated bearer, whose packet data convergence protocol (PDCP) is terminated at the secondary node;
    stopping data transmission on an SCG RLC entity; or
    stopping data transmission on an SN PDCP entity.

10. A first access network node, comprising:
    at least one processor; and
    at least one non-transitory memory coupled to the at least one processor and storing a computer program or instructions that, when executed by the at least one processor, cause the first access network node to perform operations comprising:
        determining to deactivate a secondary cell group (SCG) or activate the SCG; and
        triggering a terminal, a first base station, a second base station, or another network device to store at least a recoverable portion of configuration information associated with reactivating the SCG or recover the recoverable portion of configuration information associated with reactivating the SCG, the triggering performed by at least sending first indication information to the second base station, wherein:
- the first indication information indicates, in response to determining to deactivate the SCG, to the second base station to send an SCG deactivation command to the terminal or indicates, in response to determining to activate the SCG, to the second base station to send an SCG activation command to the terminal;
- the first access network node belongs to the first base station, the first base station being a master node or a secondary node of the terminal during dual connectivity communication; and
- when the first base station is the master node, the second base station is the secondary node, or when the first base station is the secondary node, the second base station is the master node, the SCG comprising one or more cells managed by the secondary node.

11. The first access network node according to claim 10, wherein the computer program or instructions, when executed by the at least one processor, further cause the first access network node to perform operations comprising:
- sending second indication information to a second access network node, wherein the second indication information indicates, in response to determining to deactivate the SCG, to the second access network node to deactivate the SCG or indicates, in response to determining to activate the SCG, to the second access network node to activate the SCG, the second access network node belonging to the first base station.

12. The first access network node according to claim 11, wherein:
- the first access network node is configured to perform one or more of the following operations of the first base station:
  - a radio resource control (RRC) protocol stack;
  - a service data adaptation protocol (SDAP) protocol stack; and
  - a packet data convergence protocol (PDCP) layer; and
- the second access network node is configured to perform one or more of the following operations:
  - a radio link control (RLC) protocol stack;
  - a media access control (MAC) protocol stack; and
  - a physical layer (PHY) protocol stack.

13. The first access network node according to claim 10, wherein:
- the first access network node comprises a first apparatus and a second apparatus;
- the first apparatus is configured to perform a control plane function of the first access network node; and
- the second apparatus is configured to perform a user plane function of the first access network node.

14. The first access network node according to claim 13, wherein:
- determining to deactivate the SCG or activate the SCG comprises determining, by the first apparatus, to deactivate the SCG or activate the SCG; and
- sending the first indication information to the second base station comprises sending, by the first apparatus, the first indication information to the second base station.

15. A communications apparatus, comprising:
- at least one processor; and
- at least one non-transitory memory coupled to the at least one processor and storing a computer program or instructions that, when executed by the at least one processor, cause the communications apparatus to perform operations comprising:
- receiving first indication information from a first access network node, wherein:
  - the first indication information indicates to the communications apparatus to send a secondary cell group (SCG) deactivation command or an SCG activation command to a terminal;
  - the first access network node belongs to a first base station, the communications apparatus being a master node or a secondary node of the terminal during dual connectivity communication; and
  - when the communications apparatus is the master node, the first base station is the secondary node, or when the communications apparatus is the secondary node, the first base station is the master node, the SCG comprising one or more cells managed by the secondary node; and
- triggering the terminal, the first base station, a second base station, or another network device to store at least a recoverable portion of configuration information associated with reactivating the SCG or recover the recoverable portion of configuration information associated with reactivating the SCG, the triggering performed by at least sending the SCG deactivation command or the SCG activation command to the terminal.

16. The communications apparatus according to claim 15, wherein:
- the first access network node comprises a first apparatus and a second apparatus;
- the first apparatus is configured to perform a control plane function of the first access network node;
- the second apparatus is configured to perform a user plane function of the first access network node; and
- receiving the first indication information from the first access network node comprises:
  - receiving the first indication information from the first apparatus.

17. The method according to claim 1, wherein the SCG deactivation command indicates to the terminal to store at least the recoverable portion of configuration information associated with reactivating the SCG or the SCG activation command indicates to the terminal to recover the recoverable portion of configuration information associated with reactivating the SCG.

18. The method according to claim 1, wherein the SCG deactivation command triggers suspension of a data transmission tunnel on an X2/Xn interface, or the SCG activation command triggers recovery of the data transmission tunnel on the X2/Xn interface.

19. The method according to claim 8, wherein the assistance information comprises an active status determined based on a measured data amount associated with the SCG, and determining to deactivate the SCG or activate the SCG comprises determining whether the measured data amount is high, medium, or low.

20. The method according to claim 8, wherein the assistance information comprises an active status determined based on a measured data amount associated with the SCG, and determining to deactivate the SCG comprises determining that the measured data amount is less than a threshold, or determining to activate the SCG comprises determining that the measured data amount is greater to or equal to the threshold.

* * * * *